US012682928B2

(12) United States Patent
Nakao et al.

(10) Patent No.: US 12,682,928 B2
(45) Date of Patent: Jul. 14, 2026

(54) MAGNETIC TAPE, MAGNETIC TAPE CARTRIDGE, MAGNETIC TAPE SYSTEM, TEST METHOD, AND MANUFACTURING METHOD OF MAGNETIC TAPE

(71) Applicant: FUJIFILM CORPORATION, Tokyo (JP)

(72) Inventors: Toru Nakao, Kanagawa (JP); Hodaka Suzuki, Kanagawa (JP); Yoichi Akano, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 19/309,631

(22) Filed: Aug. 26, 2025

(65) Prior Publication Data

US 2025/0378849 A1     Dec. 11, 2025

Related U.S. Application Data

(63) Continuation of application No. PCT/JP2024/006790, filed on Feb. 26, 2024.

(30) Foreign Application Priority Data

Mar. 29, 2023    (JP) ................................. 2023-054152

(51) Int. Cl.
*G11B 5/592*          (2006.01)
*G11B 5/84*           (2006.01)
*G11B 27/36*          (2006.01)

(52) U.S. Cl.
CPC .............. *G11B 5/5928* (2013.01); *G11B 5/84* (2013.01); *G11B 27/36* (2013.01)

(58) Field of Classification Search
CPC ......... G11B 5/5928; G11B 5/84; G11B 27/36; G11B 5/008; G11B 5/09; G11B 5/584;

(Continued)

(56) References Cited

U.S. PATENT DOCUMENTS 9,536,563 B1 *  1/2017  Liu ..................... G06F 11/1469
10,008,226 B1 *  6/2018  Bui ..................... G11B 15/602
(Continued)

FOREIGN PATENT DOCUMENTS

JP       2019-046521 A      3/2019
JP       2022-057517 A      4/2022
(Continued)

OTHER PUBLICATIONS

International Search Report issued in International Application No. PCT/JP2024/006790 on Apr. 9, 2024.
Written Opinion of the ISA issued in International Application No. PCT/JP2024/006790 on Apr. 9, 2024.

*Primary Examiner* — Andrew Sasinowski
(74) *Attorney, Agent, or Firm* — SOLARIS Intellectual Property Group, PLLC

(57)     ABSTRACT

An indicator indicating a non-linearity of a servo pattern is within 15% or less of a track pitch. The track pitch is a pitch between tracks. The indicator indicates a degree of variation in the plurality of distance differences from an average value of the plurality of distance differences. The distance difference is a difference between a distance between a pair of first positions corresponding to each other in the width direction in the pair of servo patterns and a distance between a pair of second positions deviated from the pair of first positions in the width direction by a first predetermined interval in the pair of servo patterns. The plurality of distance differences are obtained by measuring the distance difference for each second predetermined interval along the width direction in the pair of servo patterns. The first predetermined interval is larger than the second predetermined interval.

18 Claims, 28 Drawing Sheets

(58) Field of Classification Search
CPC .. G11B 5/70; G11B 5/78; G11B 20/10; G11B 21/10; G11B 23/107
See application file for complete search history.

(56) References Cited

U.S. PATENT DOCUMENTS

| | | | |
|---|---|---|---|
| 2014/0139944 A1* | 5/2014 | Johnson ................. | G11B 5/008 |
| | | | 360/75 |
| 2018/0341565 A1* | 11/2018 | Nair ................... | G11B 20/1889 |
| 2019/0074031 A1 | 3/2019 | Akano | |
| 2019/0279673 A1 | 9/2019 | Biskeborn et al. | |
| 2020/0035264 A1 | 1/2020 | Judd et al. | |
| 2021/0090597 A1 | 3/2021 | Akano | |
| 2022/0415358 A1* | 12/2022 | Hanaoka ................ | G11B 5/584 |
| 2023/0065359 A1 | 3/2023 | Nakamigawa et al. | |
| 2023/0206947 A1* | 6/2023 | Akano .............. | G11B 5/00817 |
| | | | 360/53 |
| 2023/0238032 A1 | 7/2023 | Kaneko | |
| 2024/0212708 A1* | 6/2024 | Nakao ................... | G11B 15/43 |
| 2024/0290349 A1 | 8/2024 | Yamaga et al. | |
| 2024/0404553 A1 | 12/2024 | Morita et al. | |

FOREIGN PATENT DOCUMENTS

| | | |
|---|---|---|
| JP | 2023-035816 A | 3/2023 |
| WO | 2023/002670 A1 | 1/2023 |
| WO | 2023/037585 A1 | 3/2023 |

\* cited by examiner

MAGNETIC TAPE SYSTEM

12

14

LOAD

MAGNETIC TAPE DRIVE

[Δ dPES UNDER FIRST CONDITION]

MEASUREMENT POSITION OF dPES IN
WIDTH DIRECTION OF MAGNETIC TAPE

[Δ dPES UNDER SECOND CONDITION]

MEASUREMENT POSITION OF dPES IN
WIDTH DIRECTION OF MAGNETIC TAPE

SENDING REEL SIDE ⟵  BACKWARD DIRECTION  ⟶ FORWARD DIRECTION  ⟶ WINDING REEL SIDE

52A(52)    52B(52)

54A1  54A2  54B1  54B2    DWM1

28    SRa    Pa1(P)    MT

WD1

SB3 (SB)

DW1

DW1

DW1

DWG1

DW1

WD    DW1

DW1

DW1

DW1

SRa    Pa1(P)

SB2 (SB)

WD2

54A1  54A2  54B1  54B2

52A(52)    52B(52)

LD

1

MAGNETIC TAPE, MAGNETIC TAPE CARTRIDGE, MAGNETIC TAPE SYSTEM, TEST METHOD, AND MANUFACTURING METHOD OF MAGNETIC TAPE

CROSS-REFERENCE TO RELATED APPLICATIONS

This application is a continuation application of International Application No. PCT/JP2024/006790, filed Feb. 26, 2024, the disclosure of which is incorporated herein by reference in its entirety. Further, this application claims priority from Japanese Patent Application No. 2023-054152, filed Mar. 29, 2023, the disclosure of which is incorporated herein by reference in its entirety.

BACKGROUND

1. Technical Field

The technology of the present disclosure relates to a magnetic tape, a magnetic tape cartridge, a magnetic tape system, a test method, and a manufacturing method of a magnetic tape.

2. Related Art

JP2022-057517A discloses a magnetic tape including a timing-based servo pattern, in which the magnetic tape is used in a magnetic tape device in which a total number of data tracks is 8705 or more in conversion of a magnetic tape having a width of ½ inch, ΔPNL of the timing-based servo pattern is 10.0% or less of a track pitch, and ΔPNL indicates a shift amount from linearity of the timing-based servo pattern.

JP2019-046521A discloses a recording device comprising a recording unit that records information on linearity of a servo signal recorded onto a magnetic tape included in a recording tape cartridge, on a recording medium included in the recording tape cartridge.

US2019/0279673A discloses a shingled magnetic recording method as a method of recording data on a magnetic tape.

SUMMARY

One embodiment according to the technology of the present disclosure provides a magnetic tape, a magnetic tape cartridge, a magnetic tape system, a test method, and a manufacturing method of a magnetic tape, which can contribute to improvement of an accuracy of recording data on the magnetic tape and an accuracy of reproducing data recorded on the magnetic tape.

A first aspect according to the technology of the present disclosure relates to a magnetic tape comprising: a plurality of servo bands, each having a plurality of servo patterns recorded along a longitudinal direction, are arranged in a width direction, wherein an indicator indicating non-linearity of the servo pattern is within 15% or less of a track pitch, the track pitch is a pitch between a plurality of tracks formed by recording data on the magnetic tape by a recording element in accordance with a signal obtained from the plurality of servo patterns, the indicator indicates a degree of variation of a plurality of PES difference gaps from an average value of the plurality of PES difference gaps, the PES difference gap is a difference between a first PES difference and a second PES difference, the first PES difference being a difference in PES between a pair of first positions corresponding to each other in the width direction in a pair of servo patterns recorded at corresponding positions in the width direction between a pair of servo bands adjacent to each other in the width direction among the plurality of servo bands, the second PES difference being difference in PES between a pair of second positions deviated from the pair of first positions in the width direction by a first predetermined interval in the pair of servo patterns, the plurality of PES difference gaps are obtained by measuring the PES difference gap in the pair of servo patterns for each second predetermined interval along the width direction, and the first predetermined interval is larger than the second predetermined interval.

A second aspect according to the technology of the present disclosure is the magnetic tape according to the first aspect, in which the plurality of tracks are formed by recording the data in an SMR method by the recording element on the magnetic tape.

A third aspect according to the technology of the present disclosure relates to the magnetic tape according to the first aspect or the second aspect, in which the indicator is a value corresponding to three times a standard deviation of the plurality of PES difference gaps.

A fourth aspect according to the technology of the present disclosure relates to the magnetic tape according to any one of the first to third aspects, in which the first predetermined interval is a reference interval of a multiple of a natural number of the second predetermined interval and an interval that is closest to the reference interval corresponding to half of a difference between a recording element length, which is a length of the recording element in the width direction, and the track pitch.

A fifth aspect according to the technology of the present disclosure relates to the magnetic tape according to any one of the first to third aspects, in which the first predetermined interval is an interval corresponding to 2 or more natural number multiples of the second predetermined interval.

A sixth aspect according to the technology of the present disclosure is the magnetic tape according to any one of the first to sixth aspects, in which the first predetermined interval is larger than the track pitch.

A seventh aspect according to the technology of the present disclosure is the magnetic tape according to any one of the first to sixth aspects, in which the indicator is within 10% or less of the track pitch.

An eighth aspect according to the technology of the present disclosure is the magnetic tape according to any one of the first to seventh aspects, in which the indicator is within 5% or less of the track pitch.

A ninth aspect according to the technology of the present disclosure relates to the magnetic tape according to any one of the first to eighth aspects, in which three or more servo bands are arranged as the plurality of servo bands in the width direction, and the indicator is obtained for each of all the pairs of servo bands adjacent to each other in the width direction.

A tenth aspect according to the technology of the present disclosure relates to the magnetic tape according to the ninth aspect, in which each of the indicators obtained for each of the pair of servo bands is within 15% or less of the track pitch.

An eleventh aspect according to the technology of the present disclosure relates to the magnetic tape according to the ninth aspect, in which each of the indicators obtained for each of the pair of servo bands is within 10% or less of the track pitch.

A twelfth aspect according to the technology of the present disclosure relates to the magnetic tape according to the ninth aspect, in which each of the indicators obtained for each of the pair of servo bands is within 5% or less of the track pitch.

A thirteenth aspect according to the technology of the present disclosure relates to the magnetic tape according to any one of the first to twelfth aspects, in which the servo pattern is at least one linear magnetization region pair, the linear magnetization region pair is a first linear magnetization region linearly magnetized and a second linear magnetization region linearly magnetized, the first linear magnetization region and the second linear magnetization region are inclined in opposite directions with respect to an imaginary straight line along the width direction, and the first linear magnetization region has a steeper inclination angle with respect to the imaginary straight line than the second linear magnetization region has.

A fourteenth aspect according to the technology of the present disclosure relates to a magnetic tape cartridge comprising: the magnetic tape according to any one of the first to thirteenth aspects; and a case in which the magnetic tape is accommodated.

A fifteenth aspect according to the technology of the present disclosure relates to a magnetic tape system comprising: the magnetic tape according to any one of the first to thirteenth aspects; and a magnetic head that performs recording of data on the magnetic tape and/or reproducing of data recorded on the magnetic tape.

A sixteenth aspect according to the technology of the present disclosure is a test method comprising: acquiring the indicator from the magnetic tape according to any one of the first to thirteenth aspects; and testing the magnetic tape using the indicator.

A seventeenth aspect according to the technology of the present disclosure relates to the test method according to the sixteenth aspect, in which the testing of the magnetic tape includes testing linearity of the servo pattern using the indicator.

An eighteenth aspect according to the technology of the present disclosure is a manufacturing method of a magnetic tape in which a plurality of servo bands, each having a plurality of servo patterns are recorded along a first longitudinal direction are arranged in a width direction, the manufacturing method comprising: installing a servo write head having an opposing surface, which is a surface facing a recording surface of the magnetic tape in a case where the plurality of servo patterns are recorded along the first longitudinal direction and a plurality of gap patterns, which are formed on the opposing surface at intervals along a second longitudinal direction and correspond to the plurality of servo patterns, in a posture in which the recording surface and the plurality of gap patterns face each other; and recording the plurality of servo patterns on the recording surface along the first longitudinal direction by using the servo write head installed in the posture, to form the plurality of servo bands on the recording surface, wherein an indicator indicating non-linearity of the servo pattern is within 15% or less of a track pitch, the track pitch is a pitch between a plurality of tracks formed by recording data on the magnetic tape by a recording element in accordance with a signal obtained from the plurality of servo patterns, the indicator indicates a degree of variation of a plurality of PES difference gaps from an average value of the plurality of PES difference gaps, the PES difference gap is a difference between a first PES difference and a second PES difference, the first PES difference being a difference in PES between a pair of first positions corresponding to each other in the width direction in a pair of servo patterns recorded at corresponding positions in the width direction between a pair of servo bands adjacent to each other in the width direction among the plurality of servo bands, the second PES difference being difference in PES between a pair of second positions deviated from the pair of first positions in the width direction by a first predetermined interval in the pair of servo patterns, the plurality of PES difference gaps are obtained by measuring the PES difference gap in the pair of servo patterns for each second predetermined interval along the width direction, and the first predetermined interval is larger than the second predetermined interval.

BRIEF DESCRIPTION OF THE DRAWINGS

Exemplary embodiments according to the technique of the present disclosure will be described in detail based on the following figures, wherein:

FIG. 1 is a conceptual diagram showing an example of a configuration of a magnetic tape system;

FIG. 8 is a conceptual diagram showing an example of a correspondence relationship between a data recording/reproducing element and a data track;

DETAILED DESCRIPTION

Figure 2:
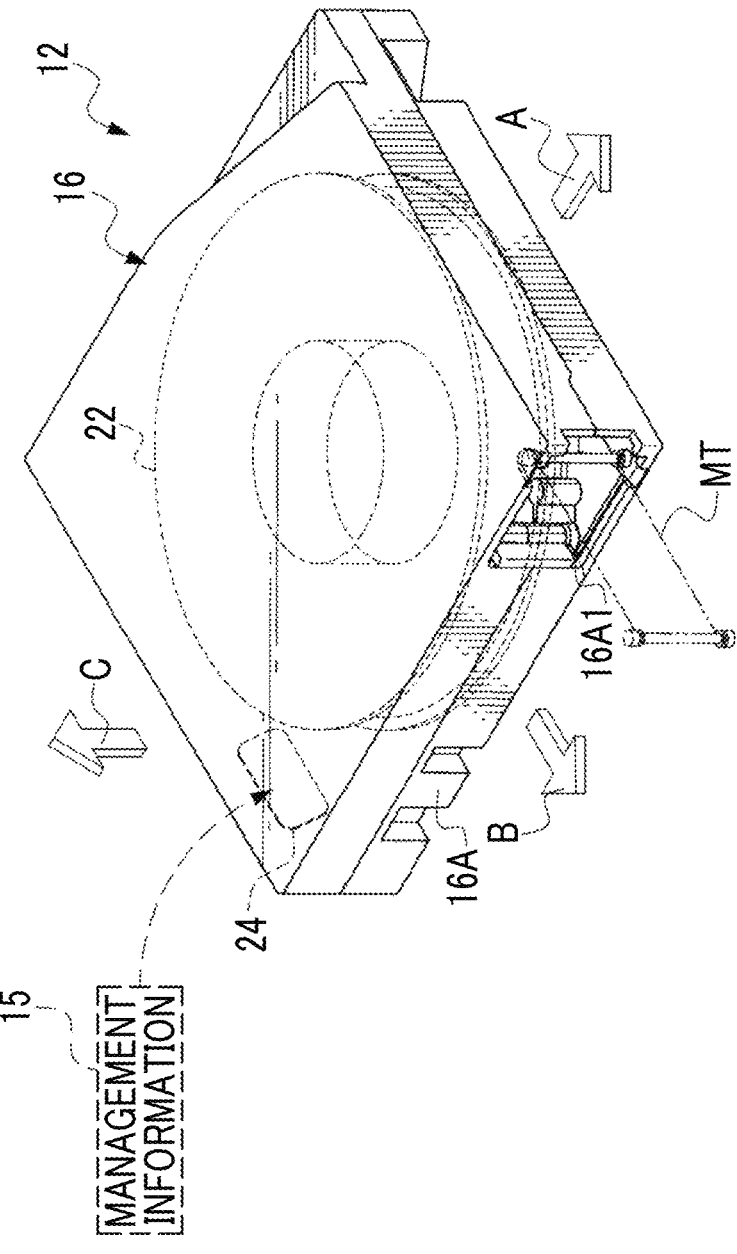
FIG. 2 is a schematic perspective view showing an example of an appearance of a magnetic tape cartridge.

Hereinafter, an example of an embodiment of a magnetic tape, a magnetic tape cartridge, a magnetic tape system, a test method, and a manufacturing method of a magnetic tape according to the technology of the present disclosure will be described with reference to the accompanying drawings.

First, the terms used in the following description will be described.

CPU refers to an abbreviation for "Central Processing Unit". RAM refers to an abbreviation for "Random access memory". NVM refers to an abbreviation for "Non-volatile memory". EEPROM refers to an abbreviation for "Electrically erasable and programmable read only memory". SSD refers to an abbreviation for "Solid state drive". HDD refers to an abbreviation for "Hard disk drive". ASIC refers to an abbreviation for "Application specific integrated circuit". PLD refers to an abbreviation for "Programmable logic device". FPGA refers to an abbreviation for "Field-programmable gate array". SoC refers to an abbreviation of a "System-on-a-chip". IC refers to an abbreviation of an "Integrated circuit". RFID refers to an abbreviation for "Radio frequency identifier". UI refers to an abbreviation for "User interface". SMR refers to an abbreviation for "Shingled Magnetic Recording". TDS refers to an abbreviation of "Transverse dimensional stability". "FIB" refers to an abbreviation for "Focused Ion Beam". PES is an abbreviation for "position error signal". MEMS refers to an abbreviation for "Micro Electro Mechanical Systems". PVD is an abbreviation for "Physical Vapor Deposition". CVD is an abbreviation for "Chemical Vapor Deposition".

Figure 1:
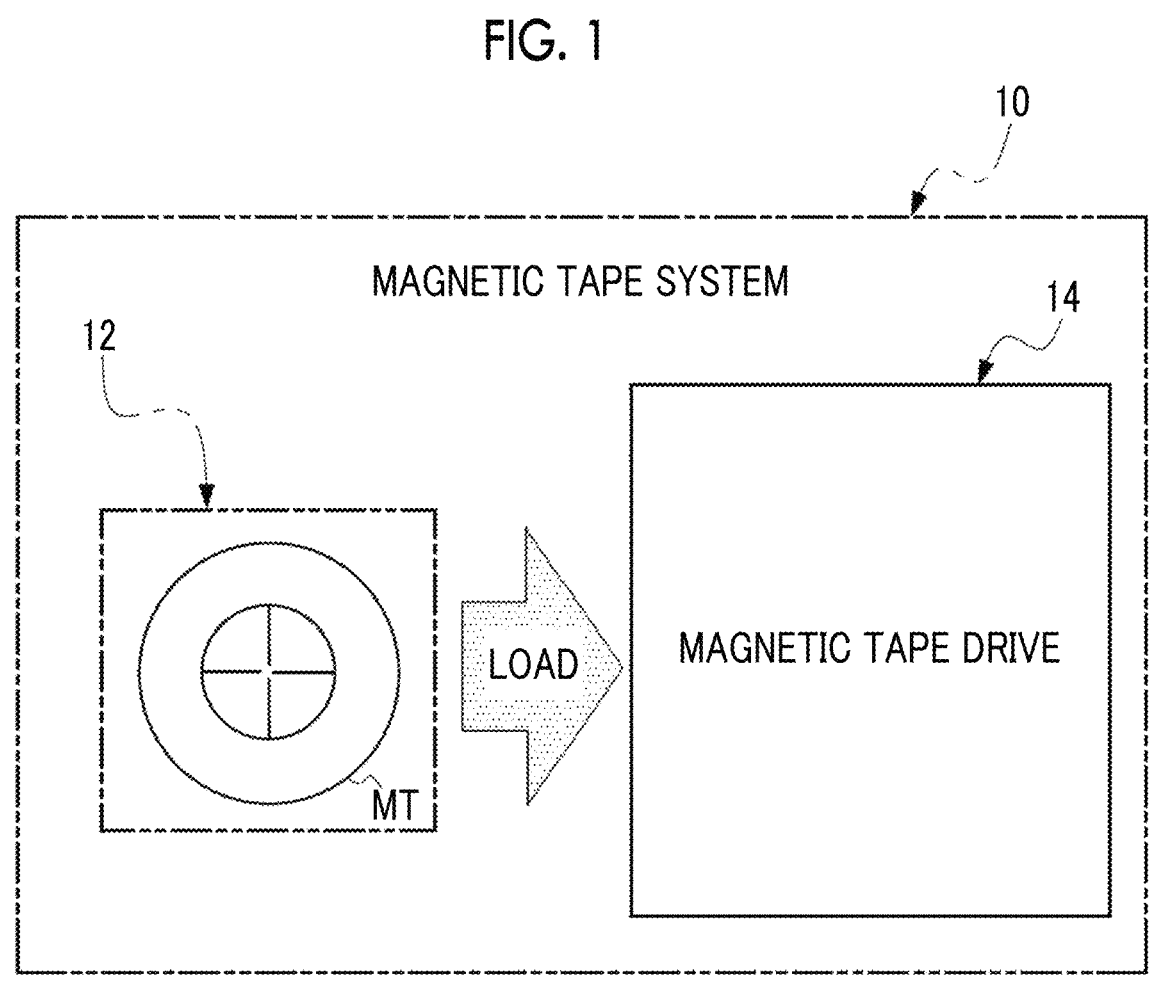

As shown in FIG. 1 as an example, a magnetic tape system 10 comprises a magnetic tape cartridge 12 and a magnetic tape drive 14. The magnetic tape drive 14 is loaded with the magnetic tape cartridge 12. The magnetic tape cartridge 12 accommodates a magnetic tape MT. The magnetic tape drive 14 extracts the magnetic tape MT from the loaded magnetic tape cartridge 12, and records data onto the magnetic tape MT or reads data from the magnetic tape MT while the extracted magnetic tape MT is traveling.

In the example shown in FIG. 1, each of the magnetic tape cartridge 12 and the magnetic tape drive 14 is shown alone in order to facilitate understanding of the technology of the present disclosure, but in fact, the magnetic tape system 10 comprises a plurality of magnetic tape cartridges 12 and a plurality of magnetic tape drives 14. Thus, the plurality of magnetic tape cartridges 12 and the plurality of magnetic tape drives 14 are selectively used. For example, the magnetic tape cartridge 12 is selected from the plurality of magnetic tape cartridges 12 in accordance with a given instruction, and the selected magnetic tape cartridge 12 is loaded into a designated magnetic tape drive 14 among the plurality of magnetic tape drives 14.

In the present embodiment, the magnetic tape system 10 is an example of a "magnetic tape system" according to the technology of the present disclosure. In addition, in the present embodiment, the magnetic tape MT is an example of a "magnetic tape" according to the technology of the present disclosure. In addition, in the present embodiment, the magnetic tape cartridge 12 is an example of a "magnetic tape cartridge" according to the technology of the present disclosure.

Next, an example of a configuration of the magnetic tape cartridge 12 will be described with reference to FIGS. 2 to 4. In the following description, for convenience of description, in FIGS. 2 to 4, a direction of loading the magnetic tape cartridge 12 into the magnetic tape drive 14 is indicated by an arrow A, a direction of the arrow A is defined as a front direction of the magnetic tape cartridge 12, and a side of the magnetic tape cartridge 12 in the front direction is defined as a front side of the magnetic tape cartridge 12. In the description of the structure to be shown below, "front" refers to the front side of the magnetic tape cartridge 12.

In addition, in the following description, for convenience of description, in FIGS. 2 to 4, a direction of an arrow B that is perpendicular to the direction of the arrow A is defined as a right direction, and a side of the magnetic tape cartridge 12 in the right direction is defined as a right side of the magnetic tape cartridge 12. In the description of the structure to be shown below, "right" refers to the right side of the magnetic tape cartridge 12.

In addition, in the following description, for convenience of description, in FIGS. 2 to 4, a direction opposite to the direction of the arrow B is defined as a left direction, and a side of the magnetic tape cartridge 12 in the left direction is defined as a left side of the magnetic tape cartridge 12. In the description of the structure to be shown below, "left" refers to the left side of the magnetic tape cartridge 12.

In addition, in the following description, for convenience of description, in FIGS. 2 to 4, a direction perpendicular to the direction of the arrow A and to the direction of the arrow B is indicated by an arrow C, a direction of the arrow C is defined as an upper direction of the magnetic tape cartridge 12, and a side of the magnetic tape cartridge 12 in the upper direction is defined as an upper side of the magnetic tape cartridge 12. In the description of the structure to be shown below, "upper" refers to the upper side of the magnetic tape cartridge 12.

In addition, in the following description, for convenience of description, in FIGS. 2 to 4, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the description of the structure to be shown below, "rear" refers to the rear side of the magnetic tape cartridge 12.

In addition, in the following description, for convenience of description, in FIGS. 2 to 4, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the description of the structure to be shown below, "lower" refers to the lower side of the magnetic tape cartridge 12.

As shown in FIG. 2 as an example, the magnetic tape cartridge 12 has a substantially rectangular shape in a plan view and comprises a box-like case 16. The magnetic tape MT is accommodated in the case 16. The case 16 is an example of a "case" according to the technology of the present disclosure.

A sending reel 22 is rotatably accommodated inside the case 16. The magnetic tape MT is wound around the sending reel 22. An opening 16A1 is formed on the front side of a right wall 16A of the case 16. The magnetic tape MT is extracted from the opening 16A1.

In the case 16, a cartridge memory 24 is accommodated as a storage medium other than the magnetic tape MT. An IC chip having an NVM is mounted in the cartridge memory 24. In the present embodiment, a so-called passive type RFID tag is employed as the cartridge memory 24, and reading and writing of various kinds of information (that is, storage and acquisition of the various kinds of information) are performed with respect to the cartridge memory 24 in a non-contact manner.

In the cartridge memory 24, management information 15 for managing the magnetic tape cartridge 12 is stored. The management information 15 includes, for example, information on the cartridge memory 24, information on the magnetic tape MT, information on the magnetic tape system 10, information on the magnetic tape drive 14, and the like.

Figure 3:
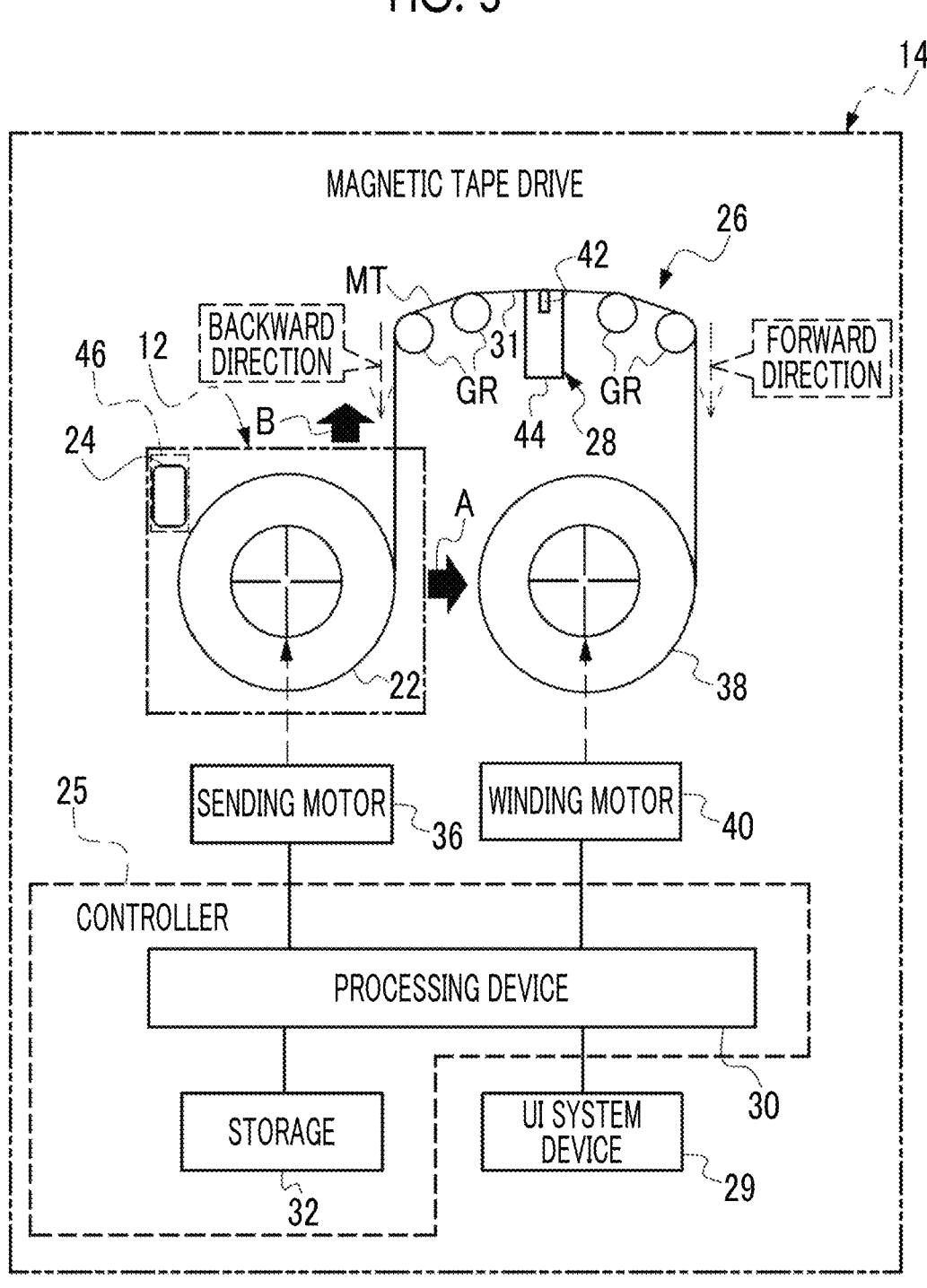
FIG. 3 is a schematic configuration diagram showing an example of a hardware configuration of a magnetic tape drive.

As shown in FIG. 3 as an example, the magnetic tape drive 14 comprises a controller 25, a transport device 26, a magnetic head 28, and a UI system device 29. The controller 25 comprises a processing device 30 and a storage 32. In the present embodiment, the magnetic head 28 is an example of a "magnetic head" according to the technology of the present disclosure.

The magnetic tape cartridge 12 is loaded into the magnetic tape drive 14 along the direction of the arrow A. In the magnetic tape drive 14, the magnetic tape MT is extracted from the magnetic tape cartridge 12 and used. The magnetic tape drive 14 uses the management information 15 or the like stored in the cartridge memory 24 to control each unit provided in the magnetic tape cartridge 12 and the magnetic tape drive 14.

The magnetic tape drive 14 performs magnetic processing on a front surface 31 of the magnetic tape MT by using the magnetic head 28 in a state in which the magnetic tape MT is traveling. The front surface 31 is a recording surface where data is recorded. The magnetic processing refers to a recording processing in which the magnetic head 28 records data onto the front surface 31, which is a surface of the magnetic tape MT having the magnetic layer, and a reproducing processing (that is, processing of reading data) in which the magnetic head 28 reproduces data from the front surface 31 of the magnetic tape MT. In the present embodiment, the magnetic tape drive 14 selectively performs the recording processing and the reproducing processing by using the magnetic head 28. That is, the magnetic tape drive 14 extracts the magnetic tape MT from the magnetic tape cartridge 12, and records data onto the front surface 31 of the extracted magnetic tape MT by using the magnetic head 28 or reproduces data from the front surface 31 of the extracted magnetic tape MT by using the magnetic head 28. In the present embodiment, the front surface 31 is an example of a "recording surface" according to the technology of the present disclosure.

The processing device 30 controls entirety of the magnetic tape drive 14. In the present embodiment, although the processing device 30 is realized by an ASIC, the technology of the present disclosure is not limited thereto. For example, the processing device 30 may be realized by an FPGA and/or a PLD. In addition, the processing device 30 may be realized by a computer including a CPU, a flash memory (for example, an EEPROM, an SSD, and/or the like), and a RAM. In addition, the processing device 30 may be realized by combining two or more of an ASIC, an FPGA, a PLD, and a computer. That is, the processing device 30 may be realized by a combination of a hardware configuration and a software configuration.

The storage 32 is connected to the processing device 30, and the processing device 30 performs writing of various kinds of information to the storage 32 and reading of various kinds of information from the storage 32. An example of the storage 32 includes a flash memory and/or an HDD. The flash memory and the HDD are merely examples, and any memory may be used as long as the memory is a non-volatile memory that can be mounted in the magnetic tape drive 14.

The UI system device 29 is a device having an acceptance function of accepting an instruction signal indicating an instruction from a user, and a presentation function of presenting information to the user. The acceptance function is implemented by, for example, a touch panel, a hard key (for example, a keyboard), and/or a mouse. The presentation function is implemented by, for example, a display, a printer, and/or a speaker. The UI system device 29 is connected to the processing device 30. The processing device 30 acquires the instruction signal accepted by the UI system device 29. The UI system device 29 presents various kinds of information to the user, under the control of the processing device 30.

The transport device 26 is a device that selectively transports the magnetic tape MT along a predetermined path in a forward direction and a backward direction, and comprises a sending motor 36, a winding reel 38, a winding motor 40, and a plurality of guide rollers GR. It should be noted that, here, the forward direction refers to a sending direction of the magnetic tape MT, and the backward direction refers to a rewinding direction of the magnetic tape MT.

The sending motor 36 rotates the sending reel 22 provided in the magnetic tape cartridge 12, under the control of the processing device 30. The processing device 30 controls the sending motor 36 to control a rotation direction, a rotation speed, a rotation torque, and the like of the sending reel 22.

The winding motor 40 rotates the winding reel 38, under the control of the processing device 30. The processing device 30 controls the winding motor 40 to control a rotation direction, a rotation speed, a rotation torque, and the like of the winding reel 38.

In a case in which the magnetic tape MT is to be wound onto the winding reel 38, the processing device 30 rotates the sending motor 36 and the winding motor 40 such that the magnetic tape MT travels along the predetermined path in the forward direction. The rotation speeds, the rotation torques, and the like of the sending motor 36 and the winding motor 40 are adjusted according to a speed at which the magnetic tape MT is wound onto the winding reel 38. In addition, by adjusting the rotation speed, the rotation torque, and the like of each of the sending motor 36 and the winding motor 40 through the processing device 30, tension is applied to the magnetic tape MT. Additionally, the tension applied to the magnetic tape MT is controlled by adjusting the rotation speed, the rotation torque, and the like of each of the sending motor 36 and the winding motor 40 through the processing device 30.

In a case in which the magnetic tape MT is to be rewound onto the sending reel 22, the processing device 30 rotates the sending motor 36 and the winding motor 40 such that the magnetic tape MT travels along the predetermined path in the backward direction.

Each of the plurality of guide rollers GR is a roller that guides the magnetic tape MT. The predetermined path, that is, a traveling path of the magnetic tape MT is determined by separately disposing the plurality of guide rollers GR at positions straddling the magnetic head 28 between the magnetic tape cartridge 12 and the winding reel 38.

The magnetic head 28 comprises a magnetic element unit 42 and a holder 44. The magnetic element unit 42 is held by the holder 44 so as to come into contact with the traveling magnetic tape MT. The magnetic element unit 42 includes a plurality of magnetic elements.

The magnetic element unit 42 records data onto the magnetic tape MT transported by the transport device 26 or reproduces data from the magnetic tape MT transported by the transport device 26. Here, the data refers to, for example, a servo pattern 52 (see FIG. 6) and data other than the servo pattern 52 (that is, data recorded in a data band DB (see FIG. 6)).

The magnetic tape drive 14 comprises a noncontact reading/writing device 46. The noncontact reading/writing device 46 is disposed to confront a back surface of the cartridge memory 24 on the lower side of the magnetic tape cartridge 12 in a state in which the magnetic tape cartridge 12 is loaded, and performs reading and writing of information with respect to the cartridge memory 24 in a non-contact manner.

Figure 4:
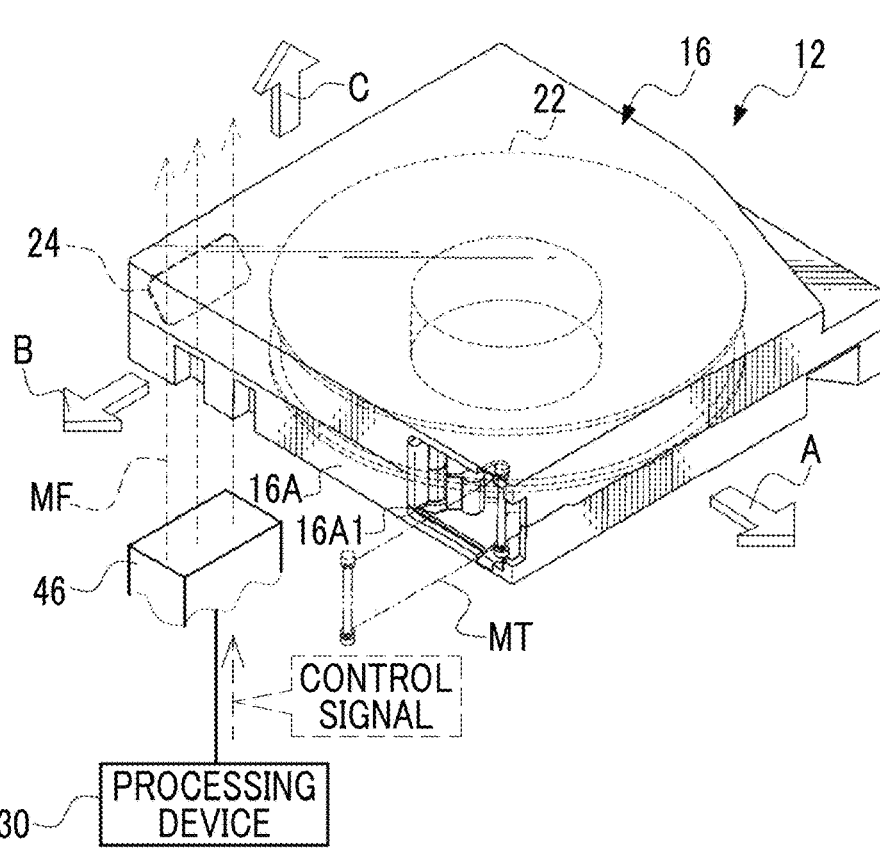
FIG. 4 is a schematic perspective view showing an example of an aspect in which a magnetic field is released by a noncontact reading/writing device from a lower side of the magnetic tape cartridge.

As shown in FIG. 4 as an example, the noncontact reading/writing device 46 releases a magnetic field MF from the lower side of the magnetic tape cartridge 12 toward the cartridge memory 24. The magnetic field MF passes through the cartridge memory 24.

The noncontact reading/writing device 46 is connected to the processing device 30. The processing device 30 outputs a control signal to the noncontact reading/writing device 46. The control signal is a signal for controlling the cartridge memory 24. The noncontact reading/writing device 46 generates the magnetic field MF in response to the control signal input from the processing device 30, and releases the generated magnetic field MF toward the cartridge memory 24.

The noncontact reading/writing device 46 performs processing on the cartridge memory 24 in response to the control signal by performing noncontact communication with the cartridge memory 24 via the magnetic field MF. For example, the noncontact reading/writing device 46 selectively performs, under the control of the processing device 30, processing of reading the information from the cartridge memory 24 and processing of storing the information in the cartridge memory 24 (that is, processing of writing the information to the cartridge memory 24). In other words, the processing device 30 reads the information from the cartridge memory 24 and stores the information in the cartridge memory 24 by performing communication with the cartridge memory 24 via the noncontact reading/writing device 46 in a non-contact manner.

Figure 5:
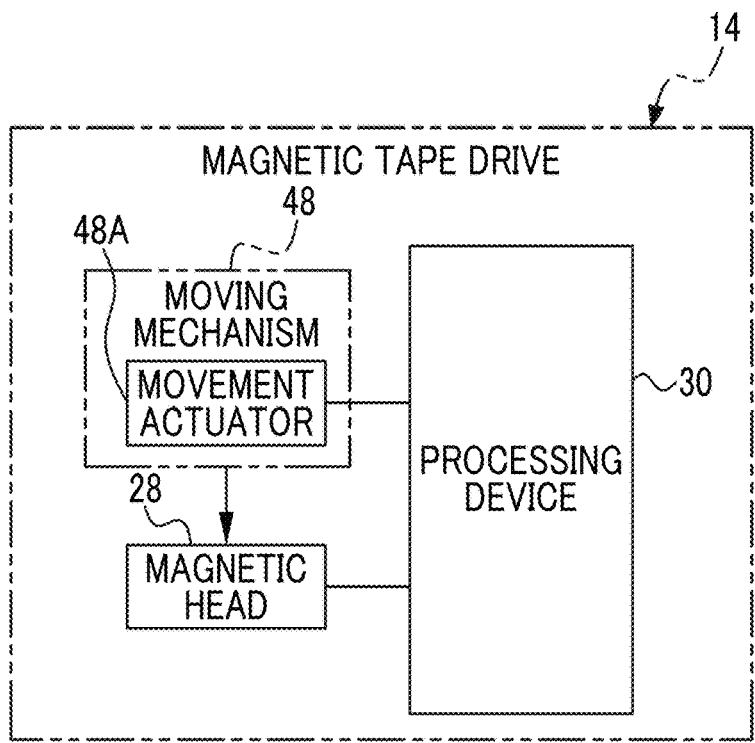
FIG. 5 is a conceptual diagram showing an example of a correlation between a processing device, a moving mechanism, and a magnetic head.

As shown in FIG. 5 as an example, the processing device 30 is connected to the magnetic head 28 and controls processing using the magnetic field MF (see FIG. 4) by the magnetic head 28 (for example, the above-mentioned magnetic processing). The magnetic tape drive 14 comprises a moving mechanism 48. The processing device 30 is connected to the magnetic head 28 via the moving mechanism 48. The processing device 30 controls the movement of the magnetic head 28 via the moving mechanism 48 (for example, the movement of the magnetic tape MT in the width direction WD (see FIG. 6)).

The moving mechanism 48 includes a movement actuator 48A. Examples of the movement actuator 48A include a voice coil motor and/or a piezo actuator. The movement actuator 48A is connected to the processing device 30, and the processing device 30 controls the movement actuator 48A. The movement actuator 48A generates power under the control of the processing device 30. The moving mechanism 48 moves the magnetic head 28 in a width direction WD (see FIG. 6) of the magnetic tape MT by receiving the power generated by the movement actuator 48A.

Figure 6:
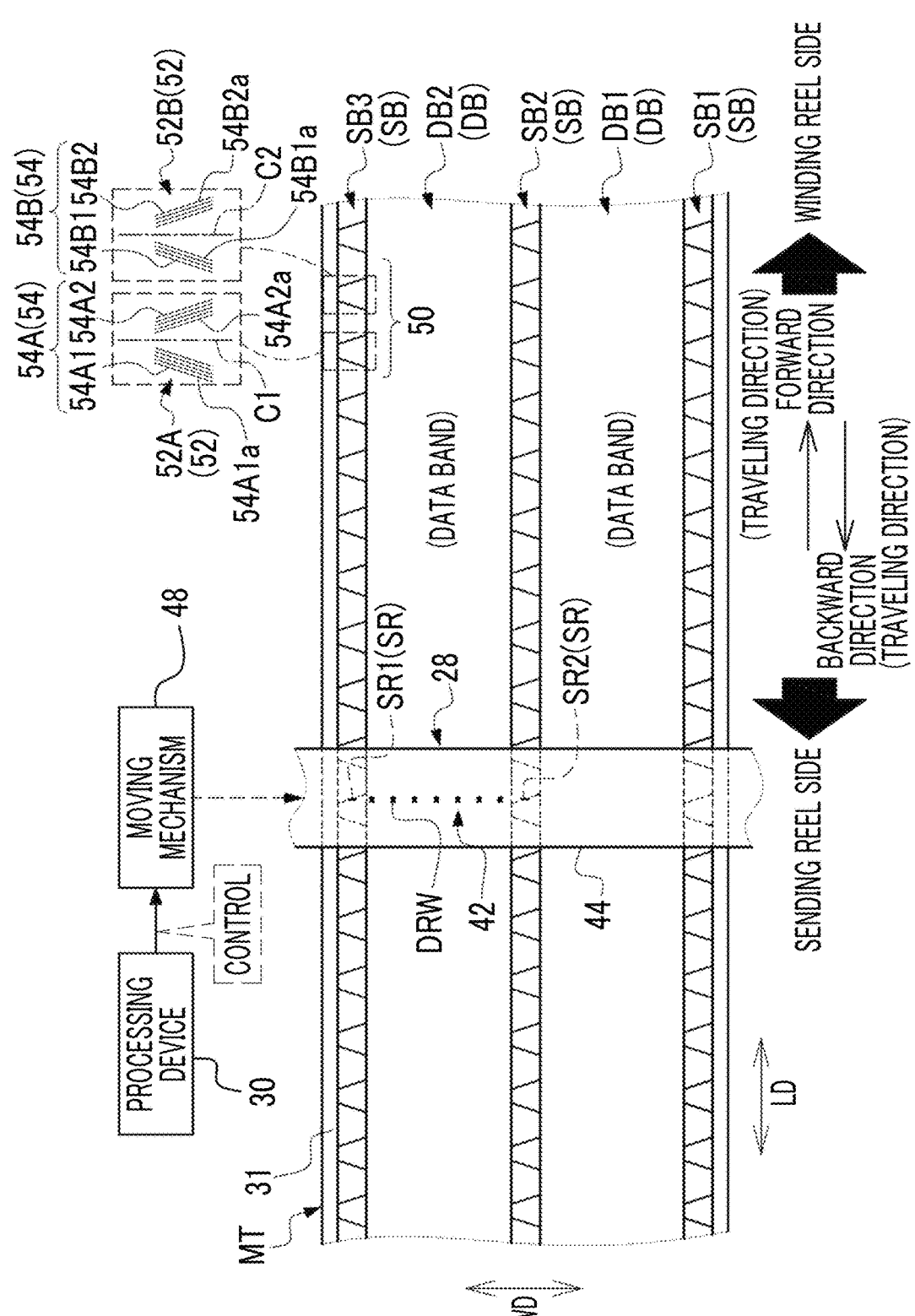
FIG. 6 is a conceptual diagram showing an example of an aspect in which a state in which the magnetic head is positioned on the magnetic tape is observed from a front surface side of the magnetic tape.

As shown in FIG. 6 as an example, on the front surface 31 of the magnetic tape MT, servo bands SB1, SB2, and SB3 and data bands DB1 and DB2 are formed. In the present embodiment, the servo bands SB1, SB2, and SB3 are examples of a "plurality of servo bands" according to the technology of the present disclosure. In the following, for convenience of description, in a case in which the distinction is not specifically needed, the servo bands SB1 to SB3 are referred to as a "servo band SB" and the data bands DB1 and DB2 are referred to as a "data band DB".

The servo bands SB1 to SB3 and the data bands DB1 and DB2 are formed along the longitudinal direction LD (that is, a total length direction) of the magnetic tape MT. Here, the longitudinal direction LD refers to the traveling direction of the magnetic tape MT, in other words. The traveling direction of the magnetic tape MT is defined in two directions of the forward direction which is a direction in which the magnetic tape MT travels from the sending reel 22 side to the winding reel 38 side (hereinafter, also simply referred to as a "forward direction"), and the backward direction which is a direction in which the magnetic tape MT travels from the winding reel 38 side to the sending reel 22 side (hereinafter, also simply referred to as a "backward direction"). In the present embodiment, the longitudinal direction LD is an example of a "longitudinal direction" and a "first longitudinal direction" according to the technology of the present disclosure.

The servo bands SB1 to SB3 are arranged at positions spaced in the width direction WD of the magnetic tape MT (hereinafter, also simply referred to as a "width direction WD"). For example, the servo bands SB1 to SB3 are arranged at equal intervals along the width direction WD. In the present embodiment, the term "equal intervals" refers to equal intervals in the sense of including, in addition to a completely equal interval, an error that is generally acceptable in the technical field to which the technology of the present disclosure belongs, and that does not contradict the purpose of the technology of the present disclosure. In addition, in the present embodiment, the width direction WD is an example of a "width direction" according to the technology of the present disclosure.

The data band DB1 is disposed between the servo band SB1 and the servo band SB2, and the data band DB2 is disposed between the servo band SB2 and the servo band SB3. That is, the servo bands SB and the data bands DB are arranged alternately along the width direction WD.

In the example shown in FIG. 6, for convenience of description (in order to facilitate understanding of the technology of the present disclosure), three servo bands SB and two data bands DB are shown, but these are merely examples, and two servo bands SB and one data band DB may be used, and the technology of the present disclosure is established even in a case in which four or more servo bands SB and three or more data bands DB are used.

A plurality of servo patterns 52 are recorded in the servo band SB along the longitudinal direction LD. The servo patterns 52 are classified into a servo pattern 52A and a servo pattern 52B. The plurality of servo patterns 52 are disposed at regular intervals along the longitudinal direction LD. In the present embodiment, the term "regular" refers to the regularity in the sense of including, in addition to the exact regularity, an error that is generally acceptable in the technical field to which the technology of the present disclosure belongs, and that does not contradict the purpose of the technology of the present disclosure.

The servo band SB is divided by a plurality of frames 50 along the longitudinal direction LD. The frame 50 is defined by a set of servo patterns 52. In the example shown in FIG. 6, the servo patterns 52A and 52B are shown as an example of the set of servo patterns 52. The servo patterns 52A and 52B are adjacent to each other along the longitudinal direction LD, and the servo pattern 52A is positioned on the upstream side in the forward direction, and the servo pattern 52B is positioned on the downstream side in the forward direction in the frame 50.

The servo pattern 52 consists of linear magnetization region pairs 54. The linear magnetization region pair 54 is classified into a linear magnetization region pair 54A and a linear magnetization region pair 54B.

The servo pattern 52A consists of the linear magnetization region pair 54A. In the example shown in FIG. 6, a pair of linear magnetization regions 54A1 and 54A2 is shown as an example of the linear magnetization region pair 54A. Each of the linear magnetization regions 54A1 and 54A2 is a linearly magnetized region.

The linear magnetization regions 54A1 and 54A2 are inclined in opposite directions with respect to an imaginary straight line C1 which is an imaginary straight line along the width direction WD. In the example shown in FIG. 6, the linear magnetization regions 54A1 and 54A2 are inclined line-symmetrically with respect to the imaginary straight line C1. More specifically, the linear magnetization regions 54A1 and 54A2 are formed in a state of being not parallel to each other and being inclined at a predetermined angle (for example, 5 degrees) in opposite directions on the longitudinal direction LD side with the imaginary straight line C1 as a symmetry axis.

The linear magnetization region 54A1 is a set of magnetization straight lines 54A1a, which are five magnetized straight lines. The linear magnetization region 54A2 is a set of magnetization straight lines 54A2a, which are five magnetized straight lines.

The servo pattern 52B consists of the linear magnetization region pair 54B. In the example shown in FIG. 6, a pair of linear magnetization regions 54B1 and 54B2 is shown as an example of the linear magnetization region pair 54B. Each of the linear magnetization regions 54B1 and 54B2 is a linearly magnetized region.

The linear magnetization regions 54B1 and 54B2 are inclined in opposite directions with respect to an imaginary straight line C2 which is an imaginary straight line along the width direction WD. In the example shown in FIG. 6, the linear magnetization regions 54B1 and 54B2 are inclined line-symmetrically with respect to the imaginary straight line C2. More specifically, the linear magnetization regions 54B1 and 54B2 are formed in a state of being not parallel to each other and being inclined at a predetermined angle (for example, 5 degrees) in opposite directions on the longitudinal direction LD side with the imaginary straight line C2 as a symmetry axis.

The linear magnetization region 54B1 is a set of magnetization straight lines 54B1a, which are four magnetized straight lines. The linear magnetization region 54B2 is a set of magnetization straight lines 54B2a, which are four magnetized straight lines.

The magnetic head 28 is disposed on the front surface 31 side of the magnetic tape MT configured as described above. The holder 44 is formed in a rectangular parallelepiped shape, and is disposed to cross the front surface 31 of the magnetic tape MT along the width direction WD. The plurality of magnetic elements of the magnetic element unit 42 are arranged linearly along the longitudinal direction of the holder 44. The magnetic element unit 42 has a pair of servo reading elements SR and a plurality of data recording/reproducing elements DRW, as a plurality of magnetic elements.

A length of the holder 44 in the longitudinal direction is sufficiently long with respect to the width of the magnetic tape MT. For example, the length of the holder 44 in the longitudinal direction is set to a length exceeding the width of the magnetic tape MT even in a case in which the magnetic element unit 42 is disposed at any position on the magnetic tape MT.

The pair of servo reading elements SR is mounted on the magnetic head 28. In the magnetic head 28, a relative positional relationship between the holder 44 and the pair of servo reading elements SR is fixed. The pair of servo reading elements SR consists of servo reading elements SR1 and SR2. The servo reading element SR1 is disposed at one end of the magnetic element unit 42, and the servo reading element SR2 is disposed at the other end of the magnetic element unit 42. In the example shown in FIG. 6, the servo reading element SR1 is provided at a position corresponding to the servo band SB3, and the servo reading element SR2 is provided at a position corresponding to the servo band SB2.

The plurality of data recording/reproducing elements DRW are disposed linearly between the servo reading element SR1 and the servo reading element SR2. The plurality of data recording/reproducing elements DRW are disposed at intervals along the longitudinal direction of the magnetic head 28 (for example, are disposed at equal intervals along the longitudinal direction of the magnetic head 28). In the example shown in FIG. 6, the longitudinal direction of the magnetic head 28, that is, the longitudinal direction of the holder 44 aligns with the width direction WD. In addition, in the example shown in FIG. 6, the plurality of data recording/reproducing elements DRW are provided at positions corresponding to the data band DB2.

The processing device 30 acquires a servo pattern signal which is a result of reading the servo pattern 52 by the servo reading element SR, and performs a servo control in response to the acquired servo pattern signal. In the present embodiment, the servo pattern signal is an example of a "signal" according to the technology of the present disclosure.

Here, the servo control refers to a control of moving the magnetic head 28 in the width direction WD of the magnetic tape MT by operating the moving mechanism 48 in accordance with the servo pattern 52 read by the servo reading element SR.

By performing the servo control, the plurality of data recording/reproducing elements DRW are positioned on a designated region in the data band DB, and perform the magnetic processing on the designated region in the data band DB in this state. In the example shown in FIG. 6, the plurality of data recording/reproducing elements DRW perform the magnetic processing on the designated region in the data band DB2.

In addition, in a case in which the data band DB of which the data is to be read by the magnetic element unit 42 is changed (in the example shown in FIG. 6, the data band DB of which the data is to be read by the magnetic element unit 42 is changed from the data band DB2 to the data band DB1), the moving mechanism 48 moves, under the control of the processing device 30, the magnetic head 28 in the width direction WD to change the position of the pair of servo reading elements SR. That is, by moving the magnetic head 28 in the width direction WD, the moving mechanism 48 moves the servo reading element SR1 to a position corresponding to the servo band SB2 and moves the servo reading element SR2 to the position corresponding to the servo band SB1. As a result, the positions of the plurality of data recording/reproducing elements DRW are changed from on the data band DB2 to on the data band DB1, and the plurality of data recording/reproducing elements DRW perform the magnetic processing on the data band DB1.

Figure 7:
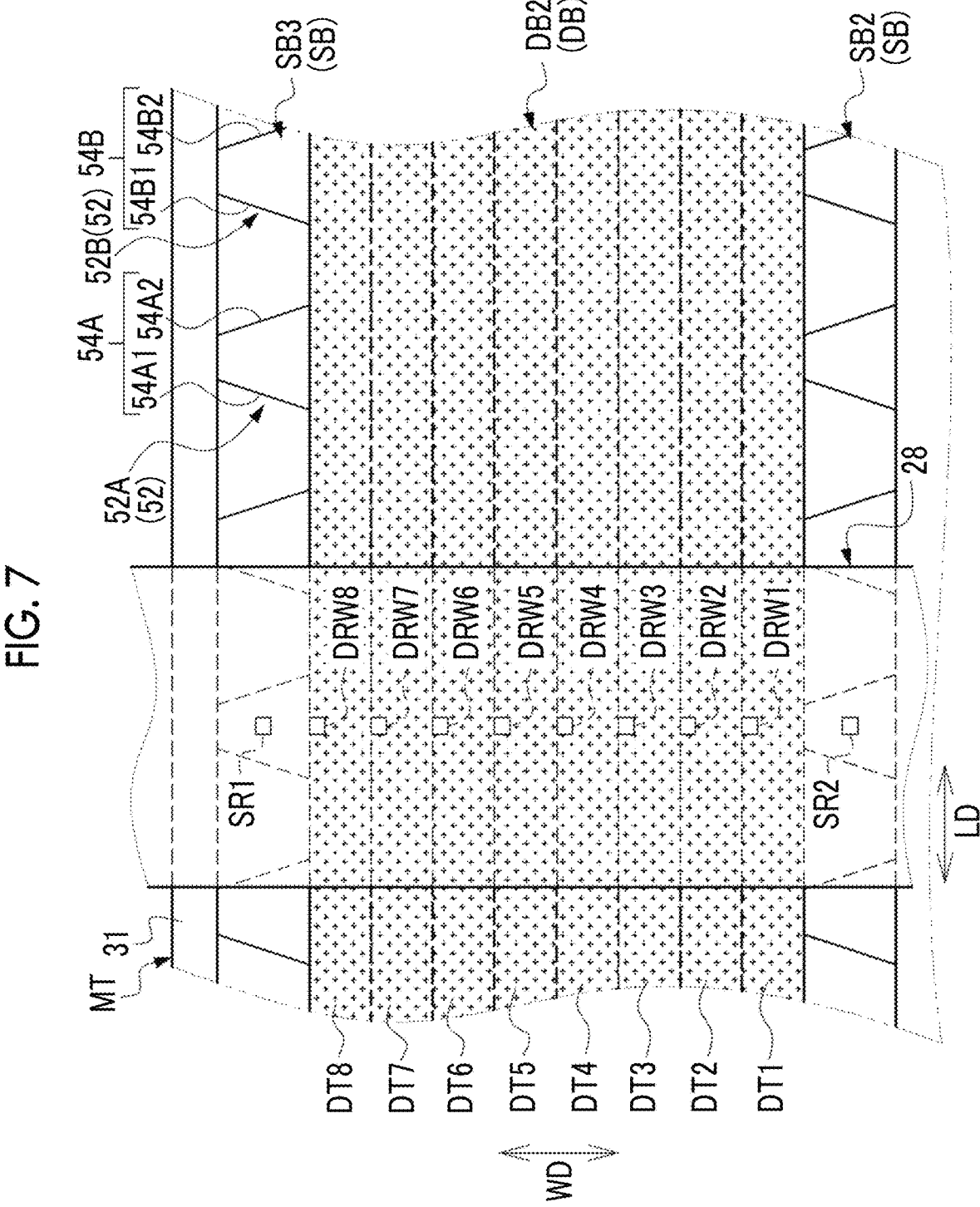
FIG. 7 is a conceptual diagram showing an example of a configuration of a data band formed on a front surface of the magnetic tape.

As shown in FIG. 7 as an example, in the data band DB2, as a plurality of divided areas obtained by dividing the data band DB2 in the width direction WD, data tracks DT1, DT2, DT3, DT4, DT5, DT6, DT7, and DT8 are formed from the servo band SB2 side to the servo band SB3 side.

The magnetic head 28 includes, as the plurality of data recording/reproducing elements DRW, data recording/reproducing elements DRW1, DRW2, DRW3, DRW4, DRW5, DRW6, DRW7, and DRW8 between the servo reading element SR1 and the servo reading element SR2 along the width direction WD. The data recording/reproducing elements DRW1 to DRW8 have a one-to-one correspondence with the data tracks DT1 to DT8, and can reproduce (that is, read) data from the data tracks DT1 to DT8 and record (that is, write) the data on the data tracks DT1 to DT8.

Hereinafter, in a case in which the distinction is not specifically needed, the data tracks DT1, DT2, DT3, DT4, DT5, DT6, DT7, and DT8 are referred to as a "data track DT". In addition, in the following, in a case in which the distinction is not specifically needed, the data recording/reproducing elements DRW1, DRW2, DRW3, DRW4, DRW5, DRW6, DRW7, and DRW8 are referred to as a "data recording/reproducing element DRW".

In addition, although not shown, a plurality of data tracks DT corresponding to the data tracks DT1, DT2, DT3, DT4, DT5, DT6, DT7, and DT8 are also formed in the data band DB1 (see FIG. 6).

Figure 8:
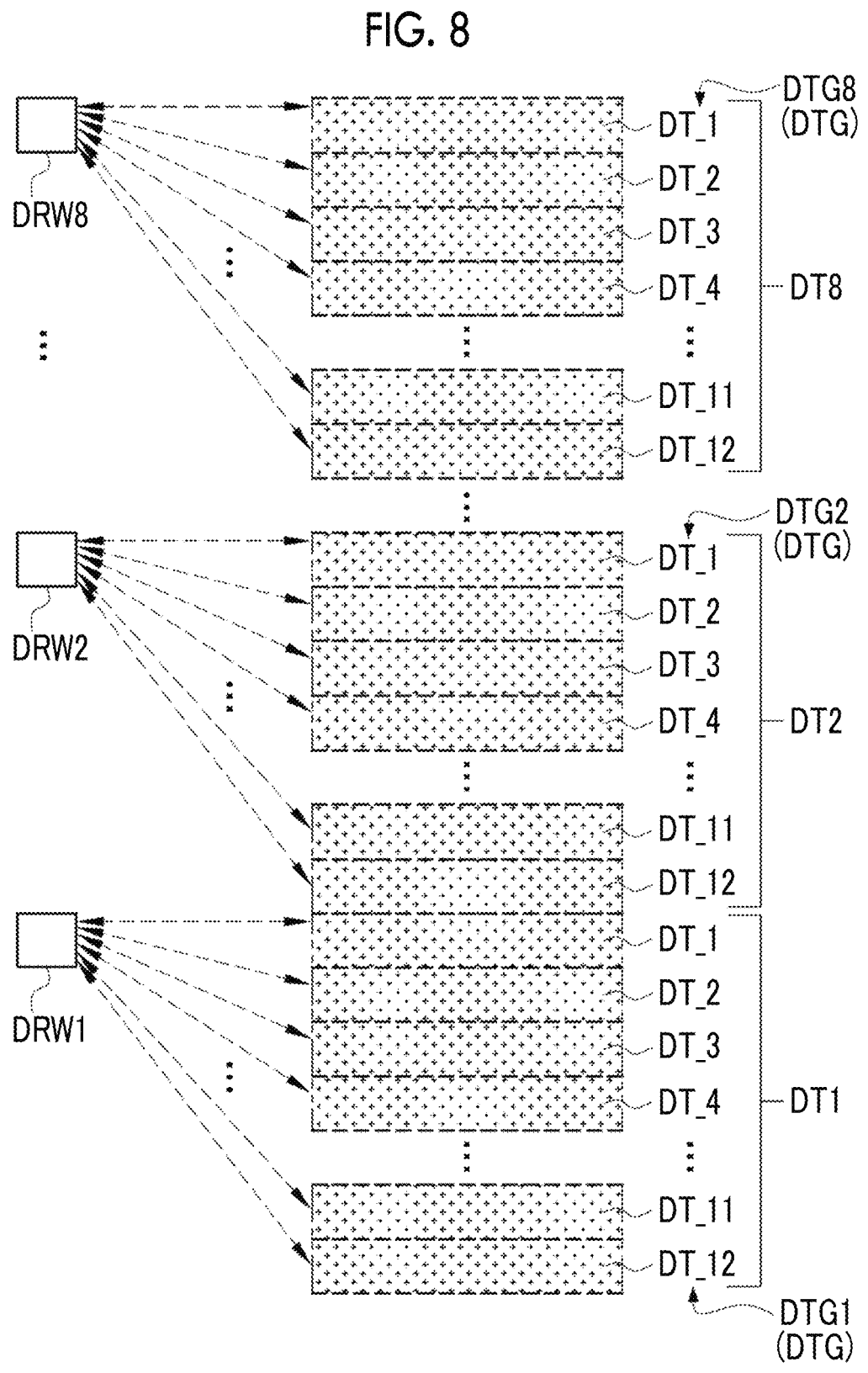

As shown in FIG. 8 as an example, the data track DT includes a divided data track group DTG. The data tracks DT1 to DT8 correspond to divided data track groups DTG1 to DTG8. In the following, in a case in which a particular distinction is not necessary for description, the divided data track groups DTG1 to DTG8 are referred to as a "divided data track group DTG". The divided data track group DTG1 is a set of a plurality of divided data tracks obtained by dividing the data track DT in the width direction WD. In the example shown in FIG. 8, as an example of the divided data track group DTG1, the divided data tracks DT_1, DT_2, DT_3, DT_4, . . . , DT_11, and DT_12 obtained by dividing the data track DT into 12 equal parts in the width direction WD are shown. The data recording/reproducing element DRW1 is responsible for the magnetic processing on the divided data track group DTG1. That is, the data recording/reproducing element DRW1 is responsible for recording data in the divided data tracks DT_1, DT_2, DT_3, DT_4, . . . , DT_11, and DT_12 and reproducing data from the divided data tracks DT_1, DT_2, DT_3, DT_4, . . . , DT_11, and DT_12. In the following, in a case in which it is not necessary to distinguish between the divided data tracks DT_1, DT_2, DT_3, DT_4, . . . , DT_11, and DT_12, the divided data tracks DT_1, DT_2, DT_3, DT_4, . . . , DT_11, and DT_12 are referred to as "divided data tracks DT_N".

Each of the data recording/reproducing elements DRW2 to DRW8 is also responsible for the magnetic processing on the divided data track group DTG of the data track DT corresponding to each data recording/reproducing element DRW, similarly to the data recording/reproducing element DRW1.

The data recording/reproducing element DRW is moved to a position corresponding to one designated data track DT among the plurality of data tracks DT with the movement of the magnetic head 28 in the width direction WD (that is, the movement along the longitudinal direction of the magnetic head 28) through the moving mechanism 48 (see FIG. 6). The data recording/reproducing element DRW is fixed at a position corresponding to one designated data track DT by a servo control using the servo pattern 52 (see FIGS. 6 and 7).

Figure 9:
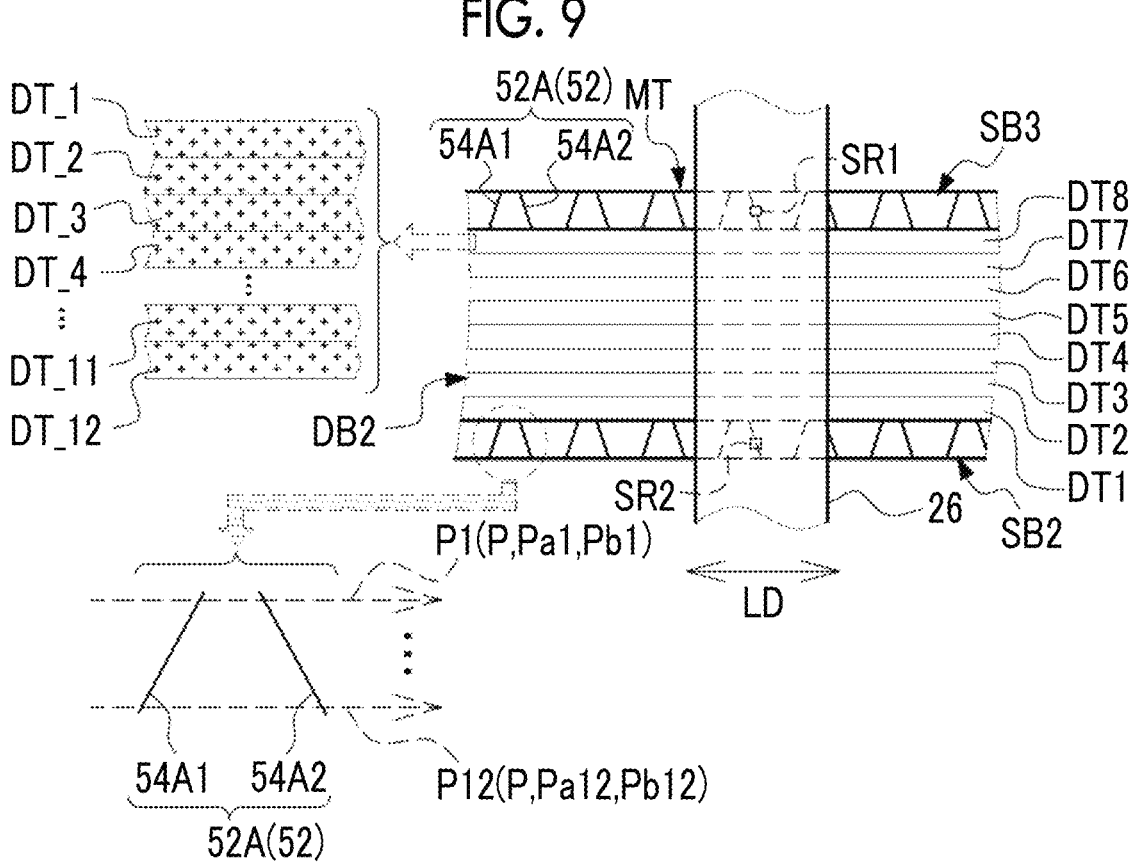
FIG. 9 is a conceptual diagram showing an example of an aspect in which a servo pattern is read by a servo reading element.

As shown in FIG. 9 as an example, in the servo pattern 52, paths P1 to P12 are assigned at equal intervals along the width direction WD. The paths P1 to P12 correspond to the plurality of divided data tracks DT_N (12 divided data tracks DT_N in the examples shown in FIGS. 8 and 9) included in the divided data track group DTG. The paths P1 to P12 are roughly classified into paths Pa1 to Pa12 used in a case of recording data and paths Pb1 to Pb12 used in a case of reproducing data. In the following description, in a case in which it is not necessary to distinguish between the paths P1 to P12, the paths P1 to P12 are referred to as a "path P".

In a case in which the data recording/reproducing element DRW performs the magnetic processing on the processing target divided data track which is the divided data track DT_N designated as a target of the magnetic processing, the moving mechanism 48 moves the magnetic head 28 in the width direction WD such that the servo reading element SR passes on the path P corresponding to the processing target divided data track. For example, in a case in which the data recording/reproducing element DRW performs the magnetic processing on the divided data track DT_1, the moving mechanism 48 moves the magnetic head 28 in the width direction WD such that the servo reading element SR passes through the path P1. In addition, for example, in a case in which the data recording/reproducing element DRW performs the magnetic processing on the divided data track DT_12, the moving mechanism 48 moves the magnetic head 28 in the width direction WD such that the servo reading element SR passes through the path P12. As a result, the data recording/reproducing element DRW1 can face the processing target divided data track and perform the magnetic processing on the processing target divided data track.

Figure 10:
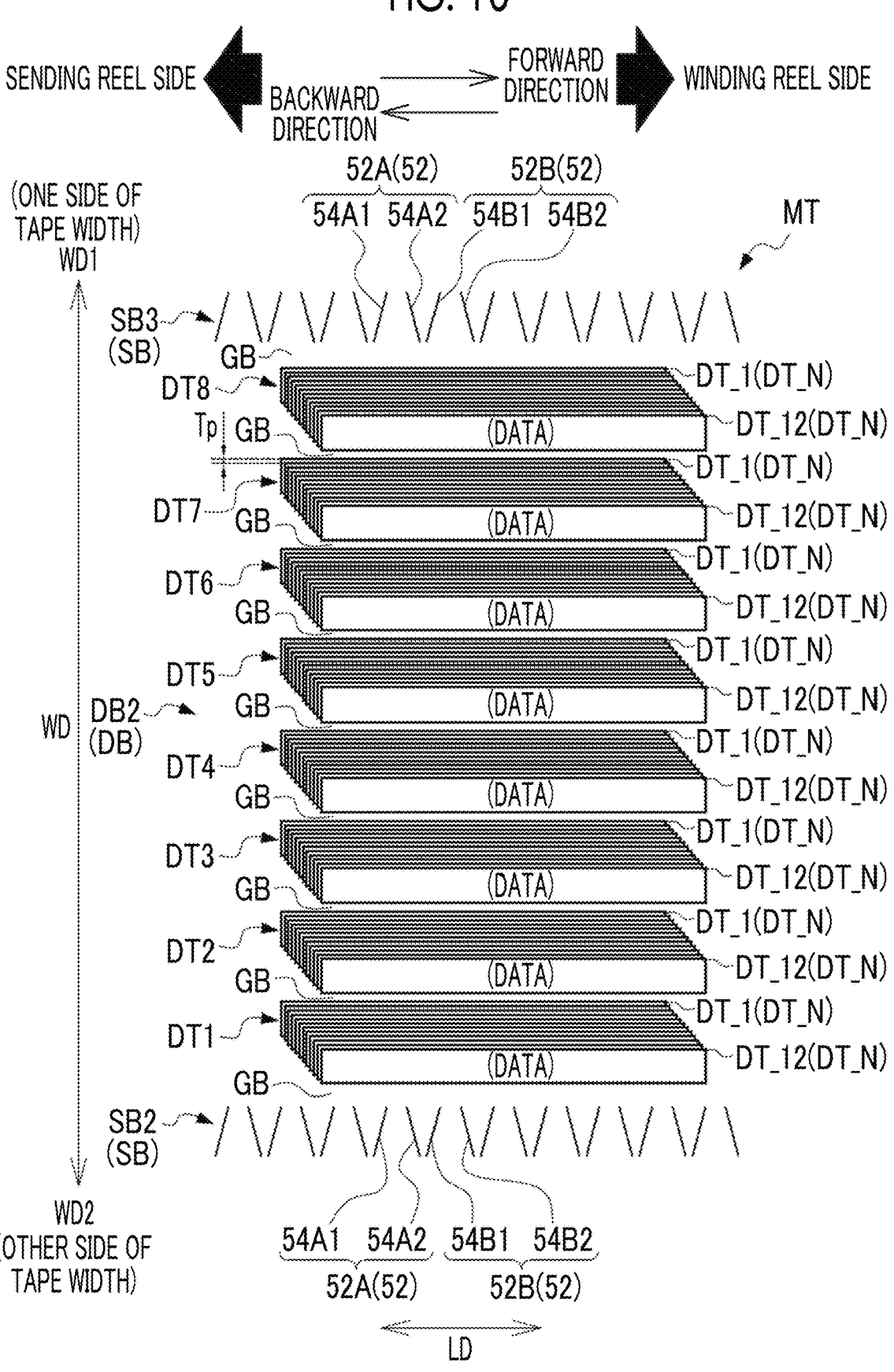
FIG. 10 is a conceptual diagram showing an example of an aspect of a data track formed by a plurality of divided data tracks being shifted and superimposed along a second direction by recording data on the front surface of the magnetic tape using an SMR method.

As shown in FIG. 10 as an example, all the divided data tracks DT_N (here, as an example, 12 divided data tracks DT_N) forming one data track DT are formed by recording data on the magnetic tape MT by the data recording/reproducing element DRW using an SMR method. The SMR method is a magnetic recording method for increasing the density of data with respect to the magnetic tape MT, and is also referred to as a shingle recording method.

In the example shown in FIG. 10, the width direction WD is defined by a first direction WD1 which is a direction of one end side of the width of the magnetic tape MT and a second direction WD2 which is a direction of the other end side of the width of the magnetic tape MT. The second direction WD2 is a direction in which data is shifted on the magnetic tape MT by recording data on the magnetic tape MT using the SMR method. The plurality of divided data tracks DT_N for each data track DT are recorded on the magnetic tape MT so as to be shifted and to overlapped with each other along the second direction WD2. For one data track DT, the divided data tracks DT_N adjacent to each other in the width direction WD are shifted from each other by a constant pitch Tp in the width direction WD.

In the present embodiment, the plurality of divided data tracks DT_N for each data track DT are an example of a "plurality of tracks" according to the technology of the present disclosure. In addition, in the present embodiment, the pitch Tp is an example of a "track pitch" according to the technology of the present disclosure. In the example shown in FIG. 10, the divided data tracks DT_1 to DT_12 are shown to be intentionally shifted in the longitudinal direction LD for easy understanding of the disposition relationship of the divided data tracks DT_1 to DT_12. However, in reality, there is no shift in the longitudinal direction LD between the divided data tracks DT_1 to DT_12, and the divided data tracks DT_1 to DT_12 extend in the longitudinal direction LD.

Guard bands GB is formed between the data tracks DT in the width direction WD. The guard band GB is a blank region that is not used for recording and reproducing data. The guard band GB formed between the data tracks DT has a role of making it difficult for the influence of the magnetic processing on one data track DT of the adjacent data tracks DT to affect the other data track DT, due to, for example, a variation in the interval between the data recording/reproducing elements DRW (for example, a variation within a manufacturing tolerances).

In addition, guard bands GB are formed between the servo band SB and the data band DB in the width direction WD. The guard band GB between the servo band SB and the data band DB has a role of making it difficult for, for example, a magnetic influence of the servo reading element SR on the servo band SB to affect the data track DT or for a magnetic influence of the data recording/reproducing element DRW to affect the servo band SB.

Figure 11:
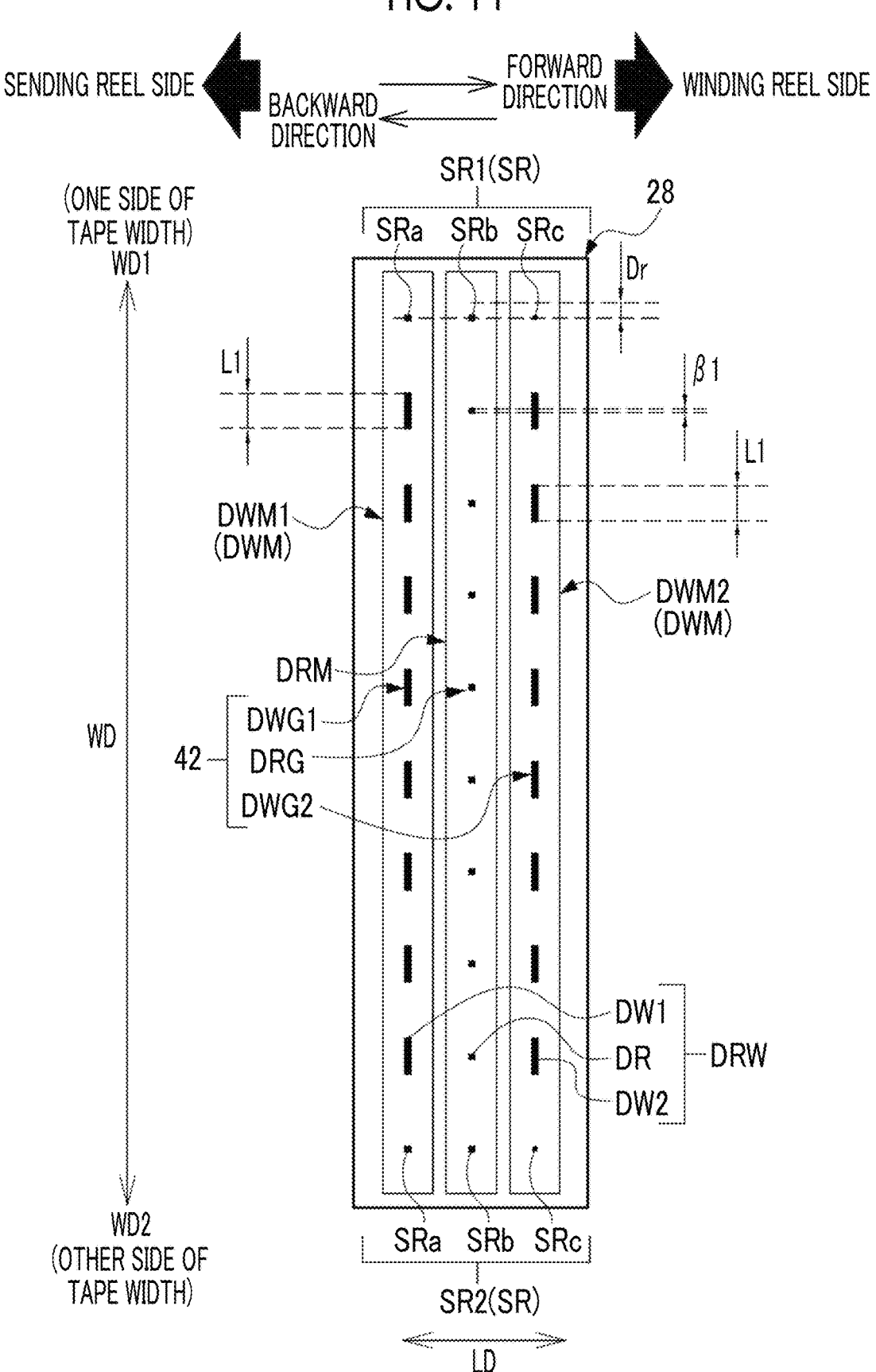
FIG. 11 is a conceptual diagram showing an example of an aspect of a first recording module, a reproducing module, and a second recording module provided in the magnetic head.

As shown in FIG. 11 as an example, the magnetic head 28 comprises a first recording module DWM1, a second recording module DWM2, and a reproducing module DRM. In the following description, for convenience of description, in a case in which it is not necessary to distinguish between the first recording module DWM1 and the second recording module DWM2, the first recording module DWM1 and the second recording module DWM2 will be referred to as a "recording module DWM".

The recording module DWM and the reproducing module DRM are disposed along the longitudinal direction LD (in other words, in the example shown in FIG. 11, the lateral direction of the magnetic head 28). For example, one recording module DWM is disposed on each of both sides of the reproducing module DRM in the longitudinal direction LD. In the example shown in FIG. 11, an aspect example of a front surface side of the magnetic head 28 in a case in which the magnetic head 28 shown in FIG. 3 is viewed from a direction opposite to the direction indicated by the arrow B in FIG. 3 is schematically shown, the first recording module DWM1 is disposed on the sending reel 22 (see FIG. 3) side of both sides of the reproducing module DRM in the longitudinal direction LD, and the second recording module DWM2 is disposed on the winding reel 38 (see FIG. 3) side of both sides of the reproducing module DRM in the longitudinal direction LD.

A magnetic element unit 42 is provided in the recording module DWM and the reproducing module DRM. The magnetic element unit 42 comprises a servo reading element SR1, a servo reading element SR2, a first data recording element group DWG1, a second data recording element group DWG2, and a data reproducing element group DRG. The first data recording element group DWG1 is provided in the first recording module DWM1. The second data recording element group DWG2 is provided in the second recording module DWM2. The data reproducing element group DRG is provided in the reproducing module DRM.

The servo reading element SR1 is positioned at one end of the magnetic element unit 42, and the servo reading element SR2 is positioned at the other end of the magnetic element unit 42.

The data recording/reproducing element DRW includes a first data recording element DW1, a second data recording element DW2, and a data reproducing element DR.

The first data recording element group DWG1 includes a plurality of first data recording elements DW1, and the plurality of first data recording elements DW1 are disposed linearly along the width direction WD (in other words, in the example shown in FIG. 11, the longitudinal direction of the magnetic head 28). The disposition direction of the plurality of first data recording elements DW1 is parallel to the front surface 31 of the magnetic tape MT and is parallel to the width direction WD (in other words, is perpendicular to the longitudinal direction LD).

The second data recording element group DWG2 includes a plurality of second data recording elements DW2, and the plurality of second data recording elements DW2 are disposed linearly along the width direction WD. The disposition direction of the plurality of second data recording elements DW2 is parallel to the front surface 31 of the magnetic tape MT and is parallel to the width direction WD (in other words, is perpendicular to the longitudinal direction LD).

The data reproducing element group DRG includes a plurality of data reproducing elements DR, and the plurality of data reproducing elements DR are disposed linearly along the width direction WD. The disposition direction of the plurality of data reproducing elements DR is parallel to the front surface 31 of the magnetic tape MT and is parallel to the width direction WD (in other words, is perpendicular to the longitudinal direction LD).

In the following description, for convenience of description, in a case in which it is not necessary to distinguish between the first data recording element DW1 and the second data recording element DW2, the first data recording element DW1 and the second data recording element DW2 will be referred to as a "data recording element DW". In the present embodiment, the data recording element DW is an example of a "recording element" according to the technology of the present disclosure.

The data recording element DW records data onto the data track DT. The data reproducing element DR reproduces data from the data track DT.

The first data recording element group DWG1, the second data recording element group DWG2, and the data reproducing element group DRG are arranged at constant intervals in the order of the first data recording element group DWG1, the data reproducing element group DRG, and the second data recording element group DWG2, from the winding reel 38 side to the sending reel 22 side along the longitudinal direction LD. Here, the constant interval refers to, for example, an interval predetermined by a test with a real machine and/or a computer simulation as an interval at which crosstalk does not occur between the data recording element DW and the data reproducing element DR.

The servo reading element SR has a first servo reading element SRa, a second servo reading element SRb, and a third servo reading element SRc. That is, each of the servo reading elements SR1 and SR2 includes a first servo reading element SRa, a second servo reading element SRb, and a third servo reading element SRc.

The first servo reading element SRa, the second servo reading element SRb, and the third servo reading element SRc are provided in the order of the first servo reading element SRa, the second servo reading element SRb, and the third servo reading element SRc from the sending reel 22 (see FIG. 3) side to the winding reel 38 (see FIG. 3) side in the longitudinal direction LD.

The first data recording element group DWG1 has a plurality of first data recording elements DW1. The first data recording element DW1 records data onto the corresponding data track DT among all the data tracks DT included in the data band DB.

The first recording module DWM1 is provided with a pair of first servo reading elements SRa, and the pair of first servo reading elements SRa are adjacent to each other in the width direction WD with a plurality of first data recording elements DW1 interposed therebetween. In the first recording module DWM1, a plurality of first data recording elements DW1 are disposed linearly and at equal intervals between one and the other of the pair of first servo reading elements SRa.

The number of the plurality of first data recording elements DW1 included in the first data recording element group DWG1 is the same as the number of the data tracks DT included in the data band DB. In the example shown in FIG. 11, eight first data recording elements DW1 are exemplified as the plurality of first data recording elements DW1, and the positions of the first data recording elements DW1 correspond to the positions of the data recording/reproducing elements DRW1, DRW2, DRW3, DRW4, DRW5, DRW6, DRW7, and DRW8 (see FIGS. 7 and 8).

The data reproducing element group DRG has a plurality of data reproducing elements DR. The data reproducing element DR reproduces data from the corresponding data track DT among all the data tracks DT included in the data band DB.

The reproducing module DRM is provided with a pair of second servo reading elements SRb, and the pair of second servo reading elements SRb are adjacent to each other in the width direction WD with a plurality of data reproducing elements DR interposed therebetween. In the reproducing module DRM, the plurality of data reproducing elements DR are disposed linearly and at equal intervals between one and the other of the pair of second servo reading elements SRb.

The number of the plurality of data reproducing elements DR included in the data reproducing element group DRG is the same as the number of the data tracks DT included in the data band DB. In the example shown in FIG. 11, eight data reproducing elements DR are exemplified as the plurality of data reproducing elements DR, and the positions of these data reproducing elements DR correspond to the positions of the data recording/reproducing elements DRW1, DRW2, DRW3, DRW4, DRW5, DRW6, DRW7, and DRW8 (see FIGS. 7 and 8).

The second data recording element group DWG2 includes a plurality of second data recording elements DW2. The second data recording element DW2 records data onto the corresponding data track DT among all the data tracks DT included in the data band DB.

The second recording module DWM2 is provided with a pair of third servo reading elements SRc, and the pair of third servo reading elements SRc are adjacent to each other in the width direction WD with a plurality of second data recording elements DW2 interposed therebetween. In the second recording module DWM2, a plurality of second data recording elements DW2 are disposed linearly and at equal intervals between one and the other of the pair of third servo reading elements SRc.

The number of the plurality of second data recording elements DW2 included in the second data recording element group DWG2 is the same as the number of the data tracks DT included in the data band DB. In the example shown in FIG. 11, eight second data recording elements DW2 are exemplified as the plurality of second data recording elements DW2, and the positions of the second data recording elements DW2 correspond to the positions of the data recording/reproducing elements DRW1, DRW2, DRW3, DRW4, DRW5, DRW6, DRW7, and DRW8 (see FIGS. 7 and 8).

Here, an example of a geometric relationship between the data recording element DW and the data reproducing element DR included in the data recording/reproducing element DRW corresponding to one data track DT will be described.

In the magnetic head 28 on the magnetic tape MT, the center position of the data recording element DW and the center position of the data reproducing element DR, which are included in the data recording/reproducing element DRW corresponding to one data track DT, aligns with each other in the width direction WD. Here, the center position of the data recording element DW refers to, for example, a center position of the data recording element DW in the width direction WD. In addition, the center position of the data reproducing element DR refers to, for example, a center position of the data reproducing element DR in the width direction WD. Here, the term "align" refers to, in addition to complete alignment, alignment in the sense of including error that is error generally allowed in the technical field to which the disclosed technology belongs and that is of a degree not contradicting the gist of the disclosed technology.

In the present embodiment, the center position of the data recording element DW aligns with the center position of the data reproducing element DR in the width direction WD, and this is also for realizing so-called "read while write". In the "read while write", in order to verify whether or not the data recorded during the recording operation on the magnetic tape MT is correctly recorded, in a case in which the magnetic tape MT is transported in the forward direction while the first recording module DWM1 records the data onto the magnetic tape MT in accordance with the servo pattern signal obtained by the first servo reading element SRa, the data is reproduced by the reproducing module DRM immediately after the transporting. Even in a case in which the magnetic tape MT is transported in the reverse direction and the data is recorded on the magnetic tape MT by the second recording module DWM2, "read while write" is performed between the second recording module DWM2 and the reproducing module DRM in the same manner.

In addition, in the data recording/reproducing element DRW corresponding to one data track DT, a length L1, which is a length of the data recording element DW in the width direction WD, is longer than a length β1, which is a length of the data reproducing element DR in the width direction WD, and is equal to or longer than twice the pitch Tp. In addition, the length β1 is less than the pitch Tp (see FIG. 10).

In the present embodiment, the length L1 is an example of a "recording element length" according to the technology of the present disclosure. In addition, in the present embodiment, the pitch Tp is an example of a "track pitch" according to the technology of the present disclosure.

After the data track DT (see FIG. 10) is formed by the first data recording element DW1 using the SMR method in accordance with the servo pattern signal obtained when the first servo reading element SRa reads the servo pattern 52, the data is reproduced from the divided data track DT_N (see FIG. 10) included in the data track DT by the data reproducing element DR. In this case, the data reproducing element DR reproduces the data from the divided data track DT_N in accordance with the servo pattern signal obtained when the second servo reading element SRb reads the servo pattern 52.

In a case in which the data track DT is formed using the SMR method, the adjacent divided data tracks DT_N overlap each other. Therefore, a region in which the data is reproduced by the data reproducing element DR is narrower in a case in which the data is reproduced by the data reproducing element DR than in a case in which the data is recorded by the first data recording element DW1. For example, in the example shown in FIG. 10, only a region of the pitch Tp in the divided data track DT_N is the data reproducing target region by the data reproducing element DR.

Since the position of the first servo reading element SRa and the position of the second servo reading element SRb are aligned in the width direction WD, in a case of reproducing data with respect to the data track DT formed by the SMR method (that is, in a case where the data reproducing element DR reproduces data from the divided data track DT_N), it is necessary to shift the position of the magnetic head 28 in the width direction WD by a distance Dr (={(length L1)−(pitch Tp)}/2) larger than the pitch Tp, as compared with a case where the data is recorded by the first data recording element DW1. That is, it is required to cause the second servo reading element SRb to read the servo pattern 52 on the path P shifted by a distance Dr in the width direction WD from the path P through which the first servo reading element SRa passes.

For example, in a case where the data is reproduced by the data reproducing element DR from the specific divided data track DT_N formed by recording the data by the data recording element DW, the first servo reading element SRa causes the second servo reading element SRb to read the servo pattern 52 on a path P deviated from the path P through which the first servo reading element SRa passes in the first direction WD1 by a distance Dr.

Next, an example of a manufacturing method of the magnetic tape MT will be described.

A manufacturing method of the magnetic tape MT includes a plurality of steps. The plurality of steps include a servo pattern recording step, a test step, and a winding step, and here, an example of the servo pattern recording step, the test step, and the winding step will be described with reference to FIG. 12.

Figure 12:
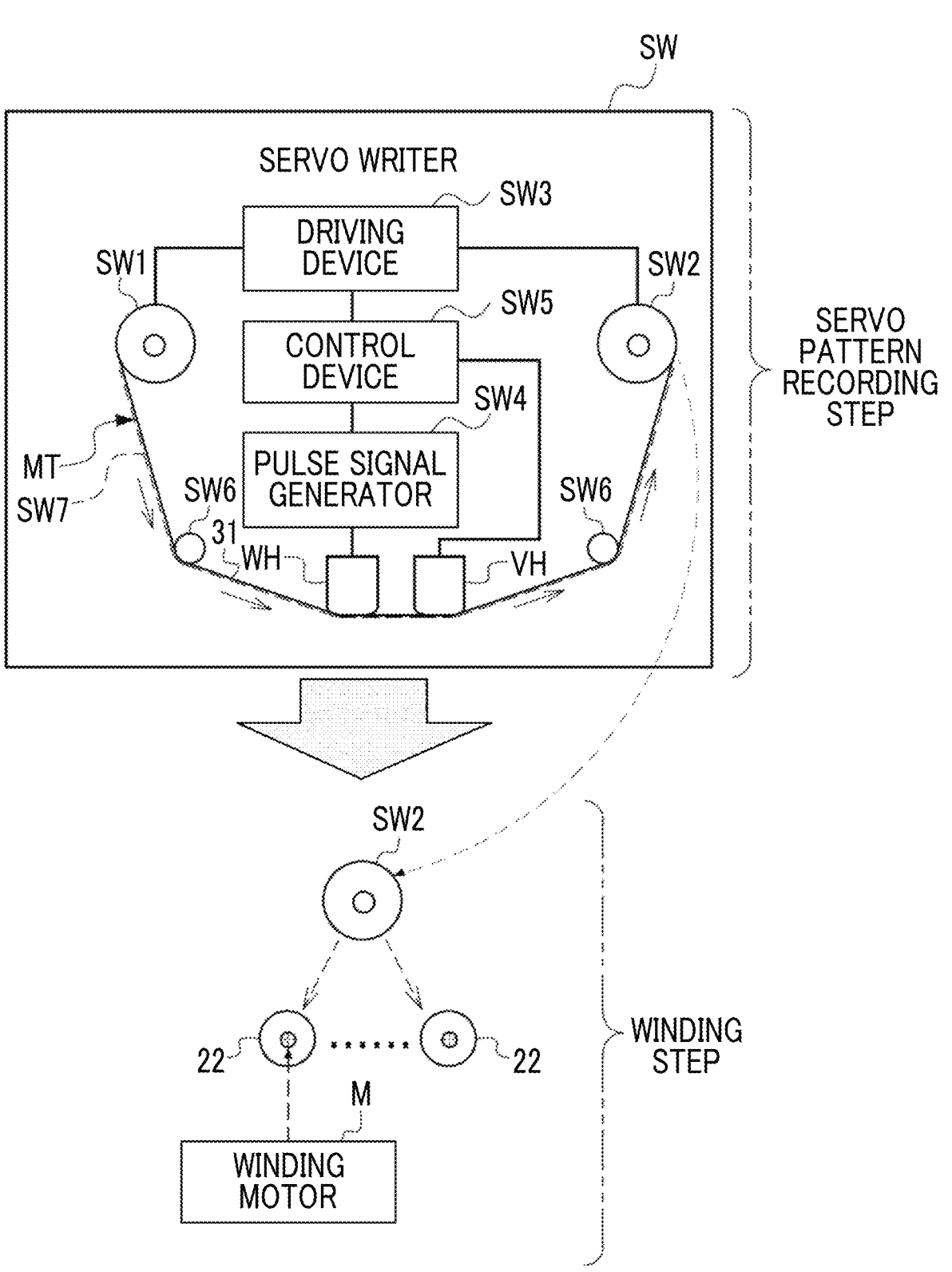
FIG. 12 is a conceptual diagram showing an example of a configuration of a servo writer.

As an example, as shown in FIG. 12, a servo writer SW is used in the servo pattern recording step. The servo writer SW comprises a sending reel SW1, a winding reel SW2, a driving device SW3, a pulse signal generator SW4, a control device SW5, a plurality of guides SW6, a transport path SW7, a servo pattern recording head WH, and a verification head VH. In the present embodiment, the servo pattern recording head WH is an example of a "servo write head" according to the technology of the present disclosure.

The control device SW5 controls the entire servo writer SW. In the present embodiment, although the control device SW5 is realized by an ASIC, the technology of the present disclosure is not limited to this. For example, the control device SW5 may be realized by an FPGA and/or a PLC. In addition, the control device SW5 may be realized by the computer including a CPU, a flash memory (for example, an EEPROM and/or an SSD), and a RAM. In addition, the control device SW5 may be realized by combining two or more of an ASIC, an FPGA, a PLC, and a computer. That is, the control device SW5 may be implemented by a combination of a hardware configuration and a software configuration.

A pancake is set in the sending reel SW1. The pancake refers to a large-diameter roll in which the magnetic tape MT cut into a product width from a wide web raw material before writing the servo pattern 52 is wound around a hub.

The driving device SW3 has a motor (not shown) and a gear (not shown), and is mechanically connected to the sending reel SW1 and the winding reel SW2. In a case where the magnetic tape MT is wound by the winding reel SW2, the driving device SW3 generates power in accordance with instructions from the control device SW5, and transmits the generated power to the sending reel SW1 and the winding reel SW2 to rotate the sending reel SW1 and the winding reel SW2. That is, the sending reel SW1 receives the power from the driving device SW3 and rotates to feed the magnetic tape MT to the predetermined transport path SW7. The winding reel SW2 receives the power from the driving device SW3 and rotates to wind the magnetic tape MT fed from the sending reel SW1. The rotation speed, the rotation torque, and the like of the sending reel SW1 and the winding reel SW2 are adjusted in accordance with a speed at which the magnetic tape MT is wound around the winding reel SW2.

The plurality of guides SW6 and the servo pattern recording head WH are disposed on the transport path SW7. The servo pattern recording head WH is disposed on the front surface 31 side of the magnetic tape MT between the plurality of guides SW6. The magnetic tape MT sent from the sending reel SW1 to the transport path SW7 is guided by the plurality of guides SW6 and is wound by the winding reel SW2 via the servo pattern recording head WH.

The pulse signal generator SW4 generates the pulse signal under the control of the control device SW5, and supplies the generated pulse signal to the servo pattern recording head WH. In a state in which the magnetic tape MT travels on the transport path SW7 at a constant speed, the servo pattern recording head WH forms the servo band SB on the magnetic tape MT by recording a plurality of servo patterns 52 along the longitudinal direction LD (see FIG. 6 and the like) in response to the pulse signal supplied from the pulse signal generator SW4 with respect to a region in which the formation of the servo band SB is scheduled in advance.

The test step is a step of testing the magnetic tape MT on which the servo band SB is formed. For example, in the test step, the servo band SB formed on the front surface 31 of the magnetic tape MT by the servo pattern recording head WH is tested. The test of the servo band SB refers to, for example, processing of determining whether the servo pattern 52 recorded on the servo band SB is correct or not. The determination of the correctness of the servo pattern 52 refers to, for example, a determination (that is, verification of the servo pattern 52) whether or not the servo patterns 52A and 52B are recorded in a predetermined portion of the front surface 31 without excess or deficiency of the magnetization straight lines 54A1*a*, 54A2*a*, 54B1*a*, and 54B2*a* and within an allowable error.

The test of the servo band SB is performed by using the control device SW5 and the verification head VH. The verification head VH is disposed on the downstream side of the servo pattern recording head WH in a transport direction of the magnetic tape MT. Similar to the magnetic head 28, the verification head VH includes a plurality of servo reading elements (not shown), and the plurality of servo bands SB are read by the plurality of servo reading elements.

The verification head VH is connected to the control device SW5. The verification head VH is disposed at a position facing the servo band SB as viewed from the front surface 31 side of the magnetic tape MT (that is, a rear surface side of the verification head VH), and reads the servo pattern 52 recorded on the servo band SB and outputs the reading result (hereinafter, referred to as "servo pattern reading result") to the control device SW5. The control device SW5 tests the servo band SB (for example, determines whether the servo pattern 52 is correct or not) based on the servo pattern reading result (for example, the servo pattern signal) input from the verification head VH.

The control device SW5 outputs information indicating the result of the test of the servo band SB (for example, the result of determining the correctness of the servo pattern 52) to a predetermined output destination (for example, a storage device incorporated in the servo writer SW, a display connected to the servo writer SW, and/or an external device connected to the servo writer SW in a communicable manner).

In a case in which the test step is ended (for example, in a case in which it is determined that the servo band SB is correctly formed on the magnetic tape MT in the test step), the winding step is performed. The winding step is a step of winding the magnetic tape MT around the sending reel 22 (that is, the sending reel 22 (see FIGS. 2 to 4) accommodated in the magnetic tape cartridge 12 (see FIGS. 1 to 4)) used for each of the plurality of magnetic tape cartridges 12 (see FIGS. 1 to 4). In the winding step, a winding motor Mis used. The winding motor M is mechanically connected to the sending reel 22 via a gear and the like. The winding motor M rotates the sending reel 22 by applying a rotational force to the sending reel 22 under the control of the control device (not shown). The magnetic tape MT wound around the winding reel SW2 is wound around the sending reel 22 by the rotation of the sending reel 22. In the winding step, a cutting device (not shown) is used. In a case where a required amount of the magnetic tape MT is wound around the sending reel 22 for each of the plurality of sending reels 22, the magnetic tape MT fed from the winding reel SW2 to the sending reel 22 is cut by the cutting device.

Figure 13:
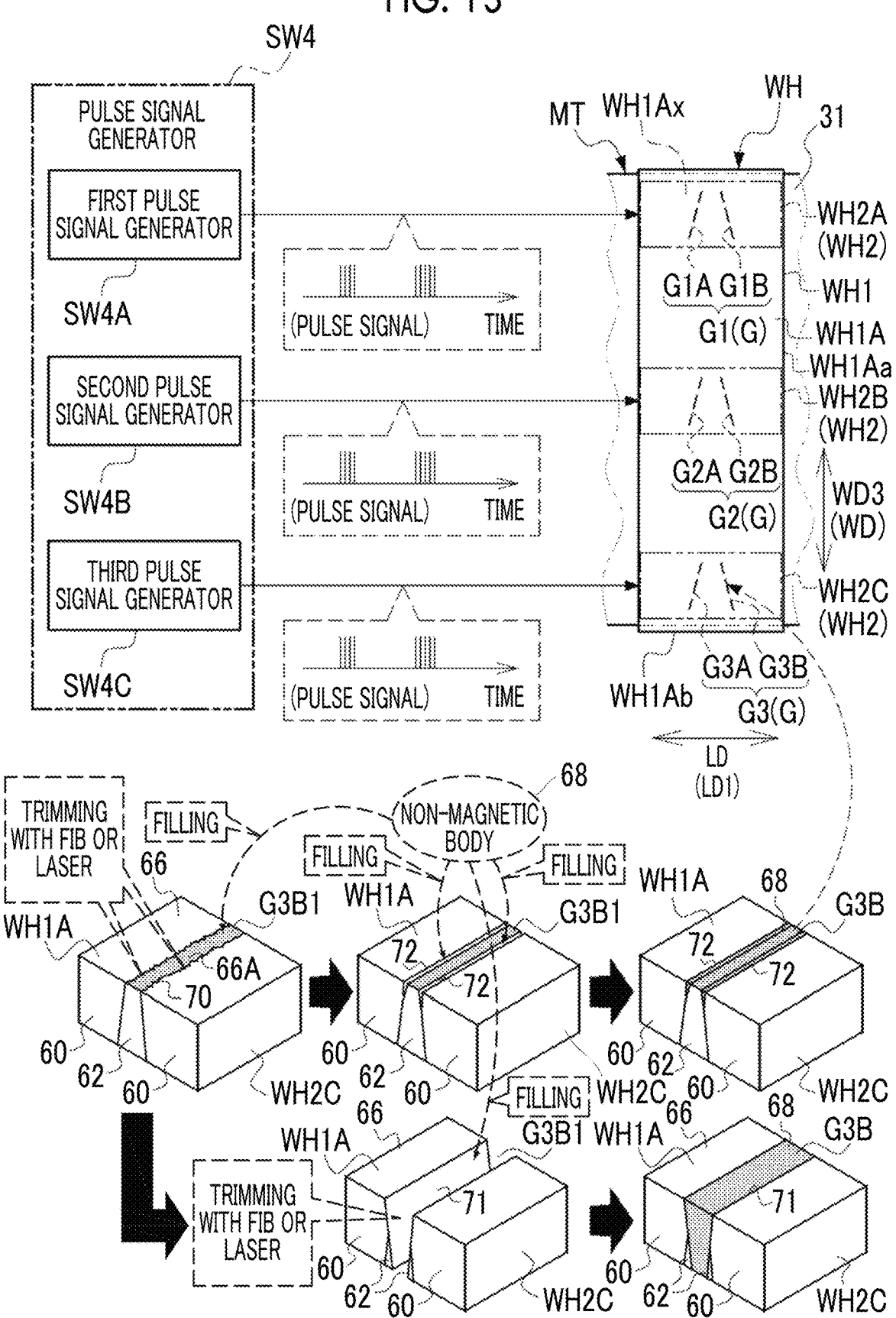
FIG. 13 is a conceptual diagram showing an example of a configuration of a servo pattern recording head and a pulse signal generator included in the servo writer.

FIG. 13 shows an example of a configuration of the servo pattern recording head WH and an example of a configuration of the pulse signal generator SW4 in a case in which the servo pattern recording head WH is observed from the front surface 31 side (that is, the rear surface side of the servo pattern recording head WH) of the magnetic tape MT that travels on the transport path SW7 (see FIG. 12).

As an example, as shown in FIG. 13, the servo pattern recording head WH has a substrate WH1 and a plurality of head cores WH2. The substrate WH1 is formed in a rectangular parallelepiped shape, and is disposed to cross the front surface 31 of the magnetic tape MT that travels on the transport path SW7 along the width direction WD. A front surface WH1A of the substrate WH1 is a rectangle having a long side WH1Aa and a short side WH1Ab, and the long side WH1Aa crosses the front surface 31 of the magnetic tape MT along the width direction WD.

The front surface WH1A has a sliding surface WH1Ax. The sliding surface WH1Ax is a surface overlapping the front surface 31 of the magnetic tape MT in the front surface WH1A in a situation where the substrate WH1 crosses the front surface 31 of the magnetic tape MT along the width direction WD. The sliding surface WH1Ax slides against the magnetic tape MT in a traveling state. A width of the sliding surface WH1Ax shown in FIG. 13 (that is, a length of a direction LD1 (for example, the same direction as the longitudinal direction LD) corresponding to the longitudinal direction LD) is merely an example, and the width of the sliding surface WH1Ax may be several times wider than the width in the example shown in FIG. 13.

A direction WD3 (that is, a direction along the long side WH1Aa), which is a longitudinal direction of the substrate WH1, is a direction corresponding to the width direction WD (for example, the same direction as the width direction WD). The plurality of head cores WH2 are incorporated in the substrate WH1 along the direction WD3. A plurality of gap patterns G are formed on the front surface WH1A of the head core WH2 (that is, a surface of the substrate WH1 facing the front surface 31 of the magnetic tape MT) at intervals along the direction WD3.

In the present embodiment, the direction WD3 is an example of a "second longitudinal direction" according to the technology of the present disclosure. In addition, in the present embodiment, the front surface WH1A is an example of a "opposing surface" according to the technology of the present disclosure. In addition, in the present embodiment, the gap pattern G is an example of a "gap pattern" according to the technology of the present disclosure.

The gap pattern G consists of the pair of non-parallel linear regions. The pair of non-parallel linear regions refers to, for example, a linear region having the same geometrical characteristic as the geometrical characteristic of the magnetization straight line 54A1$a$ positioned on the most upstream side in the forward direction among the five magnetization straight lines 54A1$a$ included in the linear magnetization region 54A1 shown in FIG. 6, and a linear region having the same geometrical characteristic as the geometrical characteristic of the magnetization straight line 54A2$a$ positioned on the most upstream side in the forward direction among the five magnetization straight lines 54A2$a$ included in the linear magnetization region 54A2 shown in FIG. 6.

A plurality of gap patterns G are formed on the front surface WH1A at intervals along the direction WD3. On the front surface WH1A, an interval in the direction WD3 between the gap patterns G which are adjacent to each other in the direction WD3 corresponds to the interval the width direction WD between the servo bands SB of the magnetic tape MT (that is, the servo band pitch).

A coil (not shown) is wound around the head core WH2, and the pulse signal is supplied to the coil. The pulse signal supplied to the coil is the pulse signal for the servo pattern 52A and the pulse signal for the servo pattern 52B.

In a case in which the servo pattern recording step is performed by the servo writer SW configured as described above, the servo pattern recording head WH is disposed in a posture in which the front surface 31 of the magnetic tape MT and the plurality of gap patterns G face each other. Then, in a state in which this posture is maintained, the plurality of servo patterns G are recorded on the front surface 31 of the magnetic tape MT by the servo write head WH along the longitudinal direction LD, whereby the plurality of servo bands SB (see FIG. 6) are formed on the front surface 31. Hereinafter, a method of forming the plurality of servo bands SB on the front surface 31 will be described in more detail.

In a state in which the gap pattern G faces (in other words, in a state in which the gap pattern G faces) a region in which the formation of the servo band SB in the front surface 31 of the magnetic tape MT traveling on the transport path SW7 is scheduled in advance, in a case in which the pulse signal for the servo pattern 52A is supplied to the coil of the head core WH2, a magnetic field is applied from the gap pattern G to the servo band SB of the magnetic tape MT in accordance with the pulse signal. As a result, the servo pattern 52A is recorded in a region in which the formation of the servo band SB in the front surface 31 of the magnetic tape MT is scheduled in advance. In addition, in a state in which the gap pattern G faces the region in which the formation of the servo band SB in the front surface 31 of the magnetic tape MT traveling on the transport path SW7 is scheduled in advance (in other words, a state in which the gap pattern G faces the servo band SB), the pulse signal for the servo pattern 52B is supplied to the coil of the head core WH2, and the magnetic field is applied from the gap pattern G to the servo band SB of the magnetic tape MT. As a result, the servo pattern 52B is recorded in a region in which the formation of the servo band SB in the front surface 31 of the magnetic tape MT is scheduled in advance. In this way, the servo bands SB are formed by alternately forming the servo patterns 52A and 52B along the longitudinal direction in the region in which the formation of the servo bands SB in the front surface 31 of the magnetic tape MT is scheduled in advance.

The pulse signal corresponding to each servo pattern 52 (that is, the servo pattern 52 for each frame 50 (see FIG. 6)) is modulated. By modulating the pulse signal, various pieces of information are embedded in the pulse signal. In this case, for example, by modulating the pulse signal for the servo pattern 52A, it is possible to change, for each servo pattern 52A, the interval between the third magnetization straight line 54A1$a$ and the second magnetization straight line 54A1$a$ among the five magnetization straight lines 54A1$a$ (see FIG. 6) (hereinafter, also referred to as "first interval"), and the interval between the third magnetization straight line 54A1$a$ and the fourth magnetization straight line 54A1$a$ (hereinafter, also referred to as "second interval"). By making the first interval and the second interval different for each servo pattern 52A, it is possible to embed the information of at least 1 bit in each servo pattern 52A. As a result, it is possible to embed various pieces of information by combining the plurality of servo patterns 52.

The various pieces of information refer to, for example, information on the position in the longitudinal direction LD of the magnetic tape MT, information for identifying the servo band SB, and/or information for specifying a manufacturer of the magnetic tape MT.

In the example shown in FIG. 13, head cores WH2A, WH2B, and WH2C are shown as an example of the plurality of head cores WH2, and gap patterns G1, G2, and G3 are shown as an example of the plurality of gap patterns G. The gap pattern G1 is formed in the head core WH2A. The gap pattern G2 is formed in the head core WH2B. The gap pattern G3 is formed in the head core WH2C.

The gap patterns G1 to G3 have the same geometrical characteristics as each other. In the present embodiment, for example, the gap pattern G1 is used for recording the servo pattern 52 (see FIG. 6) for the servo band SB3 (see FIG. 6), the gap pattern G2 is used for recording the servo pattern 52 (see FIG. 6) for the servo band SB2 (see FIG. 6), and the gap pattern G3 is used for recording the servo pattern 52 (see FIG. 6) for the servo band SB1 (see FIG. 6).

The gap pattern G1 is a linear region pair consisting of linear regions G1A and G1B. In addition, the gap pattern G2 is a linear region pair consisting of linear regions G2A and G2B. In addition, the gap pattern G3 is a linear region pair consisting of linear regions G3A and G3B. In the present embodiment, the gap patterns G1 to G3 are examples of a "plurality of gap patterns" according to the technology of the present disclosure.

The pulse signal generator SW4 includes a first pulse signal generator SW4A, a second pulse signal generator SW4B, and a third pulse signal generator SW4C. The first pulse signal generator SW4A is connected to the head core WH2A. The second pulse signal generator SW4B is connected to the head core WH2B. The third pulse signal generator SW4C is connected to the head core WH2C.

In a case in which the gap pattern G1 is used for forming the servo band SB3 (see FIG. 6), when the first pulse signal generator SW4A supplies the pulse signal to the head core WH2A, a magnetic field is applied to a region in which the formation of the servo band SB3 on the front surface 31 of the magnetic tape MT from the gap pattern G1 is scheduled in advance, in accordance with the pulse signal, and the servo pattern 52 (see FIG. 6) is recorded in the region in which the formation of the servo band SB3 is scheduled in advance.

For example, in a state in which the gap pattern G1 faces the region in which the formation of the servo band SB3 in the front surface 31 of the magnetic tape MT that is traveling on the transport path SW7 is scheduled in advance (in other words, in a state in which the gap pattern G1 faces the region), in a case in which the pulse signal for the servo pattern 52A is supplied to the head core WH2A, the servo pattern 52A (see FIG. 6) is recorded in the region in which the formation of the servo band SB3 in the front surface 31 of the magnetic tape MT is scheduled in advance. That is, the linear magnetization region 54A1 (see FIG. 6) is recorded in the region in which the formation of the servo band SB3 in the front surface 31 of the magnetic tape MT is scheduled in advance, by the linear region G1A, and the linear magnetization region 54A2 (see FIG. 6) is recorded in the servo band SB3 by the linear region G1B. As a result, the servo pattern 52A is formed in a region in which the formation of the servo band SB3 in the front surface 31 of the magnetic tape MT is scheduled in advance.

In addition, for example, in a state in which the gap pattern G1 faces the region in which the formation of the servo band SB3 in the front surface 31 of the magnetic tape MT that is traveling on the transport path SW7 is scheduled in advance (in other words, in a state in which the servo band SB3 faces the gap pattern G1), in a case in which the pulse signal for the servo pattern 52B is supplied to the head core WH2A, the servo pattern 52B (see FIG. 6) is recorded in the region in which the formation of the servo band SB1 in the front surface 31 of the magnetic tape MT is scheduled in advance. That is, the linear magnetization region 54B1 (see FIG. 6) is recorded by the linear region G1A in a region in which the formation of the servo band SB1 on the front surface 31 of the magnetic tape MT is scheduled in advance, and the linear magnetization region 54B2 (see FIG. 6) is recorded by the linear region G1B in a region in which the formation of the servo band SB3 on the front surface 31 of the magnetic tape MT is scheduled in advance. As a result, the servo pattern 52B is formed in a region in which the formation of the servo band SB3 in the front surface 31 of the magnetic tape MT is scheduled in advance.

As described above, the servo band SB3 is formed by alternately forming the servo patterns 52A and 52B along the longitudinal direction LD in the region in which the formation of the servo band SB3 in the front surface 31 of the magnetic tape MT is scheduled in advance.

In a case in which the gap pattern G2 is used for forming the servo band SB2 (see FIG. 6), in a case in which the second pulse signal generator SW4B supplies the pulse signal to the head core WH2B, a magnetic field is applied to a region in which the formation of the servo band SB2 on the front surface 31 of the magnetic tape MT from the gap pattern G2 is scheduled in advance, in accordance with the pulse signal, and the servo pattern 52 (see FIG. 6) is recorded in the region in which the formation of the servo band SB2 on the front surface 31 of the magnetic tape MT is scheduled in advance.

For example, in a state in which the gap pattern G2 faces a region in which the formation of the servo band SB2 in the front surface 31 of the magnetic tape MT traveling on the transport path SW7 is scheduled in advance (in other words, a state in which the gap pattern G2 faces the region), in a case in which the pulse signal for the servo pattern 52A is supplied to the head core WH2B, the servo pattern 52A (see FIG. 6) is recorded in the region in which the formation of the servo band SB2 in the front surface 31 of the magnetic tape MT is scheduled in advance. That is, the linear magnetization region 54A1 is recorded in a region in which the formation of the servo band SB2 on the front surface 31 of the magnetic tape MT is scheduled in advance, by the linear region G2A, and the linear magnetization region 54A2 (see FIG. 6) is recorded in a region in which the formation of the servo band SB2 on the front surface 31 of the magnetic tape MT is scheduled in advance, by the linear region G2B. As a result, the servo pattern 52A is formed in a region in which the formation of the servo band SB2 in the front surface 31 of the magnetic tape MT is scheduled in advance.

In addition, for example, in a state in which the gap pattern G2 faces the region in which the formation of the servo band SB2 in the front surface 31 of the magnetic tape MT that is traveling on the transport path SW7 is scheduled (in other words, in a state in which the gap pattern G2 faces the region), in a case in which the pulse signal for the servo pattern 52B is supplied to the head core WH2B, the servo pattern 52B is recorded in the region in which the formation of the servo band SB2 in the front surface 31 of the magnetic tape MT is scheduled in advance. That is, the linear magnetization region 54B1 is recorded in a region in which the formation of the servo band SB2 on the front surface 31 of the magnetic tape MT is scheduled in advance, by the linear region G2A, and the linear magnetization region 54B2 (see FIG. 6) is recorded in a region in which the formation of the servo band SB2 on the front surface 31 of the magnetic tape MT is scheduled in advance, by the linear region G2B. As a result, the servo pattern 52B is formed in a region in which the formation of the servo band SB2 in the front surface 31 of the magnetic tape MT is scheduled in advance.

As described above, the servo band SB2 is formed by alternately forming the servo patterns 52A and 52B along the longitudinal direction LD with respect to the region in which the formation of the servo band SB2 in the front surface 31 of the magnetic tape MT is scheduled in advance.

In a case in which the gap pattern G3 is used for forming the servo band SB1 (see FIG. 6), in a case in which the third pulse signal generator SW4C supplies the pulse signal to the head core WH2C, a magnetic field is applied to a region in which the formation of the servo band SB1 on the front surface 31 of the magnetic tape MT from the gap pattern G3 is scheduled in advance, in accordance with the pulse signal, and the servo pattern 52 (see FIG. 6) is recorded in the region in which the formation of the servo band SB1 on the front surface 31 of the magnetic tape MT is scheduled in advance.

For example, in a case in which the pulse signal for the servo pattern 52A is supplied to the head core WH2C in a state in which the gap pattern G3 faces the region in which the formation of the servo band SB1 in the front surface 31 of the magnetic tape MT that is traveling on the transport path SW7 is scheduled in advance (in other words, in a state in which the gap pattern G3 faces the region), the servo pattern 52A is recorded in the region in which the formation of the servo band SB1 in the front surface 31 of the magnetic tape MT is scheduled in advance. That is, the linear magnetization region 54A1 (see FIG. 6) is recorded in the region in which the formation of the servo band SB1 on the front surface 31 of the magnetic tape MT is scheduled in advance, by the linear region G3A, and the linear magnetization region 54B2 (see FIG. 6) is recorded in the region in which the formation of the servo band SB1 on the front surface 31 of the magnetic tape MT is scheduled in advance, by the linear region G3B. As a result, the servo pattern 52A is formed in a region in which the formation of the servo band SB1 in the front surface 31 of the magnetic tape MT is scheduled in advance.

In addition, for example, in a case in which the pulse signal for the servo pattern 52B is supplied to the head core WH2C in a state in which the gap pattern G3 faces a region in which the formation of the servo band SB1 in the front surface 31 of the magnetic tape MT that is traveling on the transport path SW7 is scheduled in advance (in other words, in a state of confronting), the servo pattern 52B is recorded in the region in which the formation of the servo band SB1 in the front surface 31 of the magnetic tape MT is scheduled in advance. That is, the linear magnetization region 54B1 (see FIG. 6) is recorded in the region in which the formation of the servo band SB1 on the front surface 31 of the magnetic tape MT is scheduled in advance, by the linear region G3A, and the linear magnetization region 54B2 (see FIG. 6) is recorded in the region in which the formation of the servo band SB1 on the front surface 31 of the magnetic tape MT is scheduled in advance, by the linear region G3B. As a result, the servo pattern 52B is formed in a region in which the formation of the servo band SB1 in the front surface 31 of the magnetic tape MT is scheduled in advance.

As described above, the servo band SB1 is formed by alternately forming the servo patterns 52A and 52B along the longitudinal direction LD with respect to the region in which the formation of the servo band SB1 in the front surface 31 of the magnetic tape MT is scheduled in advance.

By the way, the head core WH2C has a magnetic film 60 and a base glass 62. The magnetic film 60 forms a base of the head core WH2C. An example of the magnetic film 60 is a metal film. Here, the concept of the "metal film" also includes an alloy film. Examples of the metal film include a deposited film in which one or more metal materials selected from the group consisting of one or more kinds of pure metals and one or more kinds of alloys are deposited. In addition, the metal film may include one or more kinds of additives, or may also include one or more kinds of impurities that are inevitably mixed in. The magnetic film 60 may be an iron-based alloy film. Here, the "-based" means "containing". The iron-based alloy film is preferably an iron nitride-based alloy film. Examples of the iron nitride-based alloy include a constitutional element containing one or two or more selected from the group consisting of Al and/or Ta, together with Fe and N, as constitutional elements. The magnetic film 60 may be obtained as a deposited film obtained by depositing a metal material on a substrate by a known film forming method such as physical vapor deposition (PVD) such as sputtering and/or vacuum deposition, and/or chemical vapor deposition (CVD). The base glass 62 forms the base of the head core WH2C together with the magnetic film 60. A material of a non-magnetic material is used as the base glass 62. A plane 66 is formed by the magnetic film 60 and the base glass 62.

A linear opening 66A is formed on the base glass 62, and a non-magnetic body 68 such as silicon dioxide and/or aluminum is filled in the opening 66A to form a base G3B1. The base G3B1 is a base of the linear region G3B.

The head core WH2C is formed by a method using photolithography. In a case in which the base G3B1 having low linearity of a ridge line region 70 is used as the linear region G3B as it is, it is difficult to record the servo pattern 52 having high linearity on the front surface 31 of the magnetic tape MT. In a case in which the linearity of the servo pattern 52 is low, the accuracy of the servo control is low.

Examples of a method of increasing the linearity of the ridge line region 70 include the following first to third methods. The first method is a method of increasing the linearity of the ridge line region 70 by increasing the accuracy of the photomask used in photolithography. The second method is a method of forming a linear groove 71 having a size corresponding to the entire width of the opening portion 66A by trimming the entire width of the opening portion 66A of the head core WH2C formed by the method using photolithography with FIB or a laser, and filling the groove 71 with the non-magnetic body 68 to form the linear region G3B. The third method is a method of forming the groove 72 by linearly trimming the ridge line region 70 of the base G3B1 of the head core WH2C formed by a method using photolithography with FIB or a laser, and forming the linear region G3B by filling the groove 72 with the non-magnetic body 68.

In the third method, for example, the base G3B1 is shaped by processing the head core WH2C formed by the method using photolithography with FIB or a laser. That is, the ridge line region 70 of the base G3B1 is linearly trimmed by irradiating the ridge line region 70 of the base G3B1 of the head core WH2C formed by the method using photolithography with the FIB or the laser along the longitudinal direction of the base G3B1. Then, the non-magnetic body 68 is filled in the groove 72 obtained by trimming the base G3B1 with the FIB. The linear region G3B is formed by shaping the base G3B1 in this manner. In this way, by performing the processing using any one of the first to third methods, the linearity of the linear region G3B can be increased, and the durability of the linear region G3B can be increased.

Here, although the linear region G3B is exemplified, each of the linear regions G1A, G1B, G2A, G2B, and G3A is also obtained by performing the same processing as the processing performed to obtain the linear region G3B.

As described above, by performing the processing on the head core WH2 by using the FIB or the laser, the linearity of the linear regions G1A, G1B, G2A, G2B, G3A, and G3B is increased, and as a result, a plurality of servo patterns 52 having high linearity are formed on the front surface 31 of the magnetic tape MT along the longitudinal direction LD for each servo band SB.

Figure 14:
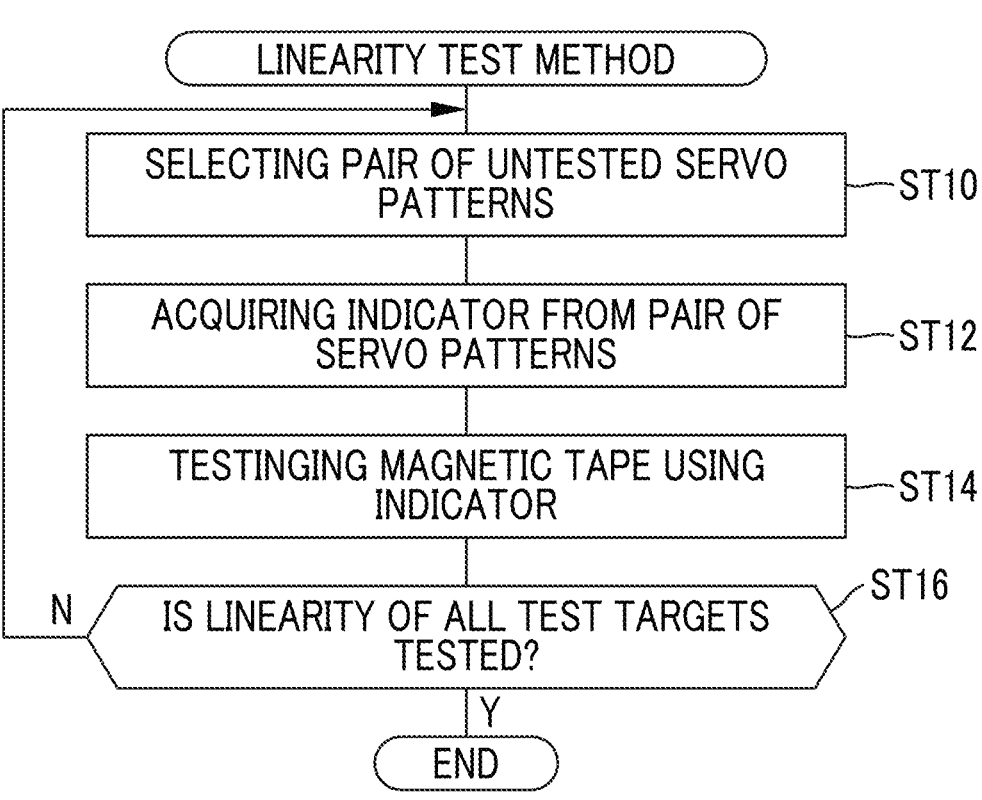
FIG. 14 is a flowchart showing an example of a flow of a linearity test method used in a test step included in the manufacturing method of the magnetic tape.

In the present embodiment, in order to further increase the linearity of each servo pattern 52 included in each servo band SB, as shown in FIG. 14 as an example, a linearity test method is performed on the magnetic tape MT on which a plurality of servo bands SB are formed.

The linearity test method is a method of testing the linearity of the servo pattern 52 formed on the magnetic tape MT, and is performed, for example, in the test step included in the above-described manufacturing method of the magnetic tape MT. It should be noted that this is merely an example, and the test may be performed using the linearity test method using the magnetic tape drive 14. The linearity test method may be realized mainly by work such as manual measurement by a tester (not shown), or may be realized mainly by automation using a test device (not shown). In the present embodiment, the linearity test method shown in FIG. 14 is an example of a "test method" according to the technology of the present disclosure.

In the linearity test method shown in FIG. 14, first, in step ST10, a pair of untested servo patterns 52 (that is, a pair of servo patterns 52 in which the linearity of the servo pattern 52 is not tested) adjacent to each other in the width direction WD is selected from two servo bands SB (for example, the servo band SB2 and the servo band SB3) adjacent to each other in the width direction WD in the magnetic tape MT in which the plurality of servo bands SB are formed by the above-mentioned servo pattern recording step.

In next step ST12, an indicator indicating the non-linearity of the servo pattern 52 (hereinafter, also simply referred to as an "indicator") is acquired from the untested pair of servo patterns 52 selected in step ST10.

In next step ST14, the magnetic tape MT is tested by using the indicator acquired in step ST12. For example, in step ST14, the linearity of the untested pair of servo patterns 52 selected in step ST10 is test by using the indicator acquired in step ST12.

In next step ST16, it is determined whether or not the linearity of all the test targets (that is, all the predetermined pairs of servo patterns 52 as the test targets) included in the two servo bands SB adjacent to each other in the width direction WD in the magnetic tape MT is tested. In step ST16, in a case in which the linearity of all the test targets included in the two servo bands SB adjacent to each other in the width direction WD in the magnetic tape MT has not been tested, a negative determination is made, and the linearity test method proceeds to step ST10. In Step ST16, in a case in which the linearity of all the test targets included in the two servo bands SB adjacent to each other in the width direction WD in the magnetic tape MT has been tested, a positive determination is made, and the linearity test method ends.

Here, in order to facilitate understanding of the technology of the present disclosure, an example of a form in which the linearity test method is applied to two servo bands SB (for example, the servo band SB2 and the servo band SB3) adjacent to each other in the width direction WD in the magnetic tape MT has been described, but the linearity test method is also applied to two other servo bands SB (that is, the servo band SB1 and the servo band SB2) adjacent to each other in the width direction WD in the magnetic tape MT. That is, in a case in which three or more servo bands SB are arranged along the width direction WD on the magnetic tape MT, the linearity test method is applied to each of all pairs of servo bands SB adjacent to each other in the width direction WD.

Here, a specific example of a method of obtaining the indicator will be described.

A plurality of PESs are used as the indicator. PES refers to a position in the width direction WD in the servo pattern 52. PES is measured using the following Equation (1).

$$PES = \frac{d}{\tan(\alpha 1) + \tan(\alpha 2)} \left( \frac{1}{2} - \frac{\sum A_i}{\sum B_i} \right) \tag{1}$$

Figure 15:
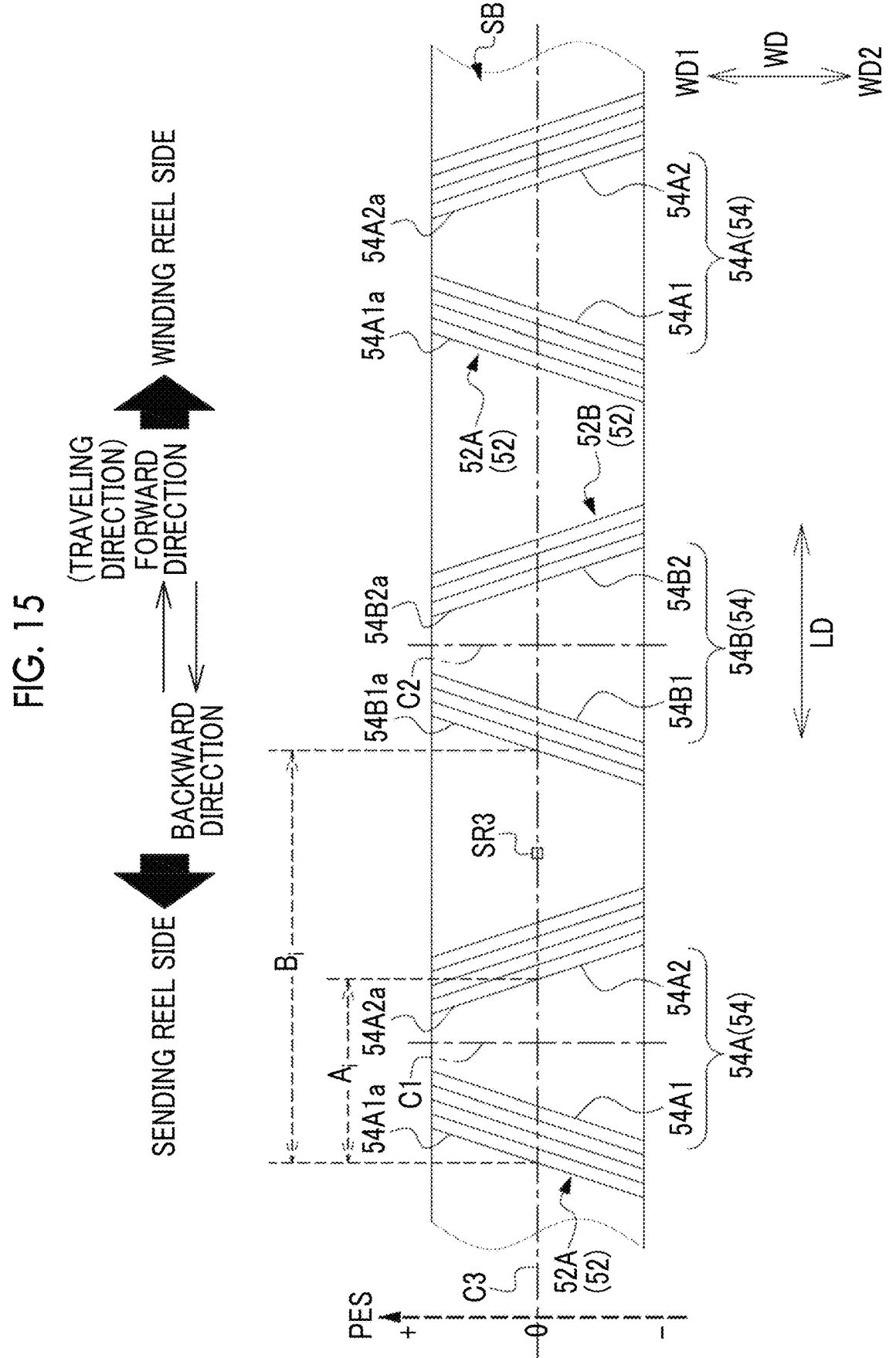
FIG. 15 is a conceptual diagram showing an example of a configuration of a servo band formed on the magnetic tape.

FIG. 15 is a conceptual diagram showing the PES of the linear magnetization region 54A1 in the servo pattern 52A in a case in which the magnetic tape MT travels in the forward direction, and variables used in Expression (1) for measuring the PES.

In Expression (1), "α1" is an angle determined in advance as an angle formed by the imaginary straight line C1 and the linear magnetization region 54A1. In Expression (1), "α2"

is an angle determined in advance as an angle formed by the imaginary straight line C1 and the linear magnetization region 54A2. In the present embodiment, since the linear magnetization regions 54A1 and 54A2 are inclined line-symmetrically with respect to the imaginary straight line C1, "α1" and "α2" are equivalent.

In Expression (1), "i" is a natural number from 1 to 4. The maximum value of "i" (here, 4) is the number of the magnetization straight lines 54A1a used for the measurement of the PES. In Expression (1), "Ai" refers to a distance between the magnetization straight line 54A1a and the magnetization straight line 54A2a at positions that correspond to each other in a case where the servo reading element SR3 of the verification head VH crosses the servo pattern 52A along the longitudinal direction LD. Here, the phrase "the magnetization straight line 54A1a and the magnetization straight line 54A2a at positions that correspond to each other" refers to first to fourth magnetization straight line pairs. The first magnetization straight line pair refers to the magnetization straight line 54A1a and the magnetization straight line 54A2a that are positioned on the most upstream side in the running direction of the magnetic tape MT in the linear magnetization regions 54A1 and 54A2. The second magnetization straight line pair refers to the magnetization straight line 54A1a and the magnetization straight line 54A2a that are positioned second from the most upstream side to the downstream side in the running direction of the magnetic tape MT in the linear magnetization regions 54A1 and 54A2. The third magnetization straight line pair refers to the magnetization straight line 54A1a and the magnetization straight line 54A2a that are positioned third from the most upstream side to the downstream side in the running direction of the magnetic tape MT in the linear magnetization regions 54A1 and 54A2. The fourth magnetization straight line pair refers to the magnetization straight line 54A1a and the magnetization straight line 54A2a that are positioned fourth from the most upstream side to the downstream side in the running direction of the magnetic tape MT in the linear magnetization regions 54A1 and 54A2.

In Expression (1), "Bi" refers to a distance between the magnetization straight line 54A1a and the magnetization straight line 54B1a at positions that correspond to each other in a case where the servo reading element SR3 crosses the servo pattern 52A and the servo pattern 52B that is adjacent to the servo pattern 52A on the forward direction side along the longitudinal direction LD. Here, the phrase "the magnetization straight line 54A1a and the magnetization straight line 54B1a at positions that correspond to each other" refers to fifth to eighth magnetization straight line pairs. The fifth magnetization straight line pair refers to the magnetization straight line 54A1a and the magnetization straight line 54B1a that are positioned on the most upstream side in the running direction of the magnetic tape MT in the linear magnetization region 54A1 in the servo pattern 52A and the linear magnetization region 54B1 in the servo pattern 52B that is adjacent to the servo pattern 52A on the forward direction side. The sixth magnetization straight line pair refers to the magnetization straight line 54A1a and the magnetization straight line 54B1a that are positioned second from the most upstream side to the downstream side in the running direction of the magnetic tape MT in the linear magnetization region 54A1 in the servo pattern 52A and the linear magnetization region 54B1 in the servo pattern 52B that is adjacent to the servo pattern 52A on the forward direction side. The seventh magnetization straight line pair refers to the magnetization straight line 54A1a and the magnetization straight line 54B1a that are positioned third from the most upstream side to the downstream side in the running direction of the magnetic tape MT in the linear magnetization region 54A1 in the servo pattern 52A and the linear magnetization region 54B1 in the servo pattern 52B that is adjacent to the servo pattern 52A on the forward direction side. The eighth magnetization straight line pair refers to the magnetization straight line 54A1a and the magnetization straight line 54B1a that are positioned fourth from the most upstream side to the downstream side in the running direction of the magnetic tape MT in the linear magnetization region 54A1 in the servo pattern 52A and the linear magnetization region 54B1 in the servo pattern 52B that is adjacent to the servo pattern 52A on the forward direction side.

In Expression (1), "d" is a distance determined in advance as a distance in the longitudinal direction LD between the linear magnetization region 54A1 and the linear magnetization region 54B1. An example of "d" is a distance determined in advance as a distance between the magnetization straight line 54A1a and the magnetization straight line 54B1a at positions that correspond to each other in a case where the servo reading element SR3 crosses the servo patterns 52A and 52B along the longitudinal direction LD.

Here, although an example of a form in which Equation (1) is used to measure the PES in the servo pattern 52A in a case in which the magnetic tape MT travels in the forward direction has been described, Equation (1) is also used in a case in which the PES in the servo pattern 52B is measured. In this case, "Bi" refers to a distance between the magnetization straight line 54B1a and the magnetization straight line 54A1a at positions corresponding to each other in a case in which the servo reading element SR3 crosses the servo pattern 52B and the servo pattern 52A adjacent to the servo pattern 52B on the forward direction side along the longitudinal direction LD.

"Ai" and "Bi" are measured based on the servo pattern signal obtained by reading the servo pattern 52 by the servo reading element SR3 of the verification head VH.

In a case where a center position of the servo pattern 52 in the width direction WD (for example, a position where an imaginary straight line C3 passing through a center of the servo pattern 52 in the width direction WD along the longitudinal direction LD and the servo pattern 52 intersect with each other) is "0", in the PES, a position on the first direction WD1 side from the imaginary straight line C3 in the servo pattern 52 is represented by a positive value, and a position on the second direction WD2 side from the imaginary straight line C3 in the servo pattern 52 is represented by a negative value.

Figure 16:
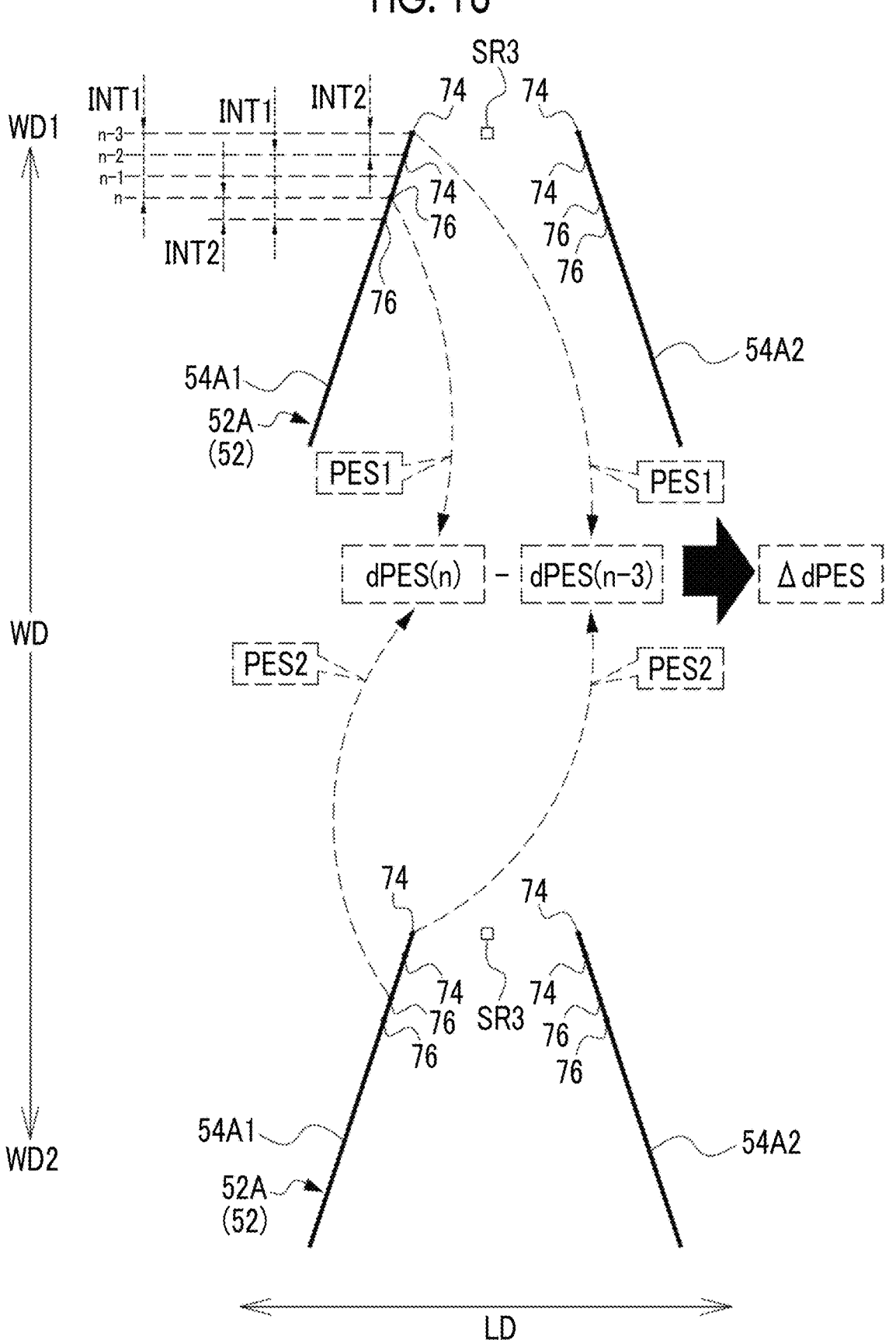
FIG. 16 is a conceptual diagram showing an example of an aspect in which a plurality of ΔdPES are measured from an adjacent servo pattern pair.

As shown in FIG. 16 as an example, a pair of servo patterns 52 (hereinafter, also referred to as an "adjacent servo pattern pair") adjacent to each other in the width direction WD included in two servo bands SB (hereinafter, also referred to as an "adjacent servo band pair") adjacent to each other in the width direction WD in the magnetic tape MT in which a plurality of servo bands SB are formed by the above-described servo pattern recording step are read by the servo reading element SR3 used for each servo band SB, and a plurality of dPES are measured based on the servo pattern signal obtained by reading each servo pattern 52.

In a case where the PES measured for one servo pattern 52 (for example, the upper servo pattern 52 shown in FIG. 16) included in the adjacent servo pattern pair is denoted by PES1 and the PES measured for the other servo pattern 52 (for example, the lower servo pattern 52 shown in FIG. 16) included in the adjacent servo pattern pair is denoted by PES2, dPES, which is a difference between PES1 and PES2, is measured. In a case in which the magnetic tape MT is not deformed in the width direction WD, the linearity of the servo pattern 52 is also ideal, and the interval between the two servo reading elements SR3 adjacent to each other in the width direction WD is also the design center, dPES is "0".

In the test step, the test of the linearity of the servo pattern 52 is required. Although details will be described later, a plurality of PESs and a plurality of dPESs are measured at a plurality of portions from one end (here, an end on the first direction WD1 side as an example) to the other end (here, an end on the second direction WD2 side as an example) of the servo pattern 52. Then, ΔdPES, which is a PES difference gap, is measured by a plurality of PESs and a plurality of dPESs.

A plurality of first positions 74 and a plurality of second positions 76 are set in one servo pattern 52 and the other servo pattern 52. The one servo pattern 52 refers to the one servo pattern 52 included in the adjacent servo pattern pair recorded at the corresponding position in the width direction WD in the adjacent servo band pair, that is, the upper servo pattern 52 shown in FIG. 16. The other servo pattern 52 refers to the other servo pattern 52 included in the adjacent servo pattern pair recorded at the corresponding position in the width direction WD in the adjacent servo band pair, that is, the lower servo pattern 52 shown in FIG. 16.

In the linear magnetization region 54A1 included in one of the servo patterns 52 (for example, a magnetization line 54A1a positioned most upstream in the forward direction), a plurality of first positions 74 and a plurality of second positions 76 are set from one end (for example, the end on the first direction WD1 side) to the other end (for example, the end on the second direction WD2 side) of the linear magnetization region 54A1. The plurality of first positions 74 and the plurality of second positions 76 have a predetermined correspondence relationship. The first position 74 and the second position 76 having a positional relationship corresponding to each other are set on the linear magnetization region 54A1 with an interval INT1 in the width direction WD. In addition, the first position 74 and the second position 76 having a positional relationship corresponding to each other are set on the linear magnetization region 54A1 at each interval INT2 along the width direction WD. The interval INT1 is an interval corresponding to the distance Dr (see FIG. 11) described above, and the interval INT2 is an interval corresponding to the pitch Tp. In the present embodiment, for convenience of description, the description will be made on the premise that "interval INT1=distance Dr" and "interval INT2=pitch Tp", but this is merely an example, and the technology of the present disclosure is established even in a case of "interval INT1≈distance Dr" and "interval INT2≈pitch Tp". In the present embodiment, the interval INT1 is an example of a "first predetermined interval" according to the technology of the present disclosure. The interval INT2 is an example of a "second predetermined interval" according to the technology of the present disclosure.

A magnitude relationship of "interval INT1>pitch Tp" is established between the interval INT1 and the pitch Tp. In addition, a magnitude relationship of "interval INT1>interval INT2" is established between the interval INT1 and the interval INT2. In addition, the interval INT1 is an interval that most closely approximates the reference interval. The reference interval refers to an interval that is a multiple of a natural number (for example, a multiple of a natural number of 2 or more) of the interval INT2 and that corresponds to half of the difference between the length L1 (see FIG. 11) and the pitch Tp. Here, 1200 nm (nanometers)

is used as an example of the interval INT1, and 400 nm is used as an example of the interval INT2.

In the example shown in FIG. 15, in a case where the variable n is a natural number of 3 or more, the dPES is roughly classified into dPES(n) and dPES(n-3). In the present embodiment, dPES(n-3) is an example of a "first PES difference" according to the technology of the present disclosure. In addition, in the present embodiment, dPES(n) is an example of a "second PES difference" according to the technology of the present disclosure.

In the linearity test method (for example, step ST12 included in the linearity test method shown in FIG. 14), dPES(n-3) is measured by using the PES of one first position 74 and the PES of the other first position 74 among the pair of first positions 74 having the positional relationship corresponding to the adjacent servo pattern pair. More specifically, the dPES(n-3) is measured by using the PES of one first position 74 and the PES of the other first position 74 of a pair of first positions 74 corresponding to each other between the linear magnetization region 54A1 (for example, the magnetization straight line 54A1a positioned on the most upstream side in the forward direction) included in one servo pattern 52 and the linear magnetization region 54A1 (for example, the magnetization straight line 54A1a positioned on the most upstream side in the forward direction) included in the other servo pattern 52.

In the linearity test method (for example, step ST12 included in the linearity test method shown in FIG. 14), dPES(n) is measured by using the PES of one second position 76 and the PES of the other second position 76 among the pair of second positions 76 having the positional relationship corresponding to the adjacent servo pattern pair. More specifically, the dPES(n) is measured by using the PES of one second position 76 and the PES of the other second position 76 of the pair of second positions 76 corresponding to each other between the linear magnetization region 54A1 (for example, the magnetization straight line 54A1a positioned on the most upstream side in the forward direction) included in one servo pattern 52 and the linear magnetization region 54A1 (for example, the magnetization straight line 54A1a positioned on the most upstream side in the forward direction) included in the other servo pattern 52.

In the linearity test method (for example, step ST12 included in the linearity test method shown in FIG. 14), a plurality of ΔdPES are measured from a plurality of dPES (n-3) and a plurality of dPES(n). ΔdPES is a difference between dPES(n-3) and dPES(n) which have a correspondence relationship with each other. The dPES(n-3) and dPES(n) which have a correspondence relationship with each other refer to dPES(n-3) and dPES(n) for the first position 74 and the second position 76 which are separated from each other by the interval INT1 along the width direction WD. In the present embodiment, ΔdPES is an example of a "PES difference gap" according to the technology of the present disclosure.

In the present embodiment, the interval INT2 is set to one step, and the variable n corresponds to the number of measurement steps. In the present embodiment, 1200 nm is used as an example of the interval INT1, 400 nm is used as an example of the interval INT2, and ΔdPES is calculated using a value of dPES at a position of a measurement step separated by "3", which is a ratio (in other words, a ratio) of the interval INT2 to the interval INT1. The variable n is incremented by 1 each time the first position 74 and the second position 76 advance by one measurement step along the second direction WD2. That is, each time the first position 74 and the second position 76 are shifted by the interval INT2 along the second direction WD2, the variable n is added by 1, and accordingly, the pair of first positions 74 and the pair of second positions 76 are updated. In a case where the pair of first positions 74 and the pair of second positions 76 are updated, dPES(n-3) is measured for the updated pair of first positions 74, and dPES(n) is measured for the updated pair of second positions 76. Then, whenever dPES(n-3) and dPES(n) are measured, ΔdPES (that is, the difference between dPES(n-3) and dPES(n)) is measured from the measured dPES(n-3) and dPES(n).

As described above, in the example shown in FIG. 15, in the adjacent servo pattern pair, the plurality of ΔdPESs are obtained by measuring the ΔdPES for each interval INT2 along the second direction WD2 for the pair of linear magnetization regions 54A1 adjacent to each other in the width direction WD.

In addition, in the same manner as in the case where the plurality of first positions 74 and the plurality of second positions 76 are set on the pair of linear magnetization regions 54A1 included in the adjacent servo pattern pair, the plurality of first positions 74 and the plurality of second positions 76 are also set on the pair of linear magnetization regions 54A2 (for example, the magnetization straight line 54A2a positioned on the most upstream side in the forward direction included in one linear magnetization region 54A2 of the pair of linear magnetization regions 54A2 and the magnetization straight line 54A2a positioned on the most upstream side in the forward direction included in the other linear magnetization region 54A2 of the pair of linear magnetization regions 54A2) included in the adjacent servo pattern pair. In addition, in the same manner as in the case of measuring the plurality of dPES(n) and the plurality of dPES(n-3) for the plurality of first positions 74 and the plurality of second positions 76 on the pair of linear magnetization regions 54A1 included in the adjacent servo pattern pair, the plurality of dPES(n) and the plurality of dPES(n-3) are also measured for the plurality of first positions 74 and the plurality of second positions 76 on the pair of linear magnetization regions 54A2 included in the adjacent servo pattern pair. Further, in the same manner as a plurality of ΔdPES values are measured from a plurality of dPES(n) and a plurality of dPES(n-3) measured at a plurality of first positions 74 and a plurality of second positions 76 on the pair of linear magnetization regions 54A1 included in the adjacent servo pattern pair, a plurality of ΔdPES values are also measured from a plurality of dPES(n) and a plurality of dPES(n-3) measured at a plurality of first positions 74 and a plurality of second positions 76 on the pair of linear magnetization regions 54A2 included in the adjacent servo pattern pair.

In addition, the plurality of first positions 74 and the plurality of second positions 76 are set on the pair of servo patterns 52B adjacent to each other in the width direction WD in the same manner as the plurality of first positions 74 and the plurality of second positions 76 are set on the pair of servo patterns 52A included in the adjacent servo pattern pair. In addition, in the same manner as in a case where the plurality of dPES(n) and the plurality of dPES(n-3) are measured for the plurality of first positions 74 and the plurality of second positions 76 on the pair of servo patterns 52A included in the adjacent servo pattern pair, the plurality of dPES(n) and the plurality of dPES(n-3) are also measured for the plurality of first positions 74 and the plurality of second positions 76 of the pair of servo patterns 52B adjacent to each other in the width direction WD. Further, in the same manner as a plurality of ΔdPES values are measured from a plurality of dPES(n) and a plurality of dPES (n−3) measured at a plurality of first positions 74 and a plurality of second positions 76 on a pair of servo patterns 52A included in an adjacent servo pattern pair, a plurality of ΔdPES values are also measured from a plurality of dPES(n) and a plurality of dPES(n−3) measured at a plurality of first positions 74 and a plurality of second positions 76 on a pair of servo patterns 52B adjacent in the width direction WD.

By the way, the deformation of the magnetic tape MT in the width direction WD is not present, and the linearity of the servo pattern 52 is also ideal, but in a case where the interval between the two servo reading elements SR3 adjacent to each other in the width direction WD deviates from the design center, the dPES is a value corresponding to the amount of deviation of the interval between the two servo reading elements SR3 adjacent to each other in the width direction WD from the design center. In addition, in a case where the magnetic tape MT is deformed in the width direction WD, dPES is a value corresponding to the amount of deformation of the magnetic tape MT in the width direction WD.

However, the measurement of ΔdPES (that is, the difference between dPES(n) and dPES(n−3)) cancels out the amount of deviation of the deformation amount of the magnetic tape MT in the width direction WD and the interval between the two servo reading elements SR3 adjacent to each other in the width direction WD from the design center.

Specifically, the dPES includes a value corresponding to an amount by which the interval between the two servo reading elements SR3 adjacent to each other in the width direction WD is deviated from the design center, a value corresponding to the amount of deformation of the magnetic tape MT in the width direction WD, and a value indicating the linearity of the servo pattern 52. However, for example, in a case in which there is no deformation amount of the magnetic tape MT in the width direction WD and there is a deviation from the design value of the interval between the servo reading elements SR adjacent to each other in the width direction WD, both dPES(n) and dPES(n−3) include a deviation from the design value of the interval between the servo reading elements SR. Therefore, by obtaining a difference between dPES(n) and dPES(n−3), the deviation amount from the design value of the interval between the servo reading elements SR is canceled out, and only the value indicating the linearity of the servo pattern 52 is calculated. With the same concept, even in a case where the magnetic tape MT is deformed in the width direction WD, the same deformation is considered to occur at the first position 74 and the second position 76. Therefore, by obtaining the difference between dPES(n) and dPES(n−3), the amount of deformation of the magnetic tape MT in the width direction WD is canceled out, and only the value indicating the linearity of the servo pattern 52 is calculated. Therefore, the linearity of the servo pattern 52 is expressed by a plurality of ΔdPESs measured from a plurality of dPESs (n) and a plurality of dPESs (n−3) corresponding to the plurality of first positions 74 and the plurality of second positions 76.

Therefore, in step ST12 included in the linearity test method shown in FIG. 14, the indicator is acquired based on the plurality of ΔdPES. Hereinafter, specific examples of a method of acquiring the indicator based on a plurality of ΔdPESs and a method of testing the linearity of the servo pattern 52 of the magnetic tape MT by using the indicator will be described.

Figure 17:
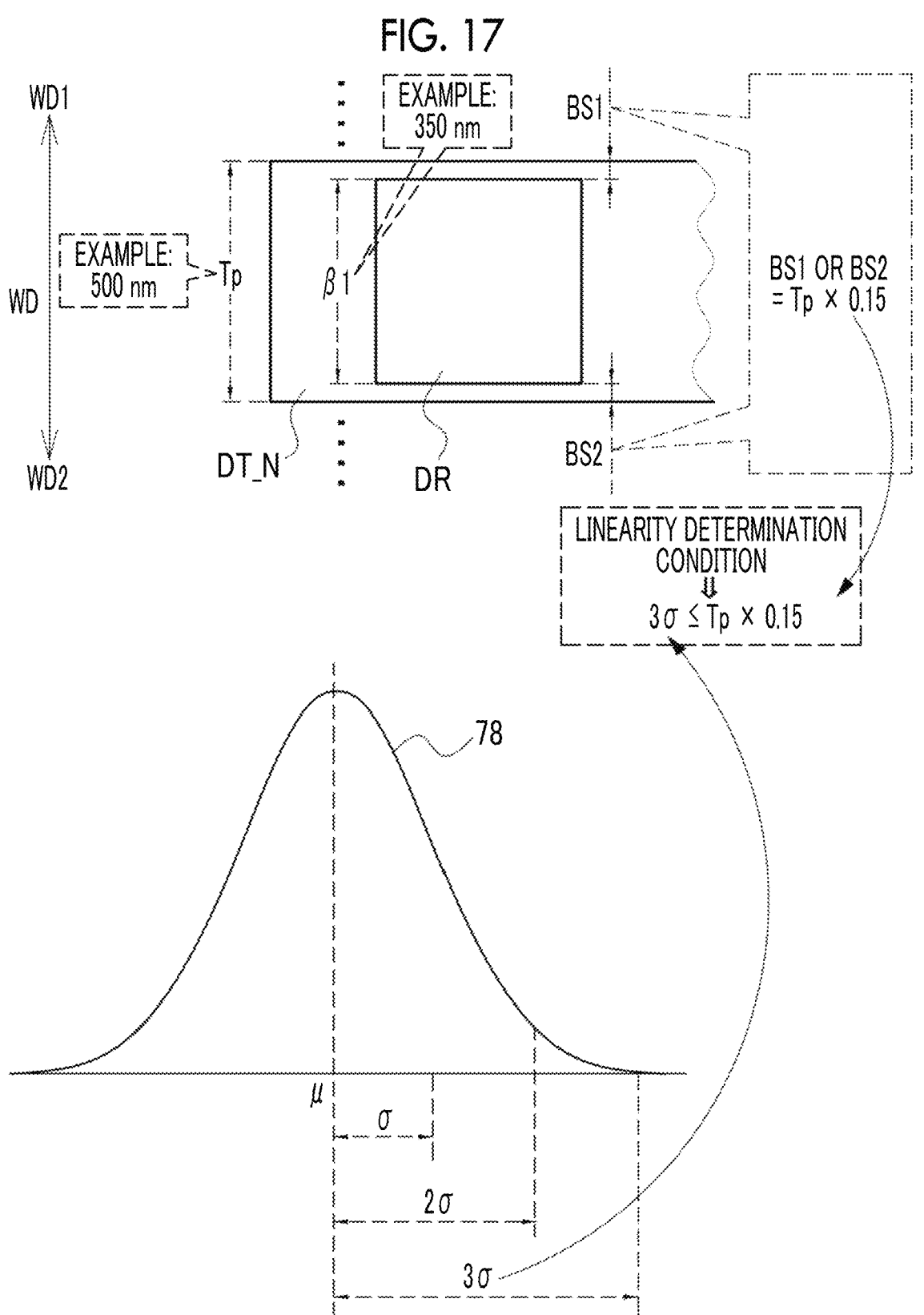
FIG. 17 is a conceptual diagram showing an example of linearity determination conditions.

As shown in FIG. 17 as an example, when the data reproducing element DR, having a length β1 of 350 nm, is on-track with a divided data track DT_N, having a pitch Tp of 500 nm, such that the center in the width direction WD of the data reproducing element DR coincides with the center in the width direction WD of the divided data track DT_N, blanks BS1 and BS2 are generated between the divided data track DT_N and the data reproducing element DR. The blank BS1 is a blank generated on the side of the first direction WD1, and the blank BS2 is a blank generated on the side of the second direction WD2.

Each of the length of the blank BS1 in the width direction WD and the length of the blank BS2 in the width direction WD corresponds to 15% of the pitch Tp.

In step ST12 included in the linearity test method shown in FIG. 14, an average value μ and a standard deviation σ of a plurality of ΔdPES are calculated from the plurality of ΔdPES measured from the adjacent servo pattern pair. The standard deviation σ represents the height of the linearity of the servo pattern 52. The linearity of the servo pattern 52 is higher as the standard deviation σ is smaller. Therefore, in the servo pattern recording step, it is preferable that the servo pattern 52 is recorded on the magnetic tape MT such that the standard deviation σ is as small as possible.

FIG. 17 shows a graph 78. The graph 78 is a graph showing a normal distribution obtained from the average value μ and the standard deviation σ. In a case where the total area of the closed region surrounded by the graph 78 is set to 100%, the ΔdPES is present in the section of σ with a probability of 68.3%, the ΔdPES is present in the section of 2σ with a probability of 95.4%, and the ΔdPES is present in the section of 3σ with a probability of 99.7%.

In step ST12 included in the linearity test method shown in FIG. 14, 3σ is calculated from the standard deviation σ. 3σ is an indicator indicating a degree of variation of a plurality of ΔdPES from an average value μ. The smaller the standard deviation σ is, the smaller 3σ is, and the smaller 3σ is, the higher the linearity of the servo pattern 52 is. As the linearity of the servo pattern 52 is higher, the data recording element DW is more likely to record data at a location intended by the user or the like in the magnetic tape MT, and the data reproducing element DR is more likely to be on-track in the divided data track DT_N.

Therefore, in order to facilitate recording of data in a location intended by the user or the like in the magnetic tape MT and to facilitate on-tracking of the data reproducing element DR on the divided data track DT_N, in step ST14 included in the linearity test method shown in FIG. 14, it is determined whether or not the linearity determination condition of "3σ is within 15% or less of the pitch Tp" is satisfied. This is because, in a case where 3σ is within 15% or less of the pitch Tp, it is expected that the data reproducing element DR is on-tracked on the divided data track DT_N with a probability of 99.7%.

In a case in which the linearity determination condition is satisfied, it is determined that the linearity of the servo pattern 52 is within the allowable range, and in a case in which the linearity determination condition is not satisfied, it is determined that the linearity of the servo pattern 52 is outside the allowable range. Then, the magnetic tape MT of which the linearity of the servo pattern 52 is determined to be within the allowable range is employed, and the magnetic tape MT of which the linearity of the servo pattern 52 is determined to be outside the allowable range is not employed. In addition, in a case in which it is determined that the linearity of the servo pattern 52 is within the allowable range, the servo pattern recording head WH is not replaced, and in a case in which it is determined that the linearity of the servo pattern 52 is outside the allowable range, the servo pattern recording head WH is replaced (for example, the servo pattern recording head WH in which the linearity of the gap pattern G is improved is replaced).

In the present embodiment, the standard deviation σ is an example of a "standard deviation" according to the technology of the present disclosure. In addition, in the present embodiment, 3σ is an example of an "indicator" and a "value corresponding to three times the standard deviation of the plurality of PES difference gaps" according to the technology of the present disclosure.

Figure 18:
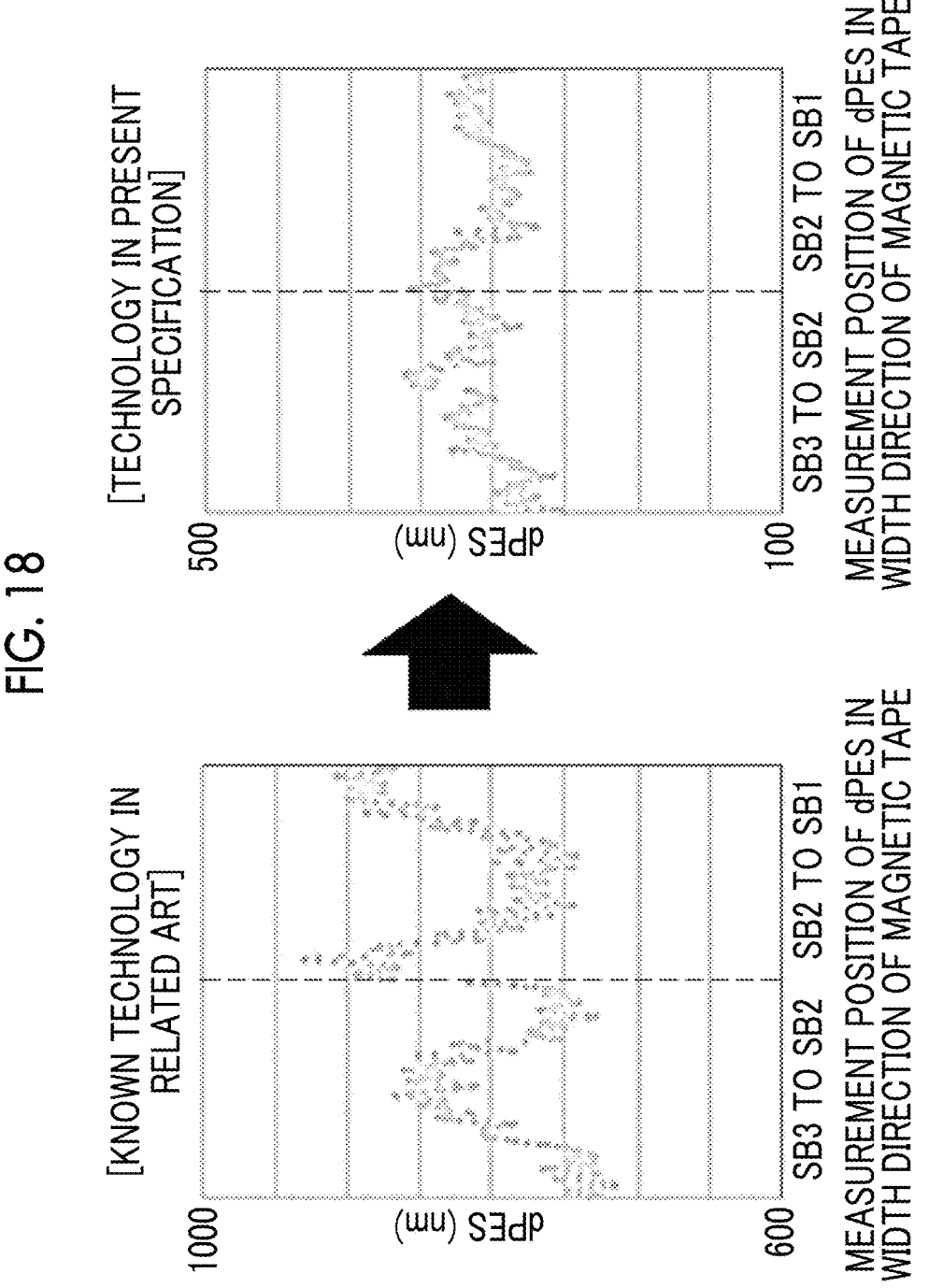
FIG. 18 is a graph showing a distribution of a plurality of dPES obtained from a magnetic tape manufactured by a known technology in the related art without using a linearity determination condition, and an example of a distribution of a plurality of dPES obtained from a magnetic tape manufactured through a step of determining that linearity of a servo pattern is within an allowable range using the linearity determination condition.
Figure 19:
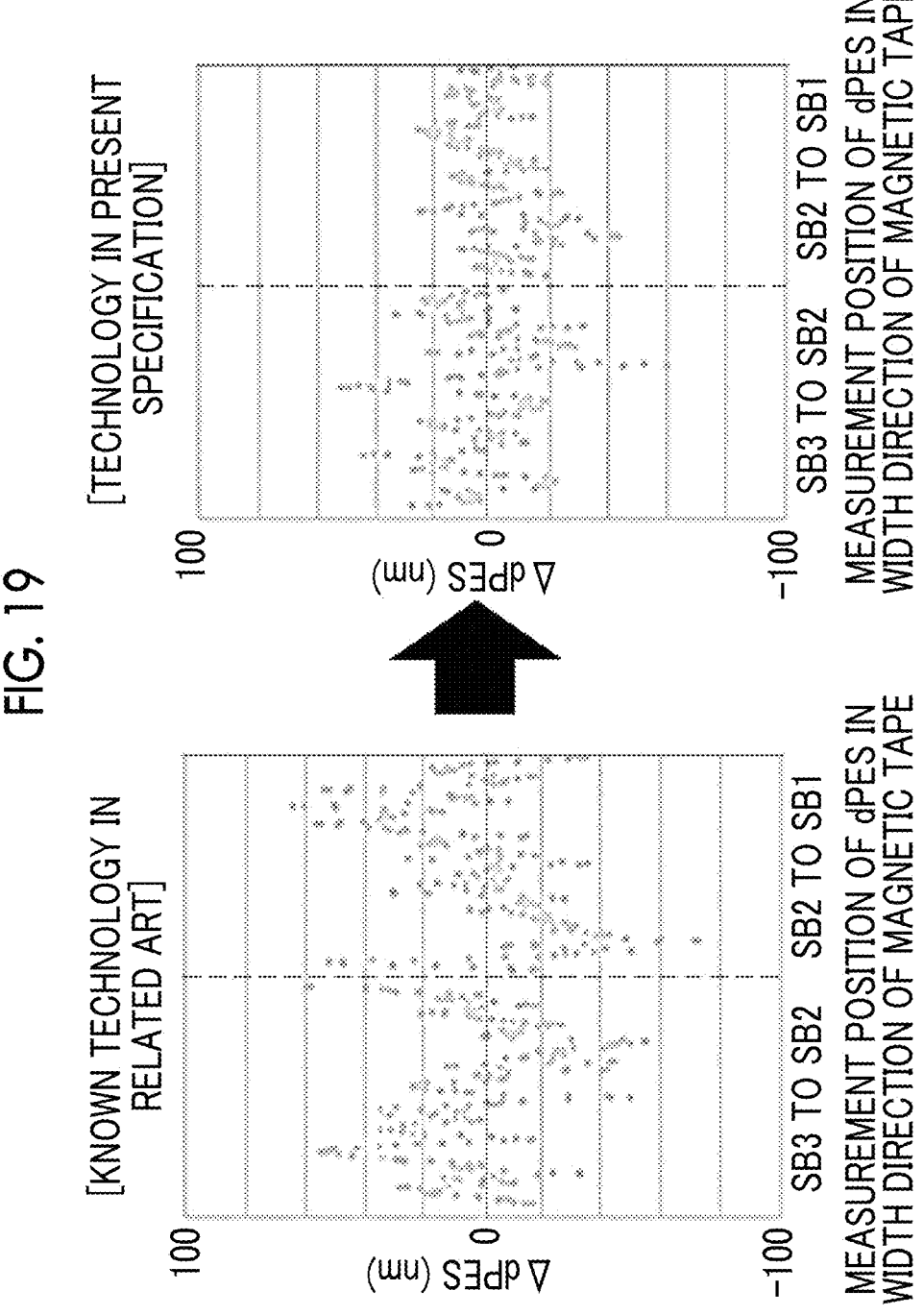
FIG. 19 is a graph showing an example of a distribution of a plurality of ΔdPES obtained from a magnetic tape manufactured by a known technology in the related art without using a linearity determination condition, and a distribution of a plurality of ΔdPES obtained from a magnetic tape manufactured through a step of determining that linearity of a servo pattern is within an allowable range by using the linearity determination condition.

FIG. 18 shows an example of a distribution of a plurality of dPES obtained from the magnetic tape MT manufactured by the known technology in the related art without using the linearity determination condition, and a distribution of a plurality of dPES obtained from the magnetic tape MT manufactured through a step of determining that the linearity of the servo pattern 52 is within an allowable range by using the linearity determination condition. FIG. 19 shows an example of a distribution of a plurality of ΔdPES obtained from the magnetic tape MT manufactured by the known technology in the related art without using the linearity determination condition, and a distribution of a plurality of ΔdPES obtained from the magnetic tape MT manufactured through a step of determining that the linearity of the servo pattern 52 is within the allowable range by using the linearity determination condition.

As an example, as shown in FIG. 18, a distribution of a plurality of dPES obtained from the magnetic tape MT manufactured through a step of determining that the linearity of the servo pattern 52 is within an allowable range by using the linearity determination condition has better cohesion than a distribution of a plurality of dPES obtained from the magnetic tape MT manufactured by the known technology in the related art without using the linearity determination condition. That is, the variation in dPES is small.

As an example, as shown in FIG. 19, a distribution of a plurality of ΔdPES obtained from the magnetic tape MT manufactured through a step of determining that the linearity of the servo pattern 52 is within an allowable range by using the linearity determination condition has better cohesion than a distribution of a plurality of ΔdPES obtained from the magnetic tape MT manufactured by the known technology in the related art without using the linearity determination condition. That is, the variation in ΔdPES is small.

Figure 20A:
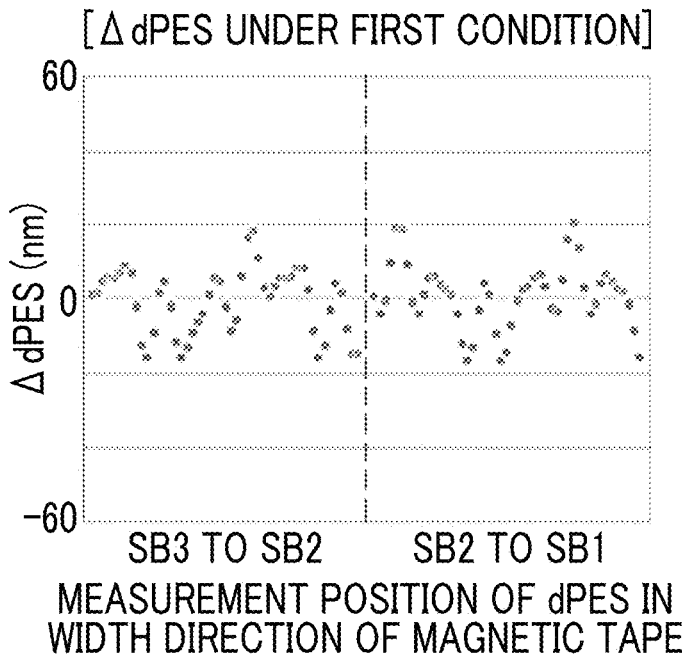
FIG. 20A is a graph showing an example of a distribution of a plurality of ΔdPES obtained under the first condition shown in Table 1.
Figure 20B:
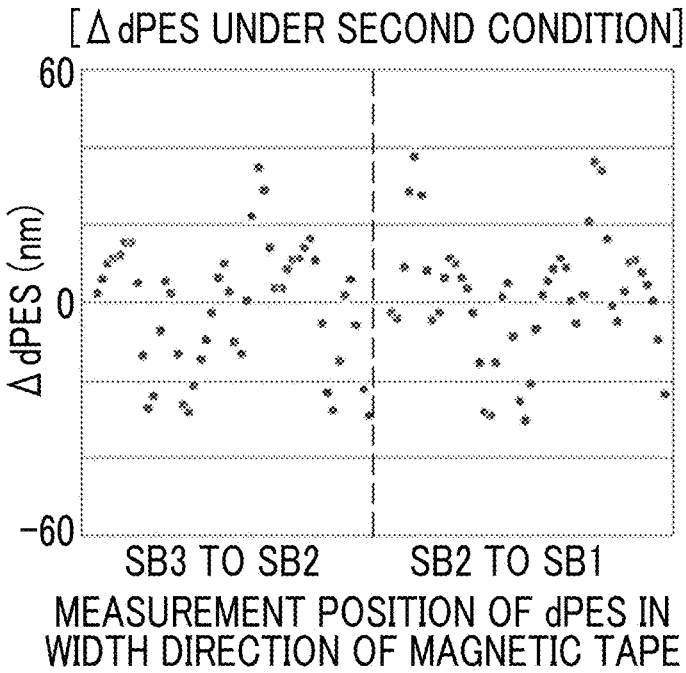
FIG. 20B is a graph showing an example of a distribution of a plurality of ΔdPES obtained under the second condition shown in Table 2.

FIG. 20A shows an example of a distribution of a plurality of ΔdPES obtained under the first condition shown in Table 1. FIG. 20B shows an example of a distribution of a plurality of ΔdPES obtained under the second condition shown in Table 2.

TABLE 1

| | [The First Condition] | |
| --- | --- | --- |
| Length L1 [μm] | | 2.5 |
| Pitch Tp [μm] | | 1.0 |
| Interval INT1 [μm] | | 0.75 |

TABLE 2

| | [The Second Condition] | |
| --- | --- | --- |
| Length L1 [μm] | | 10 |
| Pitch Tp [μm] | | 0.5 |
| Interval INT1 [μm] | | 4.75 |

As shown in FIGS. 20A and 20B as an example, a distribution of a plurality of ΔdPES obtained under the first condition may be more well-organized than a distribution of a plurality of ΔdPES obtained under the second condition. That is, the variation in ΔdPES is small.

Table 3 shows a value of 3σ obtained in a case where the magnetic tape MT is manufactured using each of a first servo pattern recording head (hereinafter, also referred to as a "first head"), a second servo pattern recording head (hereinafter, also referred to as a "second head"), and a third servo pattern recording head (hereinafter, also referred to as a "third head") under the first condition. Table 4 shows a value of 3σ obtained in a case where the magnetic tape MT is manufactured using each of the first head, the second head, and the third head under the second condition.

The first head is a servo pattern recording head according to a known technique in the related art, and the opening of the gap pattern G is formed by MEMS processing. The second head is the servo pattern recording head WH in which the opening of the gap pattern G is formed by the second method (a method of forming the groove 71 by trimming the entire width of the opening portion 66A shown in FIG. 13 using the FIB or the laser and filling the groove 71 with the non-magnetic body 68).

The third head is a servo pattern recording head obtained by performing MEMS processing on the opening of the gap pattern G under a processing condition different from the processing condition used for MEMS processing performed on an opening of the gap pattern G of the first servo pattern recording head.

TABLE 3

| | First head | Second head | Third head |
| --- | --- | --- | --- |
| [Under The First Condition] | | | |
| 3σ Section [nm] | 42 | 21 | 36 |
| 3σ Section/Pitch Tp [%] | 4 | 2 | 4 |

\* Pitch Tp = 1000 [nm]

TABLE 4

| | First head | Second head | Third head |
| --- | --- | --- | --- |
| [Under The Second Condition] | | | |
| 3σ Section [nm] | 79.2 | 45 | 60 |
| 3σ Section/Pitch Tp [%] | 16 | 9 | 12 |

\* Pitch Tp = 500 [nm]

Next, an action of the magnetic tape system 10 according to the present embodiment will be described with reference to FIGS. 12 to 16.

First, a case where the first recording module DWM1 forms the data track DT on the magnetic tape MT determined to have the linearity of all the servo patterns 52 to be tested (that is, the linearity determination condition is satisfied) within the allowable range by the linearity test method will be described.

Figure 21:
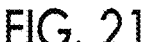
FIG. 21 is a conceptual diagram showing an example of an aspect of the first recording module in a case in which the servo pattern is read through a path closest to one end side of a width of the magnetic tape among a plurality of paths used by the first servo reading element in a case of recording data.

As shown in FIG. 21 as an example, first, the pair of first servo reading elements SRa are positioned in the servo bands SB adjacent to each other in the width direction WD. Specifically, one first servo reading element SRa of the pair of first servo reading elements SRa (hereinafter, also referred to as "one first servo reading element SRa") is positioned in the servo band SB3, and the other first servo reading element SRa of the pair of first servo reading elements SRa (hereinafter, also referred to as "the other first servo reading element SRa") is positioned in the servo band SB2. More specifically, the first recording module DWM1 is positioned on the magnetic tape MT by moving the magnetic head 28 in the width direction WD such that one first servo reading element SRa is positioned on the path Pa1 of the servo band SB3 and the other first servo reading element SRa is positioned on the path Pa1 of the servo band SB2.

Figure 22:
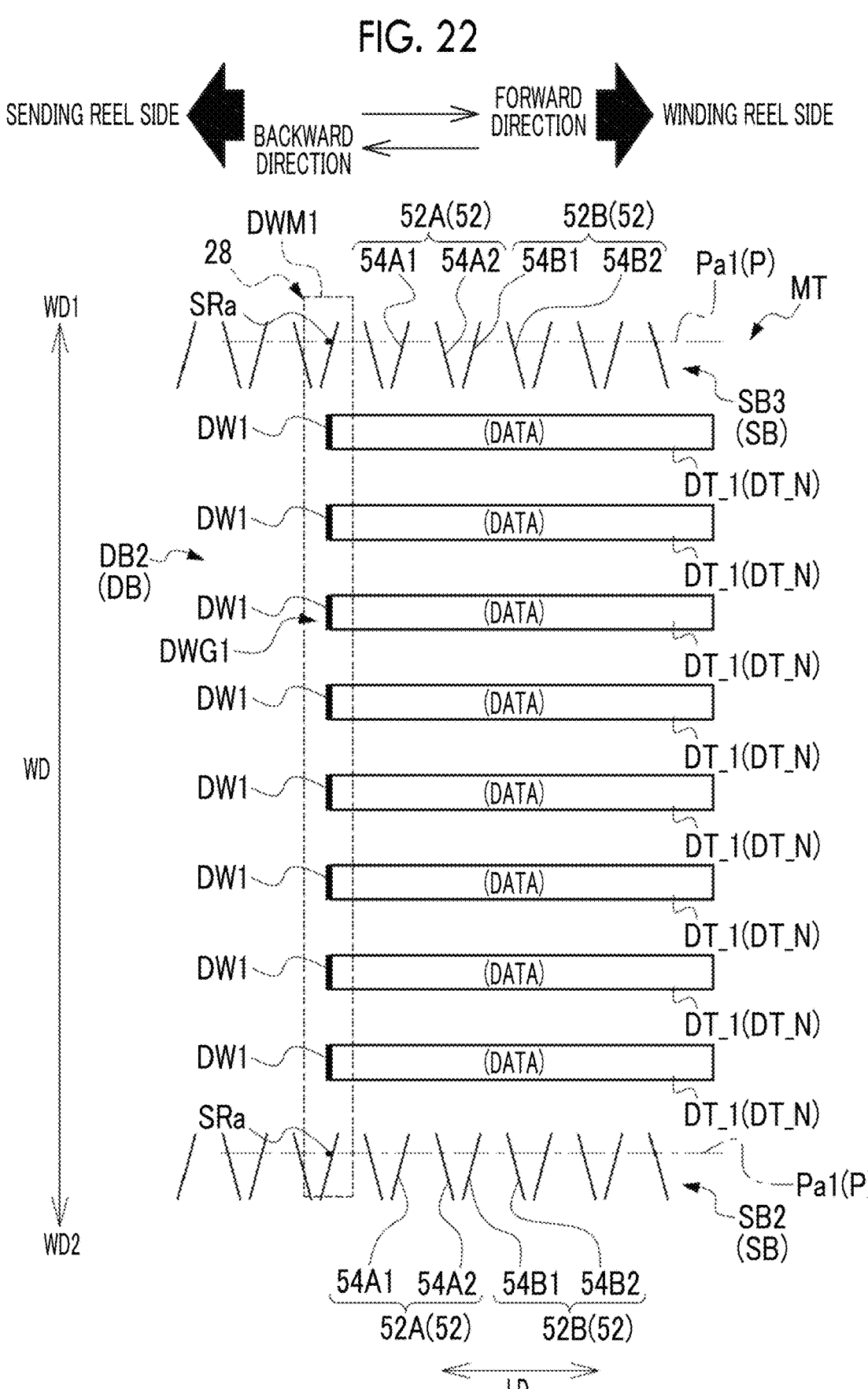
FIG. 22 is a conceptual diagram showing an example of an aspect in a case in which one divided data track is formed by each of a plurality of first data recording elements of a first recording module.

In this state, the magnetic tape MT is caused to travel in the forward direction, and the recording processing is performed on each data recording element DW1 of the first recording module DWM1. As a result, as shown in FIG. 22 as an example, the divided data track DT_1 is formed by each data recording element DW1 of the first recording module DWM1 with respect to the magnetic tape MT.

After the divided data track DT_1 is formed, the magnetic tape MT is caused to travel in the reverse direction to return the first recording module DWM1 to the position where the formation of the divided data track DT_1 is started. Then, in a state in which the magnetic head 28 is shifted by the pitch Tp along the second direction WD2, the magnetic tape MT is caused to travel in the forward direction and the recording processing is performed on each data recording element DW1 of the first recording module DWM1. As a result, the divided data track DT_2 is formed by each data recording element DW1 of the first recording module DWM1 on the magnetic tape MT.

Figure 23:
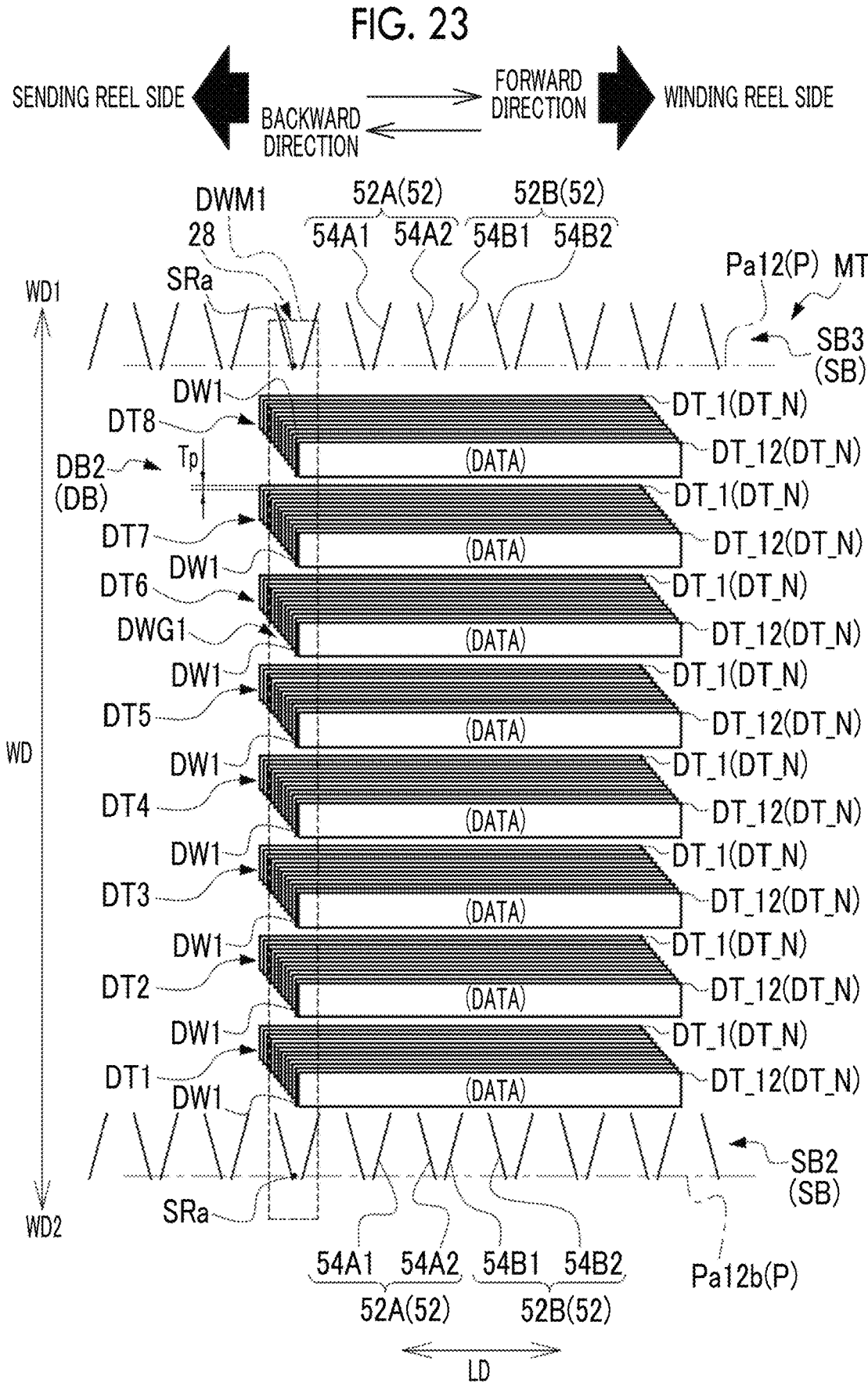
FIG. 23 is a conceptual diagram showing an example of an aspect of a data track formed by a plurality of divided data tracks being shifted and superimposed along a second direction by each of the plurality of first data recording elements of a first recording module.

In the same manner as in a case in which the divided data tracks DT_1 and DT_2 are sequentially formed, the divided data tracks DT_3 to DT_12 are sequentially formed by each data recording element DW1 of the first recording module DWM1. As a result, as shown in FIG. 23 as an example, in the width direction WD, a data band DB2 including the data tracks DT1 to DT8 is formed between the servo band SB2 and the servo band SB3.

In a case where the divided data tracks DT_1 to DT_12 are sequentially formed, the first servo reading element SRa is sequentially positioned on paths Pa1 to Pa12, which are set at each pitch Tp from the first direction WD1 side toward the second direction WD2 side with respect to a plurality of servo patterns 52 included in the servo band SB. Then, the servo pattern 52 in each servo band SB is read by the first servo reading element SRa along each of the paths Pa1 to Pa12, and the servo control is performed in accordance with the obtained servo pattern signal.

Next, a case in which the reproducing module DRM sequentially reproduces the data from the divided data track DT_1 to the divided data track DT_12 included in each data track DT will be described.

Figure 24:
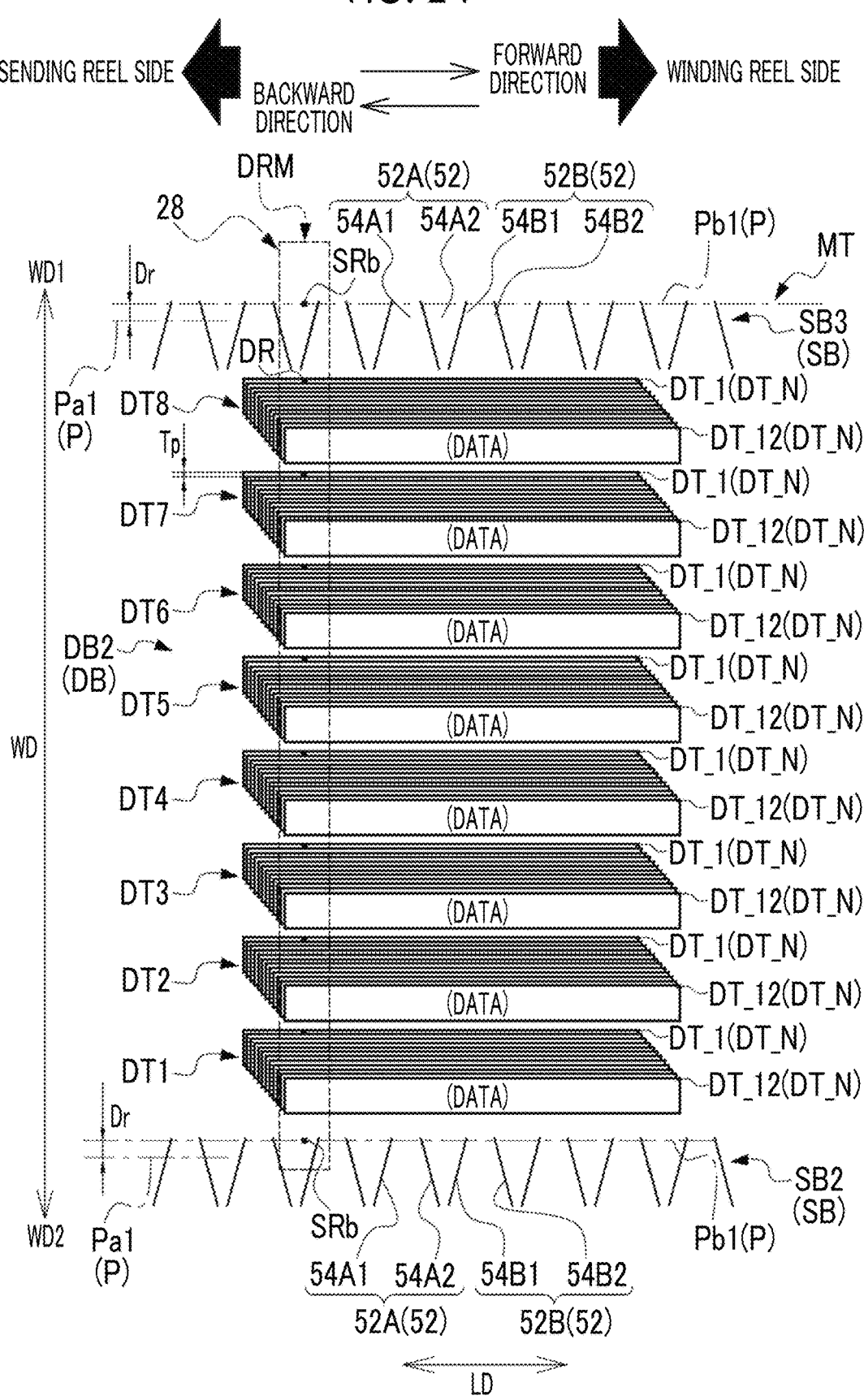
FIG. 24 is a conceptual diagram showing an example of an aspect of the reproducing module in a case where the data reproducing element reproduces data from a divided data track positioned on the closest one end side of the width of the magnetic tape among a plurality of divided data tracks forming one data track.
Figure 25:
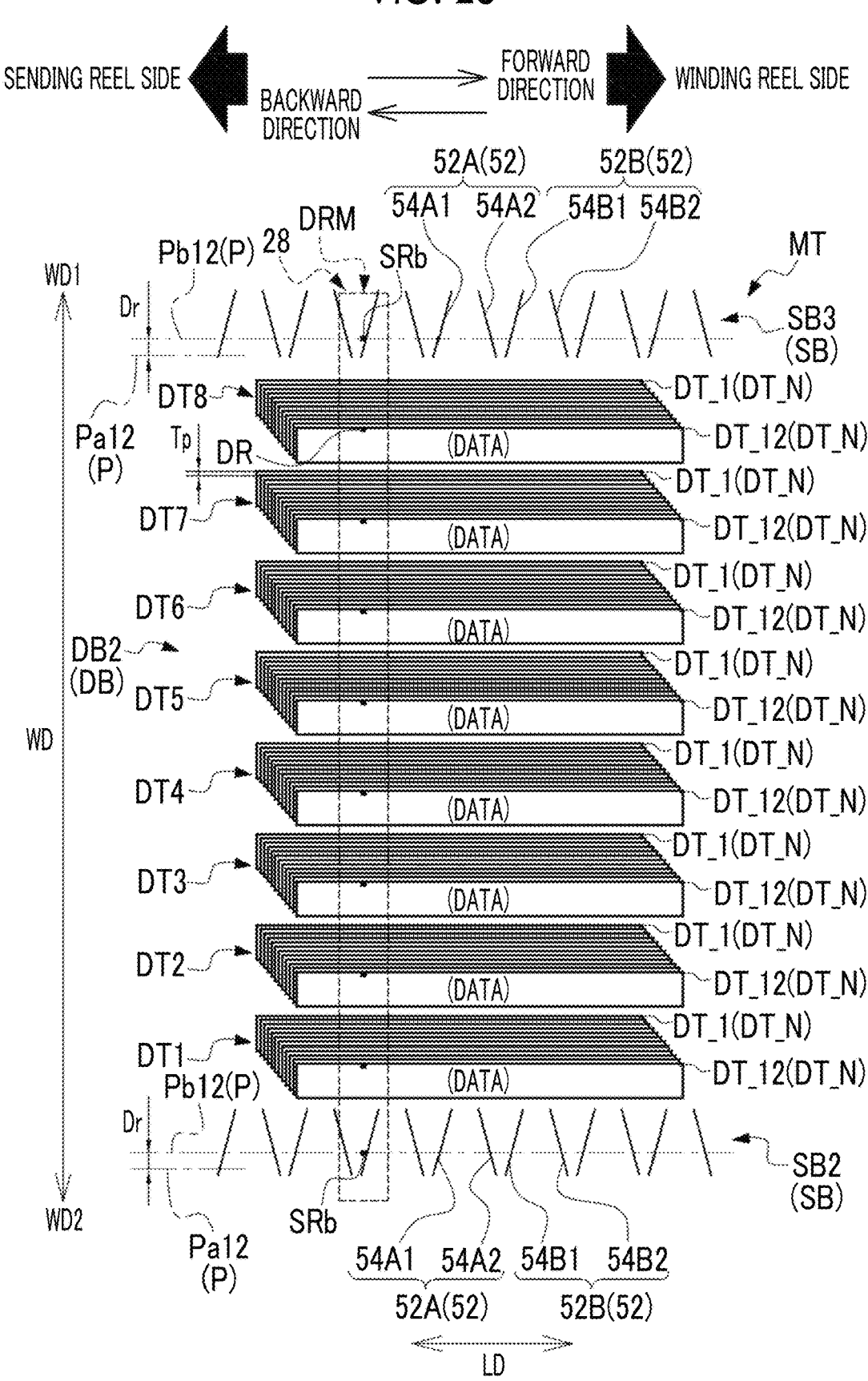
FIG. 25 is a conceptual diagram showing an example of an aspect of the reproducing module in a case where the data reproducing element reproduces data from a divided data track positioned on the closest other end side of the width of the magnetic tape among a plurality of divided data tracks forming one data track.

As an example, as shown in FIGS. 24 and 25, in the plurality of servo patterns 52 included in the servo band SB, the paths Pb1 to Pb12 are set for each pitch Tp from the first direction WD1 side to the second direction WD2 side. The path Pb1 to the path Pb12 correspond to the path Pa1 to the path Pa12, and each of the path Pb1 to the path Pb12 is set at a position shifted to the first direction WD1 side by the distance Dr from each of the path Pa1 to the path Pa12.

As shown in FIG. 24 as an example, first, the pair of second servo reading elements SRb are positioned in the servo bands SB adjacent to each other in the width direction WD. Specifically, one second servo reading element SRb of the pair of second servo reading elements SRb (hereinafter, also referred to as "one second servo reading element SRb") is positioned in the servo band SB3, and the other second servo reading element SRb of the pair of second servo reading elements SRb (hereinafter, also referred to as "the other second servo reading element SRb") is positioned in the servo band SB2. More specifically, the reproducing module DRM is positioned on the magnetic tape MT by moving the magnetic head 28 in the width direction WD such that one second servo reading element SRb is positioned on the path Pb1 of the servo band SB3 and the other second servo reading element SRb is positioned on the path Pb1 of the servo band SB2.

In this state, the magnetic tape MT is caused to travel in the forward direction, and the reproducing processing is performed on each data reproducing element DR of the reproducing module DRM. As a result, the data is reproduced from the divided data track DT_1 by each data reproducing element DR of the reproducing module DRM on the magnetic tape MT.

After the data is reproduced from divided data track DT_1, the magnetic tape MT is caused to travel in the reverse direction to return the reproducing module DRM to the position where the reproduction of data from the divided data track DT_1 is started. Then, in a state in which the magnetic head 28 is shifted by the pitch Tp along the second direction WD2, the magnetic tape MT is caused to travel in the forward direction and the reproducing processing is performed on each data reproducing element DR of the reproducing module DRM. As a result, the data is reproduced from the divided data track DT_2 by each data reproducing element DR of the reproducing module DRM on the magnetic tape MT.

In the same manner as in a case in which the data is sequentially reproduced from the divided data tracks DT_1 and DT_2, the reproduction of data is sequentially performed from the divided data tracks DT_3 to DT_12 by each data reproducing element DR of the reproducing module DRM.

In the example shown in FIG. 25, one second servo reading element SRb is positioned on the path Pb12 of the servo band SB3, and the other second servo reading element SRb is positioned on the path Pb12 of the servo band SB2. In this state, the magnetic tape MT is caused to travel in the forward direction, and the reproducing processing is performed on each data reproducing element DR of the reproducing module DRM. As a result, the data is reproduced from the divided data track DT_12 by each data reproducing element DR of the reproducing module DRM on the magnetic tape MT.

Here, although an example of a form in which the data from the divided data tracks DT_1 to DT_12 is sequentially reproduced from the divided data track DT_1 to the divided data track DT_12 is described, this is merely an example, and the data may be sequentially reproduced from the divided data track DT_12 to the divided data track DT_1, or the data may be reproduced from the divided data track DT_N designated by the user or the like.

Figure 26:
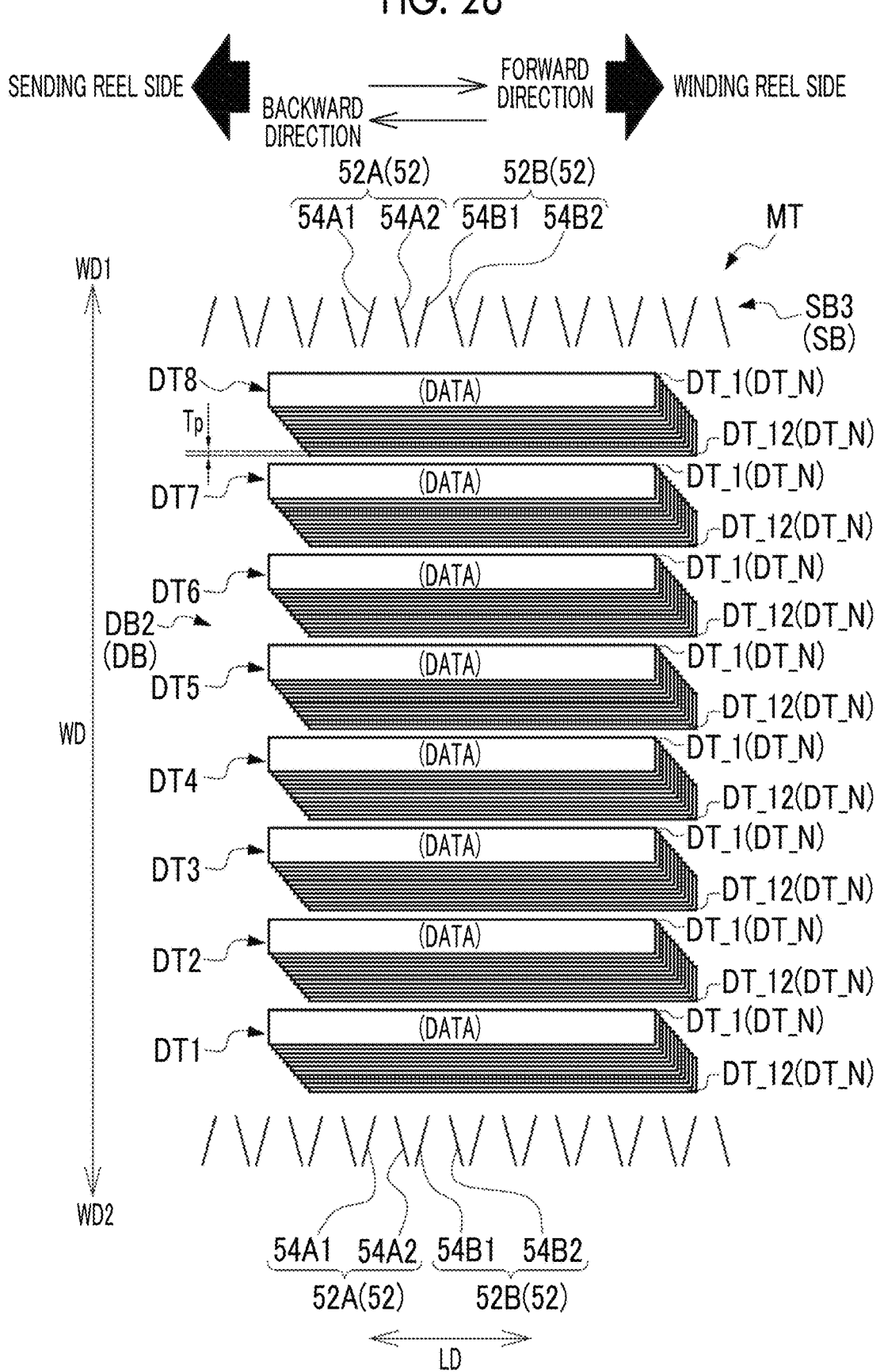
FIG. 26 is a conceptual diagram showing an example of an aspect of a data track formed by a plurality of pieces of the divided data tracks being shifted and superimposed along a first direction by each of a plurality of data recording elements of a recording module.

In the examples shown in FIGS. 22 to 25, a case in which the divided data tracks DT_1 to DT_12 are overlapped while being shifted sequentially by the pitch Tp along the second direction WD2 is described, but the technology of the present disclosure is not limited thereto. For example, as shown in FIG. 26, the plurality of divided data tracks DT_N may be formed by being superimposed along the first direction WD1 using the SMR method. In this case, the second recording module DWM2 is used. Specifically, by sequentially moving a pair of third servo reading elements SRc from path Pa12 to path Pa1 and running the magnetic tape MT in the reverse direction, the servo patterns 52 are read by the pair of third servo reading elements SRc while the pair of third servo reading elements SRc is moved along path P. The magnetic head 28 is moved along the first direction WD1 in accordance with the servo pattern signal obtained in this manner, and the divided data tracks DT_12 to DT_1 are sequentially superimposed along the first direction WD1.

In this case as well, the data is reproduced from the divided data tracks DT_1 to DT_12 by each data reproducing element DR of the reproducing module DRM. Each of the paths Pb1 to Pb12 is set at a position deviated from each of the paths Pa1 to Pa12 by the distance Dr to the second direction WD2 side, and in a case where the data is reproduced from the divided data tracks DT_1 to DT_12, the reading of the servo pattern 52 by the second servo reading element SRb is performed by using the paths Pb1 to Pb12, and the servo control is performed in accordance with the obtained servo pattern signal.

Here, although an example of a form in which the data from the divided data tracks DT_1 to DT_12 is sequentially reproduced from the divided data track DT_1 to the divided data track DT_12 is described, this is merely an example, and the data may be sequentially reproduced from the divided data track DT_12 to the divided data track DT_1, or the data may be reproduced from the divided data track DT_N designated by the user or the like.

As described above, in the present embodiment, in the test step included in the manufacturing method of the magnetic tape MT, the linearity of the servo pattern 52 recorded on the magnetic tape MT in the servo pattern recording step is tested using the linearity test method (see FIG. 14) (see step ST14 shown in FIG. 14). In the present embodiment, a plurality of ΔdPESs are measured in order to test the linearity of the servo pattern 52 (see FIG. 16).

ΔdPES is a difference between dPES(n−3) and dPES(n) (see FIG. 16). The dPES(n−3) is a difference in PES between a pair of first positions 74 corresponding to each other in the width direction WD in a pair of servo patterns 52 recorded at corresponding positions in the width direction WD between a pair of servo bands SB adjacent to each other in the width direction WD among the plurality of servo bands SB (see FIG. 16). dPES(n) is a difference in PES between a pair of second positions 76 obtained by shifting the pair of first positions 74 by an interval INT1 larger than the interval INT2 in the width direction WD in the pair of servo patterns 52 recorded at the corresponding positions in the width direction WD between the pair of servo bands SB adjacent to each other in the width direction WD among the plurality of servo bands SB (see FIG. 16).

The plurality of ΔdPESs are obtained by measuring the ΔdPES for each interval INT2 along the width direction WD in the pair of servo patterns 52. In the present embodiment, in order to test the linearity of the servo pattern 52, the degree of variation of the plurality of ΔdPES from the average value of the plurality of ΔdPES is acquired as an indicator indicating the non-linearity of the servo pattern 52 (see step ST12 shown in FIG. 14). Then, the linearity of the servo pattern 52 of the magnetic tape MT is tested using the indicator indicating the non-linearity of the servo pattern 52 (see step ST14 shown in FIG. 14).

In the present embodiment, in a case in which the condition that the indicator indicating the non-linearity of the servo pattern 52 is equal to or less than 15% of the pitch Tp is satisfied (see FIG. 17), it is determined that the linearity of the servo pattern 52 of the magnetic tape MT is within an allowable range (that is, there is no problem with the linearity of the servo pattern 52 used for the servo control). In addition, in a case in which the condition that the indicator indicating the non-linearity of the servo pattern 52 is within 15% or less of the pitch Tp is not satisfied, it is determined that the linearity of the servo pattern 52 of the magnetic tape MT is out of the allowable range (that is, there is a problem with the linearity of the servo pattern 52 used for the servo control). 15% of the pitch Tp corresponds to each of the length of the blank BS1 in the width direction WD and the length of the blank BS2 in the width direction WD (see FIG. 17). The fact that the indicator is within 15% of the pitch Tp means that high-accuracy servo control can be performed as compared with a case where the indicator exceeds 15% of the pitch Tp. This means that the plurality of divided data tracks DT_N can be formed with high accuracy, and the data reproducing element DR can track the divided data tracks DT_N with high accuracy.

As described above, by determining whether or not the condition that the indicator indicating the non-linearity of the servo pattern 52 is equal to or less than 15% of the pitch Tp is satisfied, it is possible to employ the magnetic tape MT in which only the plurality of servo patterns 52 satisfying the condition that the indicator indicating the non-linearity of the servo pattern 52 is equal to or less than 15% of the pitch Tp are recorded, as the magnetic tape MT for shipment. By adopting the magnetic tape MT in which the linearity of the servo pattern 52 is guaranteed at such a high level as the magnetic tape MT for shipment, it is possible to contribute to improvement in accuracy of recording data on the magnetic tape MT and accuracy of reproducing data recorded on the magnetic tape MT.

In addition, in the present embodiment, the indicator is obtained for each of all the adjacent servo band pairs (for example, a pair of servo bands SB2 and SB3 and a pair of servo bands SB1 and SB2) included in the magnetic tape MT. Then, the test of the magnetic tape MT is performed using all the indicators. Therefore, it is possible to test the magnetic tape MT with high accuracy as compared with a case where the magnetic tape MT is tested by using an indicator obtained from only one adjacent servo band pair with respect to the magnetic tape MT in which three or more servo bands SB are arranged in the width direction.

In addition, in the present embodiment, each of the indicators obtained for all the adjacent servo band pairs included in the magnetic tape MT is within 15% or less of the pitch Tp. Therefore, it is possible to contribute to improvement of the accuracy of recording data on the magnetic tape MT and the accuracy of reproducing the data recorded on the magnetic tape MT, compared to a case where the indicator obtained from only one adjacent servo band pair is within 15% or less of the pitch Tp with respect to the magnetic tape MT in which three or more servo bands SB are arranged in the width direction.

In addition, in the present embodiment, a plurality of divided data tracks DT_N are formed in the magnetic tape MT by recording data in the SMR method in accordance with the plurality of servo patterns 52 with respect to the magnetic tape MT (that is, the magnetic tape MT in which the linearity of the servo pattern 52 is guaranteed at a high level) in which the condition that the indicator indicating the non-linearity of the servo pattern 52 is within 15% or less of the pitch Tp is satisfied. Therefore, it is possible to guarantee the quality of the plurality of divided data tracks DT_N formed by recording the data on the magnetic tape MT by using the SMR method at a high level, and it is possible to reproduce the data with high accuracy from the plurality of divided data tracks DT_N.

In addition, in the present embodiment, an average value μ and a standard deviation σ of a plurality of ΔdPES are calculated. Then, $3\sigma$ of a graph 78 (see FIG. 17) showing a normal distribution obtained from the average value $\mu$ and the standard deviation $\sigma$ is used as an indicator indicating the non-linearity of the servo pattern 52 (see FIG. 17). The $\Delta$dPES is present in a closed region of $3\sigma$ in the graph 78 with a probability of 99.7%. In the present embodiment, by determining whether or not the condition that $3\sigma$ is equal to or less than 15% of the pitch Tp is satisfied, it is possible to adopt the magnetic tape MT in which only the plurality of servo patterns 52 satisfying the condition that $3\sigma$ is equal to or less than 15% of the pitch Tp are recorded as the magnetic tape MT for shipment. By adopting the magnetic tape MT in which the linearity of the servo pattern 52 is guaranteed at such a high level as the magnetic tape MT for shipment, it is possible to contribute to improvement in accuracy of recording data on the magnetic tape MT and accuracy of reproducing data recorded on the magnetic tape MT.

In addition, in the present embodiment, as the interval INT1 (see FIG. 16) used for measuring $\Delta$dPES (see FIG. 16), an interval is used that is a reference interval which is a natural number multiple of the interval INT2 (three times in the example shown in FIG. 16), and that is closest to a reference interval corresponding to half of the difference between the length L1 (see FIG. 11) and the pitch Tp (see FIG. 10). Therefore, even in a case where a plurality of divided data tracks DT_N are made denser, the data reproducing element DR can be made to be on-tracked with each of the plurality of divided data tracks DT_N with high accuracy during the reproduction of data, as compared with a case where the interval INT1 is determined regardless of the length L1 and the pitch Tp.

In addition, in the present embodiment, as the interval INT1 (see FIG. 16) used for measuring $\Delta$dPES (see FIG. 16), an interval corresponding to three times the interval INT2 (see FIG. 16) is used. Therefore, a plurality of $\Delta$dPES (see FIG. 16) used to obtain an indicator indicating the non-linearity of the servo pattern 52 can be collected without excess or deficiency.

By the way, the interval INT1 (see FIG. 16) is an interval corresponding to a distance Dr for moving the magnetic head 28 in the width direction WD in tracking during the reproduction of the data between the divided data tracks DT_N adjacent to each other in the width direction WD. In a case where the distance Dr is short, the tracking during the recording of the data and the tracking during the reproduction of the data are performed in a state where the position of the first servo reading element SRa used during the recording of the data and the position of the second servo reading element SRb used during the reproduction of the data are close to each other. Therefore, even in a case where the servo pattern signal has distortion, the influence of the distortion is suppressed to be relatively small. On the contrary, as the distance Dr increases, the influence of the distortion is relatively large, and the misregistration due to the distortion is large.

Assuming a case where data is recorded on the magnetic tape MT by the SMR method, a difference between a position of the first servo reading element SRa in a case where the divided data track DT_1 is formed by the first data recording and a position of the second servo reading element SRb in a case where the divided data track DT_2 is formed by the second data recording corresponds to the pitch Tp.

In a case where the distance Dr (see FIGS. 11, 24, and 25) during the reproduction of the data is shorter than the pitch Tp (see FIGS. 10 and 23 to 25), the influence of the misregistration during the reproduction of the data is within the range of the influence of the misregistration during the recording of the data, and the influence of the linearity of the servo pattern 52 is small.

On the contrary, in a case where the distance Dr during the reproduction of the data is larger than the pitch Tp, the influence of the misregistration during the reproduction of the data does not fall within the range of the influence of the misregistration during the recording of the data, and the influence of the linearity of the servo pattern 52 increases. This leads to deterioration in the performance of the servo control.

Therefore, in the present embodiment, an interval larger than the pitch Tp is employed as an interval INT1 (see FIG. 16) which is the interval corresponding to the distance Dr. As a result, the servo pattern 52 is formed such that an indicator (for example, $3\sigma$) indicating a degree of variation of the plurality of $\Delta$dPES determined based on the interval INT1 larger than the pitch Tp is within 15% or less of the pitch Tp. Therefore, even in a case where a plurality of divided data tracks DT_N are made denser as compared with a case where the interval INT1 is equal to or less than the pitch Tp, the data reproducing element DR can be made to be on-tracked with each of the plurality of divided data tracks DT_N with high accuracy during the reproduction of data.

In the above embodiment, each of the indicators (for example, $3\sigma$) obtained for each of the adjacent servo band pairs is set to be equal to or less than 15% of the pitch Tp, but the technology of the present disclosure is not limited to this. For example, each of the indicators obtained for each of the adjacent servo band pairs may be made equal to or less than 10% of the pitch Tp, or each of the indicators obtained for each of the adjacent servo band pairs may be made equal to or less than 5% of the pitch Tp. In the example shown in FIG. 17, 500 nm is exemplified as an example of the length $\beta$1, but in a case where the indicator is set to 10% or less of the pitch Tp, the length $\beta$1 can be increased to 400 nm, and in a case where the indicator is set to 5% or less of the pitch Tp, the length $\beta$1 can be increased to 450 nm. In a case where the length $\beta$1 can be made long as described above, it is possible to expect improvement in performance of reproducing data. In addition, the PES caused by the fluctuation in the width direction WD of the magnetic tape MT is also a factor of the misregistration of the data reproducing element DR, but the design in which the tolerance for the misregistration caused by the PES is increased can be made by making the indicator equal to or less than 10% of the pitch Tp or making the indicator equal to or less than 5% of the pitch Tp.

In the above-described embodiment, a case where the divided data tracks DT_1 to DT_12 are overlapped by being shifted sequentially by the pitch Tp along the second direction WD2 has been described, but the technology of the present disclosure is not limited to this. For example, as shown in FIG. 26, the plurality of divided data tracks DT_N may be formed by being superimposed along the first direction WD1 using the SMR method. In this case, the second recording module DWM2 is used. Specifically, the servo pattern 52 is read by the pair of third servo reading elements SRc while the pair of third servo reading elements SRc is moved along the path P by moving the pair of third servo reading elements SRc sequentially from the path P12 to the path P1 and causing the magnetic tape MT to travel in the backward direction. The magnetic head 28 is moved along the first direction WD1 in accordance with the servo pattern signal obtained in this manner, and the divided data tracks DT_12 to DT_1 are sequentially superimposed along the first direction WD1. The data is reproduced from the divided data tracks DT_1 to DT_12 by each data reproducing element DR of the reproducing module DRM.

In the examples shown in FIGS. 24 and 25, the paths Pb1 to Pb12 used for reading the servo pattern 52 during the reproduction of the data are set to the first direction WD1 side by the distance Dr from the paths Pa1 to Pa12. On the other hand, in the example shown in FIG. 26, the paths Pb1 to Pb12 used for reading the servo pattern 52 during the reproduction of the data are set to the second direction WD2 side by the distance Dr from the paths Pa1 to Pa12.

By the way, in recent years, research on a technology for reducing the influence of TDS has been advanced. It has been known that the TDS is affected by a temperature, humidity, a pressure at which the magnetic tape is wound around the reel, temporal deterioration, or the like, the TDS is increased in a case where no measures are taken, and off-tracking (that is, misregistration of the data recording/reproducing element DRW with respect to the divided data track DT_N in the data band DB) occurs in a scene in which the magnetic processing is performed on the data band DB.

For example, in a case in which the width of the magnetic tape MT contracts with passage of time, there is concern that the off-tracking may occur. The off-tracking refers to a state in which the data recording/reproducing element DRW is not positioned on the designated divided data track DT_N among the divided data tracks DT1_1, DT1_2, DT1_3, DT1_4, . . . , DT1_11, and DT1_12 included in the divided data track group DTG (that is, a state in which the position of the designated divided data track DT_N and the position of the data recording/reproducing element DRW are shifted from each other in the width direction WD).

In some cases, the width of the magnetic tape MT expands, and the off-tracking may occur in such cases as well. That is, in a case in which the width of the magnetic tape MT contracts or expands with the elapse of time, the position of the servo reading element SR with respect to the servo pattern 52 diverges in the width direction WD from a predetermined position (that is, a predetermined position determined in design with respect to each of the linear magnetization regions 54A1, 54A2, 54B1, and 54B2) determined in design. In a case in which the position of the servo reading element SR with respect to the servo pattern 52 diverges from the predetermined position determined by the design in the width direction WD, the accuracy of the servo control is deteriorated, and the position of the track (for example, the designated divided data track DT_N among the divided data tracks DT1_1, DT1_2, DT1_3, DT1_4, . . . , DT1_11, and DT1_12) in the data band DB and the position of the data recording/reproducing element DRW deviate from each other. Then, an originally scheduled divided data track DT_N will not be subjected to the magnetic processing.

As a method of reducing the influence of the TDS, a method of adjusting the width of the magnetic tape MT by adjusting the tension applied to the magnetic tape MT is considered. However, in a case in which an amount of deformation of the magnetic tape MT in the width direction WD is too large, the off-tracking may not be eliminated even in a case in which the tension applied to the magnetic tape MT is adjusted. In addition, in a case in which the tension applied to the magnetic tape MT is increased, the load applied to the magnetic tape MT is also increased, which may lead to shortening the life of the magnetic tape MT. Further, in a case where the tension applied to the magnetic tape MT is too weak, the contact state between the magnetic head 28 and the magnetic tape MT is unstable, and it is difficult for the magnetic head 28 to perform the magnetic processing on the magnetic tape MT. As a method of reducing the influence of the TDS other than the method of adjusting the tension applied to the magnetic tape MT, as shown in FIG. 27 as an example, a method of holding the position of the servo reading element SR with respect to the servo pattern 52 at the predetermined position determined in design by skewing the magnetic head 28 on the magnetic tape MT is known.

Figure 27:
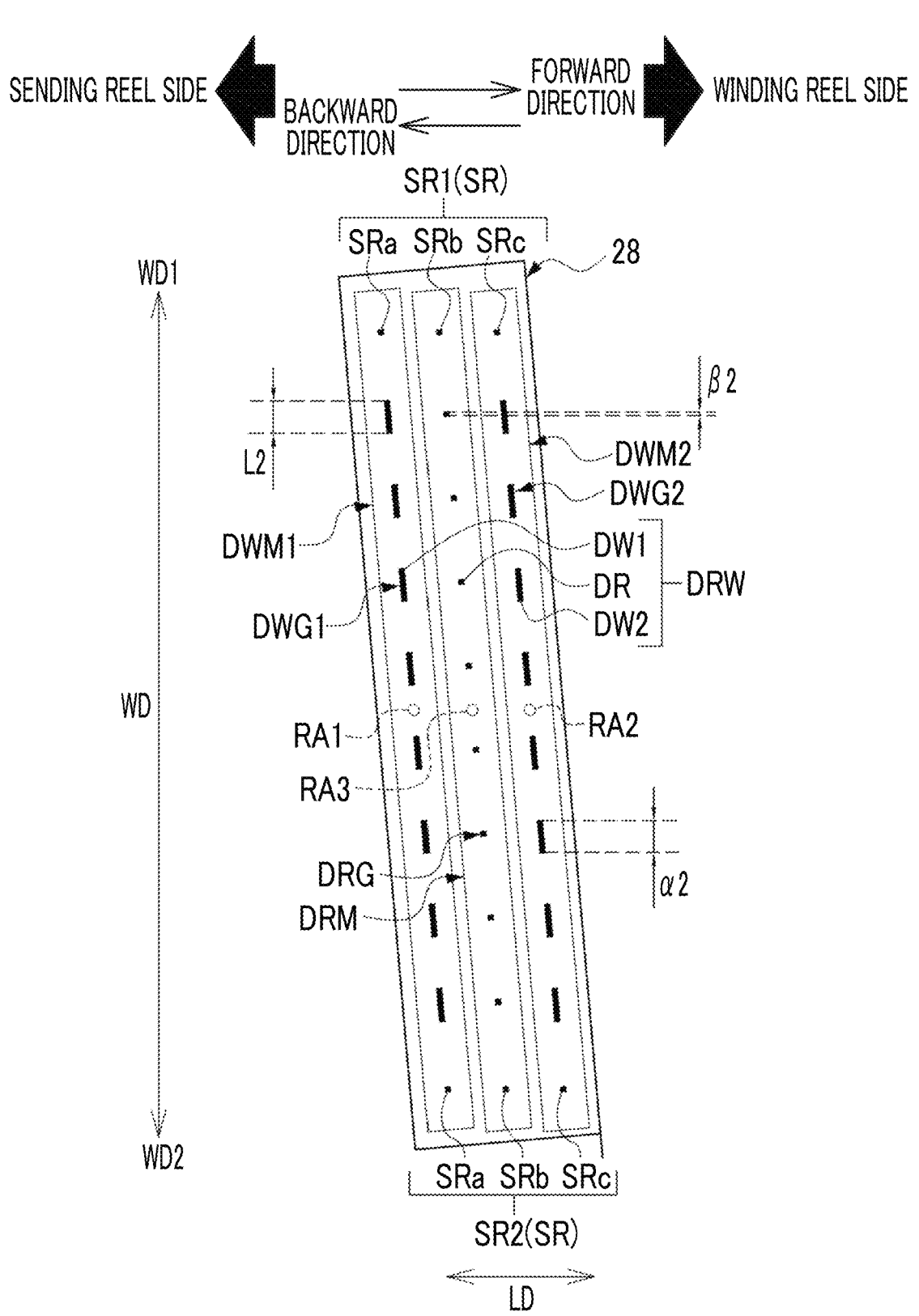
FIG. 27 is a conceptual diagram showing a modification example of the configuration of the magnetic head.

Therefore, as shown in FIG. 27 as an example, the first recording module DWM1 may be disposed in a posture inclined with respect to the width direction WD along the front surface 31 of the magnetic tape MT with the rotation axis RA1 as a center. In addition, the reproducing module DRM may be disposed in a posture inclined with respect to the width direction WD along the front surface 31 of the magnetic tape MT with the rotation axis RA2 as a center. Further, the second recording module DWM2 may be disposed in a posture inclined with respect to the width direction WD along the front surface 31 of the magnetic tape MT with the rotation axis RA3 as a center.

In the example shown in FIG. 27, a length L2, which is a length of each of the data recording elements DW included in the recording module DWM in the width direction WD, is the same as the length L1 (see FIG. 11) described above. In addition, in the example shown in FIG. 27, the length $\beta2$, which is the length of each of the data reproducing elements DR included in the reproducing module DRM in the width direction WD, is the same as the length $\beta1$ (see FIG. 1) described above. In addition, the position of the first servo reading element SRa in the width direction WD, the position of the second servo reading element SRb in the width direction WD, and the position of the third servo reading element SRc in the width direction WD are aligned.

The postures of the first recording module DWM1, the reproducing module DRM, and the second recording module DWM2 with respect to the width direction WD may be fixed or may be changed according to a situation (for example, a degree of deformation of the magnetic tape MT). In a case of changing the postures of the first recording module DWM1, the reproducing module DRM, and the second recording module DWM2 with respect to the width direction WD, an inclination mechanism (not shown) that operates under the control of the processing device 30 is used. The inclination mechanism is mechanically connected to the first recording module DWM1, the reproducing module DRM, and the second recording module DWM2. In this case, a degree of inclination of the first recording module DWM1, the reproducing module DRM, and the second recording module DWM2 with respect to the width direction WD is adjusted by the inclination mechanism under the control of the processing device 30 according to the situation.

For example, the adjustment of the degree of inclination of the first recording module DWM1, the reproducing module DRM, and the second recording module DWM2 with respect to the width direction WD is realized by rotating the first recording module DWM1 along the front surface 31 on the front surface 31 with the rotation axis RA1 as a central axis, rotating the reproducing module DRM along the front surface 31 on the front surface 31 with the rotation axis RA2 as a central axis, and rotating the second recording module DWM2 along the front surface 31 on the front surface 31 with the rotation axis RA3 as a central axis.

Here, although an example of a form in which the first recording module DWM1, the reproducing module DRM, and the second recording module DWM2 are individually controlled to rotate by the inclination mechanism has been described, this is merely an example, and the entire magnetic head 28 may be rotated by one inclination mechanism with the rotation axis RA2 as a central axis.

By inclining the recording module DWM and the reproducing module DRM with respect to the width direction WD along the front surface 31 of the magnetic tape MT, a certain deviation occurs in the width direction WD between the position of the first servo reading element SRa in the width direction WD, the position of the second servo reading element SRb in the width direction WD, and the position of the third servo reading element SRc in the width direction WD. In this case, the position (in other words, the path P) at which the servo pattern 52 is read by each of the first servo reading element SRa, the second servo reading element SRb, and the third servo reading element SRc may be adjusted in accordance with the adjustment amount determined based on the certain deviation generated in the width direction WD.

As described above, by disposing the recording module DWM and the reproducing module DRM in a posture inclined with respect to the width direction WD along the front surface 31 of the magnetic tape MT, it is possible to suppress the decrease in the accuracy of the tracking of the magnetic head 28 with respect to the magnetic tape MT due to the deformation of the magnetic tape MT. For example, it is possible to suppress the occurrence of a situation in which data is not recorded at a scheduled position or data cannot be reproduced from the scheduled position due to the deformation of the magnetic tape MT.

In the above-described embodiment, the magnetic tape system 10 has been described in which the magnetic tape cartridge 12 can be inserted and removed with respect to the magnetic tape drive 14, but the technology of the present disclosure is not limited to this. The technology of present disclosure is established even to, for example, a magnetic tape system in which at least one magnetic tape cartridge 12 is loaded in advance into the magnetic tape drive 14 (that is, a magnetic tape system in which at least one magnetic tape cartridge 12 and the magnetic tape drive 14, or the magnetic tape MT and the magnetic tape drive 14 are integrated in advance (for example, before data is recorded on a data band DB)). The magnetic tape system in which at least one magnetic tape cartridge 12 is loaded into the magnetic tape drive 14 is an example of a "magnetic tape system" according to the technology of the present disclosure.

In the above-described embodiment, the single magnetic head 28 has been described, but the technology of the present disclosure is not limited to this. For example, a plurality of magnetic heads 28 may be disposed on the magnetic tape MT.

By the way, as shown in FIG. 27, in a case in which the recording module DWM and the reproducing module DRM are inclined with respect to the width direction WD along the front surface 31 of the magnetic tape MT, in the linear magnetization region pair 54A, an angle formed by the linear magnetization region 54A1 and the servo reading element SR and an angle formed by the linear magnetization region 54A2 and the servo reading element SR are different from each other. In a case where the angles are different in this way, a variation due to an azimuth loss (for example, a variation in signal level and waveform distortion) occurs between the servo pattern signal derived from the linear magnetization region 54A1 (that is, the servo pattern signal obtained by reading the linear magnetization region 54A1 via the servo reading element SR) and the servo pattern signal derived from the linear magnetization region 54A2

(that is, the servo pattern signal obtained by reading the linear magnetization region 54A2 via the servo reading element SR).

As shown in FIG. 27, in a case in which the recording module DWM and the reproducing module DRM are inclined with respect to the width direction WD along the front surface 31 of the magnetic tape MT, an angle formed by the servo reading element SR and the linear magnetization region 54A1 (see FIG. 6) is larger than an angle formed by the servo reading element SR and the linear magnetization region 54A2, so that the output of the servo pattern signal is small, and the waveform is also widened, and the variation occurs in the servo pattern signal read by the servo reading element SR across the servo band SB in a state in which the magnetic tape MT is running. In addition, also in a case where the servo pattern 52B is read by the servo reading element SR, the variation due to the azimuth loss occurs between the servo pattern signal derived from the linear magnetization region 54B1 and the servo pattern signal derived from the linear magnetization region 54B2. Such a variation in the servo pattern signal can contribute to a decrease in the accuracy of the servo control.

For example, as another example of the known servo pattern 52A in the related art, an aspect can be considered in which the linear magnetization region 54A1 is parallel to the imaginary straight line C1 and the linear magnetization region 54A2 is inclined with respect to the imaginary straight line C1 (that is, an aspect in which only the linear magnetization region 54A2 is inclined). Even for this known aspect in the related art, in a case in which the servo pattern 52A is read by the servo reading element SR, in the linear magnetization region pair 54A, an angle formed by the linear magnetization region 54A1 and the servo reading element SR and an angle formed by the linear magnetization region 54A2 and the servo reading element SR are different. In a case in which the angles are different as described above, the variation due to the azimuth loss occurs between the servo pattern signal derived from the linear magnetization region 54A1 and the servo pattern signal derived from the linear magnetization region 54A2. Such a variation in the servo pattern signal can contribute to a decrease in the accuracy of the servo control.

Figure 28:
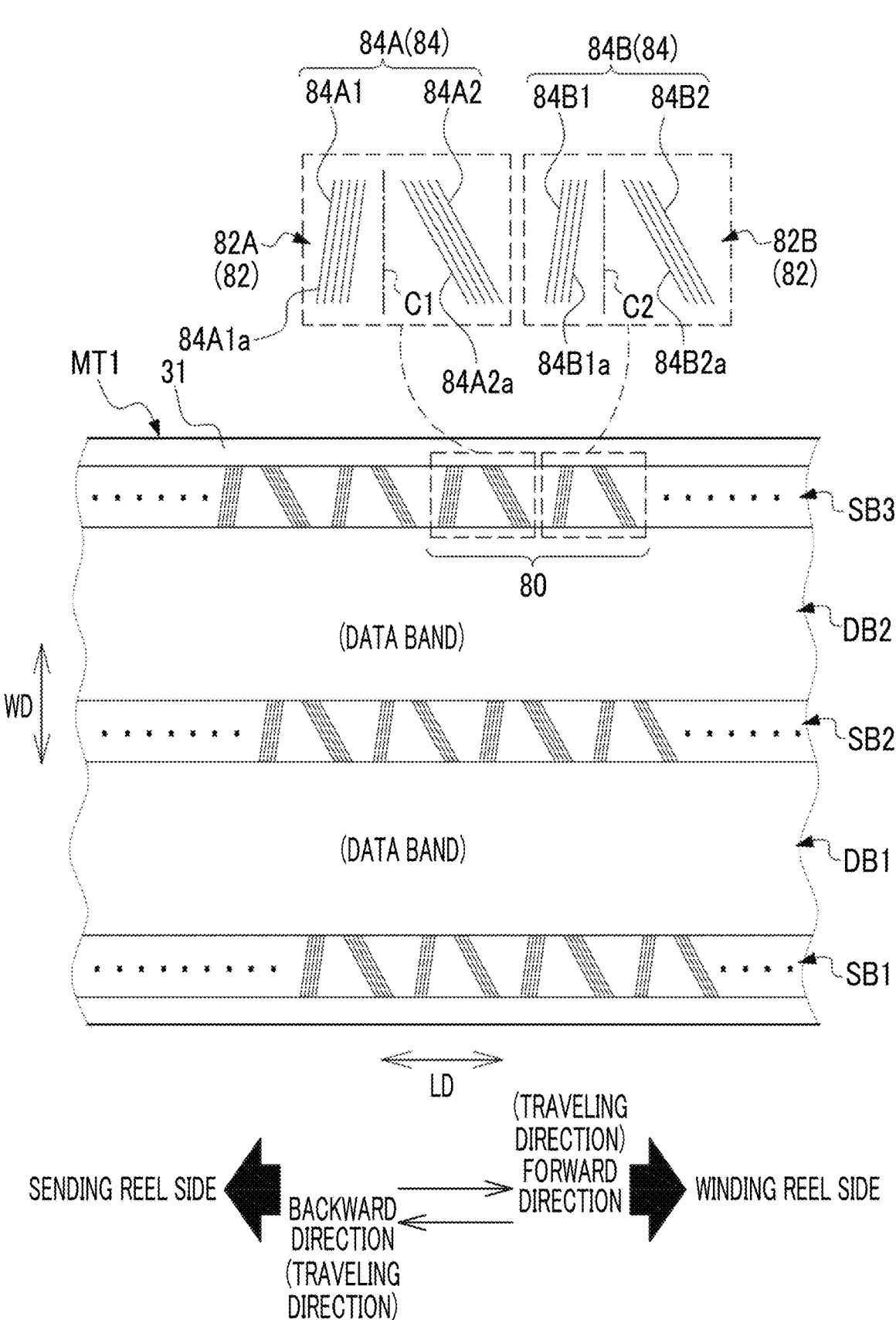
FIG. 28 is a conceptual diagram showing a modification example of the configuration of the servo pattern.

Therefore, in a case where the recording module DWM and the reproducing module DRM are inclined with respect to the width direction WD along the front surface 31 of the magnetic tape MT (see FIG. 27), as shown in FIG. 28 as an example, a magnetic tape MT1 is employed instead of the magnetic tape MT. The magnetic tape MT1 is different from the magnetic tape MT in that a frame 80 is provided instead of the frame 50. The frame 80 is defined by a set of servo patterns 82. A plurality of servo patterns 82 are recorded on the servo band SB along the longitudinal direction LD of the magnetic tape MT1. The plurality of servo patterns 82 are disposed at regular intervals along the longitudinal direction LD of the magnetic tape MT, similarly to the plurality of servo patterns 52 recorded in the magnetic tape MT.

In the example shown in FIG. 28, servo patterns 82A and 82B are shown as an example of the set of servo patterns 82 included in the frame 80. The servo patterns 82A and 82B are adjacent to each other along the longitudinal direction LD of the magnetic tape MT1, and the servo pattern 82A is positioned on the upstream side in the forward direction in the frame 80, and the servo pattern 82B is positioned on the downstream side in the forward direction.

The servo pattern 82 consists of linear magnetization region pairs 84. The linear magnetization region pair 84 is classified into a linear magnetization region pair 84A and a linear magnetization region pair 84B. Here, the linear mag-netization region pair 84 is an example of a "linear magne-tization region pair" according to the technology of the present disclosure.

The servo pattern 82A consists of the linear magnetization region pair 84A. In the example shown in FIG. 28, linear magnetization regions 84A1 and 84A2 are shown as an example of the linear magnetization region pair 84A. Each of the linear magnetization regions 84A1 and 84A2 is a linearly magnetized region.

The linear magnetization regions 84A1 and 84A2 are inclined in opposite directions with respect to the imaginary straight line C1. In other words, the linear magnetization region 84A1 is inclined in one direction (for example, a clockwise direction as viewed from a paper surface side of FIG. 28) with respect to the imaginary straight line C1. On the other hand, the linear magnetization region 84A2 is inclined in another direction (for example, a counterclock-wise direction as viewed from the paper surface side of FIG. 28) with respect to the imaginary straight line C1. The linear magnetization regions 84A1 and 84A2 are not parallel to each other and are inclined at different angles with respect to the imaginary straight line C1. The linear magnetization region 84A1 has a steeper inclination angle with respect to the imaginary straight line C1 than the linear magnetization region 84A2. Here, "steep" means that, for example, an angle of the linear magnetization region 84A1 with respect to the imaginary straight line C1 is smaller than an angle of the linear magnetization region 84A2 with respect to the imaginary straight line C1. In addition, a total length of the linear magnetization region 84A1 is shorter than a total length of the linear magnetization region 84A2.

Here, the linear magnetization region 84A1 is an example of a "first linear magnetization region" according to the technology of the present disclosure, the linear magnetiza-tion region 84A2 is an example of a "second linear magne-tization region" according to the technology of the present disclosure, and the imaginary straight line C1 is an example of an "imaginary straight line" according to the technology of the present disclosure.

In the servo pattern 82A, a plurality of magnetization straight lines 84A1*a* are included in the linear magnetization region 84A1, and a plurality of magnetization straight lines 84A2*a* are included in the linear magnetization region 84A2. The number of the magnetization straight lines 84A1*a* included in the linear magnetization region 84A1 is the same as the number of the magnetization straight lines 84A2*a* included in the linear magnetization region 84A2.

The linear magnetization region 84A1 is a set of magne-tization straight lines 84A1*a*, which are five magnetized straight lines, and the linear magnetization region 84A2 is a set of magnetization straight lines 84A2*a*, which are five magnetized straight lines. In the servo band SB, the posi-tions of both ends of the linear magnetization region 84A1 (that is, the positions of both ends of each of the five magnetization straight lines 84A1*a*) and the positions of both ends of the linear magnetization region 84A2 (that is, the positions of both ends of each of the five magnetization straight lines 84A2*a*) are aligned in the width direction WD. It should be noted that, here, the example has been described in which the positions of both ends of each of the five magnetization straight lines 84A1*a* and the positions of both ends of each of the five magnetization straight lines 84A2*a* are aligned, but this is merely an example, and the positions of both ends of one or more magnetization straight lines 84A1*a* among the five magnetization straight lines 84A1*a* and the positions of both ends of one or more magnetization straight lines 84A2*a* among of the five magnetization straight lines 84A2*a* need only be aligned. In addition, in the present specification, the concept of "aligned" also includes meaning of "aligned" including an error generally allowed in the technical field to which the technology of the present disclosure belongs, which is the error to the extent that it does not contradict the purpose of the technology of the present disclosure, in addition to the meaning of being exactly aligned.

The servo pattern 82B consists of the linear magnetization region pair 84B. In the example shown in FIG. 28, linear magnetization regions 84B1 and 84B2 are shown as an example of the linear magnetization region pair 84B. Each of the linear magnetization regions 84B1 and 84B2 is a linearly magnetized region.

The linear magnetization regions 84B1 and 84B2 are inclined in opposite directions with respect to the imaginary straight line C2. In other words, the linear magnetization region 84B1 is inclined in one direction (for example, a clockwise direction as viewed from a paper surface side of FIG. 28) with respect to the imaginary straight line C2. On the other hand, the linear magnetization region 84B2 is inclined in another direction (for example, a counterclock-wise direction as viewed from the paper surface side of FIG. 28) with respect to the imaginary straight line C2. The linear magnetization regions 84B1 and 84B2 are not parallel to each other and are inclined at different angles with respect to the imaginary straight line C2.

The linear magnetization region 84B1 has the steeper inclination angle with respect to the imaginary straight line C2 than the linear magnetization region 84B2 has. Here, "steep" means that, for example, an angle of the linear magnetization region 84B1 with respect to the imaginary straight line C2 is smaller than an angle of the linear magnetization region 84B2 with respect to the imaginary straight line C2. In addition, a total length of the linear magnetization region 84B1 is shorter than a total length of the linear magnetization region 84B2.

Here, the linear magnetization region 84B 1 is an example of a "first linear magnetization region" according to the technology of the present disclosure, the linear magnetiza-tion region 84B2 is an example of a "second linear magne-tization region" according to the technology of the present disclosure, and the imaginary straight line C2 is an example of an "imaginary straight line" according to the technology of the present disclosure.

In the servo pattern 82B, a plurality of magnetization straight lines 84B1*a* are included in the linear magnetization region 84B1, and a plurality of magnetization straight lines 84B2*a* are included in the linear magnetization region 84B2. The number of the magnetization straight lines 84B1*a* included in the linear magnetization region 84B1 is the same as the number of the magnetization straight lines 84B2*a* included in the linear magnetization region 84B2.

The total number of the magnetization straight lines 84B1*a* and 84B2*a* included in the servo pattern 82B is different from the total number of the magnetization straight lines 84A1*a* and 84A2*a* included in the servo pattern 82A. In the example shown in FIG. 28, the total number of the magnetization straight lines 84A1*a* and 84A2*a* included in the servo pattern 82A is ten, whereas the total number of the magnetization straight lines 84B1*a* and 84B2*a* included in the servo pattern 82B is eight.

The linear magnetization region 84B1 is a set of magne-tization straight lines 84B1*a*, which are four magnetized straight lines, and the linear magnetization region 84B2 is a set of magnetization straight lines 84B2*a*, which are four magnetized straight lines. In the servo band SB, the positions of both ends of the linear magnetization region 84B1 (that is, the positions of both ends of each of the four magnetization straight lines 84B1a) and the positions of both ends of the linear magnetization region 84B2 (that is, the positions of both ends of each of the four magnetization straight lines 84B2a) are aligned in the width direction WD.

It should be noted that, here, the example in which the positions of both ends of each of the four magnetization straight lines 84B1a and the positions of both ends of each of the four magnetization straight lines 84B2a are aligned has been described. However, this is merely an example. For example, as long as the positions of both ends of one or more of the four magnetization straight lines 84B1a and the positions of both ends of one or more of the four magnetization straight lines 84B2a are aligned, the technology of the present disclosure is established.

In addition, here, the set of the five magnetization straight lines 84A1a, which are the straight lines magnetized, has been described as the example of the linear magnetization region 84A1, and the set of the five magnetization straight lines 84A2a, which are the straight lines magnetized, has been described as the example of the linear magnetization region 84A2, but the technology of the present disclosure is not limited to this. In addition, the set of the magnetization straight lines 84B1a, which are the four magnetized straight lines, has been described as an example of the linear magnetization region 84B1, and the set of the magnetization straight lines 84B2a, which are the four magnetized straight lines, has been described as an example of the linear magnetization region 84B2, but the technology of the present disclosure is not limited to this. For example, as long as the linear magnetization region 84A1 is the number of the magnetization straight lines 84A1a that contribute to specifying the position of the magnetic head 28 on the magnetic tape MT1, and the linear magnetization region 84A2 is the number of the magnetization straight lines 84A2a that contribute to specifying the position of the magnetic head 28 on the magnetic tape MT1, the technology of the present disclosure is established. In addition, as long as the linear magnetization region 84B1 is the number of the magnetization straight lines 84B1a that contribute to specifying the position of the magnetic head 28 on the magnetic tape MT1, and the linear magnetization region 84B2 is the number of the magnetization straight lines 84B2a that contribute to specifying the position of the magnetic head 28 on the magnetic tape MT1, the technology of the present disclosure is established.

Here, the geometrical characteristic of the linear magnetization region pair 84A on the magnetic tape MT1 will be described with reference to FIG. 29. Here, the geometrical characteristic refers to a generally recognized geometrical characteristic, such as a length, a shape, an orientation, and/or a position.

Figure 29:
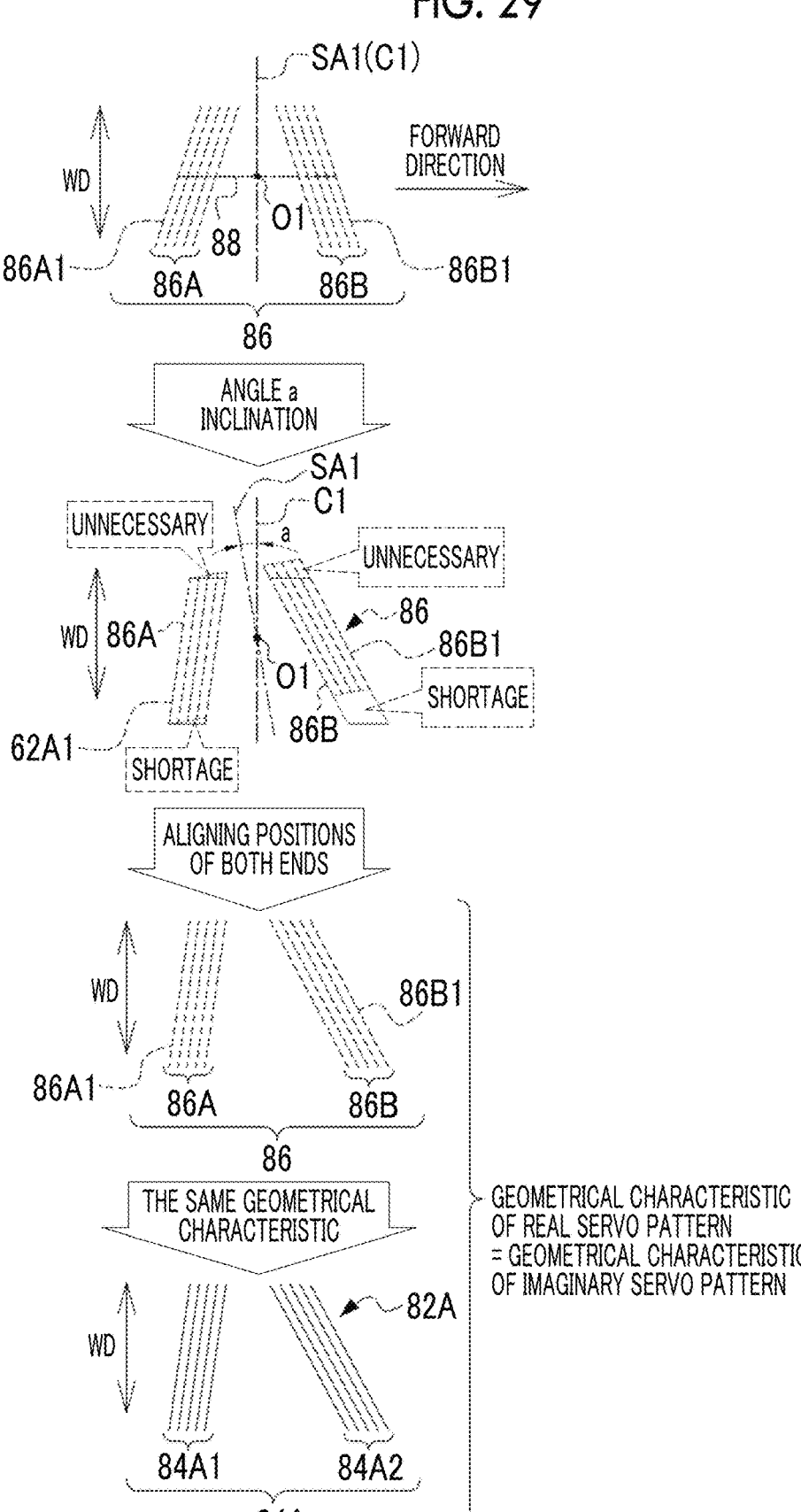
FIG. 29 is a conceptual diagram showing an example of a relationship between a geometrical characteristic of an actual servo pattern and a geometrical characteristic of an imaginary servo pattern.

As an example, as shown in FIG. 29, the geometrical characteristic of the linear magnetization region pair 84A on the magnetic tape MT1 can be expressed by using an imaginary linear region pair 86. The imaginary linear region pair 86 consists of an imaginary linear region 86A and an imaginary linear region 86B. The geometrical characteristic of the linear magnetization region pair 84A on the magnetic tape MT1 corresponds to the geometrical characteristic based on the imaginary linear region pair 86 inclined line-symmetrically with respect to the imaginary straight line C1 in a case in which an entirety of the imaginary linear region pair 86 is inclined with respect to the imaginary straight line C1 by inclining a symmetry axis SA1 of the imaginary linear region 86A and the imaginary linear region 86B with respect to the imaginary straight line C1.

The imaginary linear region pair 86 is an imaginary linear magnetization region pair having the same geometrical characteristic as the linear magnetization region pair 54A shown in FIG. 6. The imaginary linear region pair 86 is an imaginary magnetization region used for convenience for describing the geometrical characteristic of the linear magnetization region pair 86A on the magnetic tape MT1, and is not an actually present magnetization region.

The imaginary linear region 86A has the same geometrical characteristic as the linear magnetization region 54A1 shown in FIG. 6, and consists of five imaginary straight lines 86A1 corresponding to the five magnetization straight lines 54A1a shown in FIG. 6. The imaginary linear region 86B has the same geometrical characteristic as the linear magnetization region 54B1 shown in FIG. 6, and consists of five imaginary straight lines 86B1 corresponding to the five magnetization straight lines 54A2a shown in FIG. 6.

A center O1 is provided in the imaginary linear region pair 86. For example, the center O1 is a center of a line segment 88 connecting a center of the straight line 86A1 positioned on the most upstream side of the five straight lines 86A1 in the forward direction and a center of the straight line 86B1 positioned on the most upstream side of the five straight lines 86B 1 in the forward direction.

Since the imaginary linear region pair 86 has the same geometrical characteristic as the linear magnetization region pair 54A shown in FIG. 6, the imaginary linear region 86A and the imaginary linear region 86B are inclined line-symmetrically with respect to the imaginary straight line C1. Here, a case will be considered in which reading by the servo reading element SR shown in FIG. 27 is performed tentatively with respect to the imaginary linear region pair 86 in a case in which the entirety of the imaginary linear region pair 86 is inclined with respect to the imaginary straight line C1 by inclining the symmetry axis SA1 of the imaginary linear regions 86A and 86B at an angle a (for example, 10 degrees) with respect to the imaginary straight line C1 with the center O1 as the rotation axis. In this case, in the imaginary linear region pair 86, in the width direction WD, a portion is generated in which the imaginary linear region 86A is read but the imaginary linear region 86B is not read or the imaginary linear region 86A is not read but the imaginary linear region 86B. That is, in each of the imaginary linear regions 86A and 86B, in a case in which reading by the servo reading element SR is performed, a shortage part and an unnecessary part are generated.

Therefore, in each of the imaginary linear regions 86A and 86B, a shortage part is supplemented and an unnecessary part is cut out. Therefore, the positions of both ends of the imaginary linear region 86A (that is, the positions of both ends of each of the five straight lines 86A1) and the positions of both ends of the imaginary linear region 86B (that is, the positions of both ends of each of the five straight lines 86B1) are aligned in the width direction WD.

The geometrical characteristic of the imaginary linear region pair 86 (that is, the geometrical characteristic of the imaginary servo pattern) obtained as described above corresponds to the geometrical characteristic of the actual servo pattern 82A. That is, the linear magnetization region pair 84A having the geometrical characteristics corresponding to the geometrical characteristics of the imaginary linear region pair 86 obtained by aligning the positions of both ends of the imaginary linear region 86A and the positions of both ends of the imaginary linear region 86B in the width direction WD is recorded on the servo band SB.

It should be noted that the linear magnetization region pair 84B is different from the linear magnetization region pair 84A only in that the four magnetization straight lines 84B1*a* are provided instead of the five magnetization straight lines 84A1*a* and the four magnetization straight lines 84B2*a* are provided instead of the five magnetization straight lines 84A2*a*. Therefore, the linear magnetization region pair 84B having the geometrical characteristic corresponding to the geometrical characteristic of the imaginary linear region pair (not shown) obtained by aligning the positions of both ends of each of the four straight lines 86A1 and the positions of both ends of each of the four straight lines 86B1 in the width direction WD is recorded in the servo band SB.

As described above, in a case in which the recording module DWM and the reproducing module DRM are inclined with respect to the width direction WD along the front surface 31 of the magnetic tape MT (see FIG. 27), the magnetic tape MT1 in which the servo pattern 82A consisting of the linear magnetization region pair 84A and the servo pattern 82B consisting of the linear magnetization region pair 84B are formed is used. As a result, even in a case where data is recorded on the magnetic tape MT1 or data is reproduced from the magnetic tape MT1 with respect to the magnetic head 28 that is skewed on the magnetic tape MT1 in order to reduce the influence of the TDS, it is possible to contribute to improvement of the accuracy of recording data on the magnetic tape MT1 and the accuracy of reproducing data recorded on the magnetic tape MT1.

The linearity of the servo pattern 82 is guaranteed by performing the linearity test method (see FIG. 14) on the magnetic tape MT1 in the same manner as in the above embodiment. Accordingly, the same effects as those of the above-described embodiment can be obtained.

In addition, the formation of the plurality of servo bands SB each including the plurality of servo patterns 82 along the longitudinal direction LD is performed in the same manner as in the above-described embodiment by using a skew correspondence type servo pattern recording head (not shown) instead of the servo pattern recording head WH. The skew-responsive servo pattern recording head refers to, for example, a servo pattern recording head in which a plurality of gap patterns having geometrical characteristics corresponding to geometrical characteristics of a straight line 86A1 positioned on the most upstream side in the forward direction in the imaginary linear region 86A and a straight line 86B1 positioned on the most upstream side in the forward direction in the imaginary linear region 86B are formed at equal intervals along the direction WD3 (see FIG. 13).

The above-described contents and shown contents are the detailed description of the parts according to the technology of the present disclosure, and are merely examples of the technology of the present disclosure. For example, description related to the above configurations, functions, actions, and effects is description related to an example of configurations, functions, actions, and effects of the parts relating to the technology of the present disclosure. Thus, it is needless to say that unnecessary parts may be deleted, new elements may be added, or replacement may be made to the content of the above description and the content of the drawings without departing from the gist of the technology of the present disclosure. In addition, in order to avoid complications and facilitate understanding of the parts according to the technology of the present disclosure, in the above-described contents and shown contents, the description of common technical knowledge and the like that do not particularly require description for enabling the implementation of the technology of the present disclosure are omitted.

In the present specification, "A and/or B" is synonymous with "at least one of A or B". That is, "A and/or B" may refer to A alone, B alone, or a combination of A and B. In addition, in the present specification, in a case in which three or more matters are associated and expressed by "and/or", the same concept as "A and/or B" is applied.

All documents, patent applications, and technical standards mentioned in the present specification are incorporated herein by reference to the same extent as in a case in which each document, each patent application, and each technical standard are specifically and individually described by being incorporated by reference.

What is claimed is:

1. A magnetic tape comprising:
a plurality of servo bands, each having a plurality of servo patterns recorded along a longitudinal direction, are arranged in a width direction,
wherein an indicator indicating non-linearity of the servo pattern is within 15% or less of a track pitch,
the track pitch is a pitch between a plurality of tracks formed by recording data on the magnetic tape by a recording element in accordance with a signal obtained from the plurality of servo patterns,
the indicator indicates a degree of variation of a plurality of PES difference gaps from an average value of the plurality of PES difference gaps,
the PES difference gap is a difference between a first PES difference and a second PES difference, the first PES difference being a difference in PES between a pair of first positions corresponding to each other in the width direction in a pair of servo patterns recorded at corresponding positions in the width direction between a pair of servo bands adjacent to each other in the width direction among the plurality of servo bands, the second PES difference being difference in PES between a pair of second positions deviated from the pair of first positions in the width direction by a first predetermined interval in the pair of servo patterns,
the plurality of PES difference gaps are obtained by measuring the PES difference gap in the pair of servo patterns for each second predetermined interval along the width direction, and
the first predetermined interval is larger than the second predetermined interval.

2. The magnetic tape according to claim 1,
wherein the plurality of tracks are formed by recording the data in an SMR method by the recording element on the magnetic tape.

3. The magnetic tape according to claim 1,
wherein the indicator is a value corresponding to three times a standard deviation of the plurality of PES difference gaps.

4. The magnetic tape according to claim 1,
wherein the first predetermined interval is a reference interval of a multiple of a natural number of the second predetermined interval and an interval that is closest to the reference interval corresponding to half of a difference between a recording element length, which is a length of the recording element in the width direction, and the track pitch.

5. The magnetic tape according to claim 1,
wherein the first predetermined interval is an interval corresponding to 2 or more multiples of a natural number of the second predetermined interval.

6. The magnetic tape according to claim 1,
wherein the first predetermined interval is larger than the track pitch.

7. The magnetic tape according to claim 1,
wherein the indicator is within 10% or less of the track pitch.

8. The magnetic tape according to claim 1,
wherein the indicator is within 5% or less of the track pitch.

9. The magnetic tape according to claim 1,
wherein three or more servo bands are arranged as the plurality of servo bands in the width direction, and
the indicator is obtained for each of all the pairs of servo bands adjacent to each other in the width direction.

10. The magnetic tape according to claim 9,
wherein each of the indicators obtained for each of the pair of servo bands is within 15% or less of the track pitch.

11. The magnetic tape according to claim 9,
wherein each of the indicators obtained for each of the pair of servo bands is within 10% or less of the track pitch.

12. The magnetic tape according to claim 9,
wherein each of the indicators obtained for each of the pair of servo bands is within 5% or less of the track pitch.

13. The magnetic tape according to claim 1,
wherein the servo pattern is at least one linear magnetization region pair,
the linear magnetization region pair is a first linear magnetization region linearly magnetized and a second linear magnetization region linearly magnetized,
the first linear magnetization region and the second linear magnetization region are inclined in opposite directions with respect to an imaginary straight line along the width direction, and
the first linear magnetization region has a steeper inclination angle with respect to the imaginary straight line than the second linear magnetization region has.

14. A magnetic tape cartridge comprising:
the magnetic tape according to claim 1; and
a case in which the magnetic tape is accommodated.

15. A magnetic tape system comprising:
the magnetic tape according to claim 1; and
a magnetic head that performs recording of data on the magnetic tape and/or reproducing of data recorded on the magnetic tape.

16. A test method comprising:
acquiring the indicator from the magnetic tape according to claim 1; and
testing the magnetic tape using the indicator.

17. The test method according to claim 16,
wherein the testing of the magnetic tape includes testing linearity of the servo pattern using the indicator.

18. A manufacturing method of a magnetic tape in which a plurality of servo bands, each having a plurality of servo patterns are recorded along a first longitudinal direction are arranged in a width direction, the manufacturing method comprising:

installing a servo write head having an opposing surface, which is a surface facing a recording surface of the magnetic tape in a case where the plurality of servo patterns are recorded along the first longitudinal direction and a plurality of gap patterns, which are formed on the opposing surface at intervals along a second longitudinal direction and correspond to the plurality of servo patterns, in a posture in which the recording surface and the plurality of gap patterns face each other; and recording the plurality of servo patterns on the recording surface along the first longitudinal direction by using the servo write head installed in the posture, to form the plurality of servo bands on the recording surface, wherein an indicator indicating non-linearity of the servo pattern is within 15% or less of a track pitch, the track pitch is a pitch between a plurality of tracks formed by recording data on the magnetic tape by a recording element in accordance with a signal obtained from the plurality of servo patterns, the indicator indicates a degree of variation of a plurality of PES difference gaps from an average value of the plurality of PES difference gaps, the PES difference gap is a difference between a first PES difference and a second PES difference, the first PES difference being a difference in PES between a pair of first positions corresponding to each other in the width direction in a pair of servo patterns recorded at corresponding positions in the width direction between a pair of servo bands adjacent to each other in the width direction among the plurality of servo bands, the second PES difference being difference in PES between a pair of second positions deviated from the pair of first positions in the width direction by a first predetermined interval in the pair of servo patterns, the plurality of PES difference gaps are obtained by measuring the PES difference gap in the pair of servo patterns for each second predetermined interval along the width direction, and the first predetermined interval is larger than the second predetermined interval.

* * * * *